US012658975B2

(12) United States Patent
Harney

(10) Patent No.: US 12,658,975 B2
(45) Date of Patent: *Jun. 16, 2026

(54) SYSTEMS AND METHODS FOR PROGRAMMING PLUGGABLE TRANSCEIVERS

(71) Applicant: FONEX DATA SYSTEMS INC., St-Laurent (CA)

(72) Inventor: Gordon Harney, Ottawa (CA)

(73) Assignee: FONEX DATA SYSTEMS INC., Saint Laurent (CA)

( * ) Notice: Subject to any disclaimer, the term of this patent is extended or adjusted under 35 U.S.C. 154(b) by 425 days.

This patent is subject to a terminal disclaimer.

(21) Appl. No.: 18/332,618

(22) Filed: Jun. 9, 2023

(65) Prior Publication Data

US 2023/0396292 A1 Dec. 7, 2023

Related U.S. Application Data

(63) Continuation of application No. 17/416,456, filed as application No. PCT/CA2019/051198 on Aug. 29, 2019, now Pat. No. 11,716,118.

(60) Provisional application No. 62/783,725, filed on Dec. 21, 2018.

(51) Int. Cl.
| | |
|---|---|
| *H04B 5/77* | (2024.01) |
| *H04B 1/38* | (2015.01) |
| *H04W 8/24* | (2009.01) |

(52) U.S. Cl.
CPC ................. *H04B 5/77* (2024.01); *H04B 1/38* (2013.01); *H04W 8/245* (2013.01)

(58) Field of Classification Search
CPC ... H04B 1/38; H04B 1/40; H04B 5/70; H04B 5/77; H04W 4/50; H04W 4/80; H04W 8/22; H04W 8/24; H04W 8/245; H04L 41/08; H04L 41/0803; H04L 41/0806; H04L 41/0809

See application file for complete search history.

(56) References Cited

U.S. PATENT DOCUMENTS

| | | | | |
|---|---|---|---|---|
| 9,471,330 B2 * | 10/2016 | Pinder | .................... | G06F 21/575 |
| 9,733,924 B2 * | 8/2017 | Brech | ................ | G06K 7/10366 |
| 2020/0265199 A1 * | 8/2020 | Harney | .................... | H04W 4/80 |
| 2022/0121832 A1 * | 4/2022 | Reuber | .............. | G06K 7/10425 |

* cited by examiner

*Primary Examiner* — Quochien B Vuong
(74) *Attorney, Agent, or Firm* — Bookoff McAndrews, PLLC

(57) ABSTRACT

A method for programming a network transceiver is provided. The method includes: providing a network transceiver having a programming interface; obtaining transceiver identification information via a radio-frequency transceiver programming system (RTPS); obtaining, via the RTPS, configuration data for the network transceiver based on the transceiver identification information; transmitting, via the RTPS, at least some of the configuration data via a radio-frequency (RF) interface; and programming the network transceiver via the programming interface using the at least some of the configuration data received via the RF interface. Corresponding systems, apparatuses (including smart labels, host devices, and transceivers) are also provided.

20 Claims, 14 Drawing Sheets

SYSTEMS AND METHODS FOR PROGRAMMING PLUGGABLE TRANSCEIVERS

RELATED APPLICATIONS

The present application is a continuation and claims priority to U.S. Non-Provisional patent application Ser. No. 17/416,456, filed on Jun. 18, 2021, entitled "Systems and Methods for Programming Pluggable Transceivers,", which claims priority to PCT Application No. PCT/CA2019/051198, filed on Aug. 29, 2019, which claims priority to U.S. Provisional Patent Application No. 62/783,725, filed Dec. 21, 2018, the entireties of which are hereby incorporated by reference.

TECHNICAL FIELD

The technical field generally relates to network transceivers, and more particularly to programming, provisioning, and configuring transceivers such as those described in related international PCT application no. PCT/CA2018/050021, published as WO 2018/152620, the entirety of which is incorporated herein by reference. The network transceivers can be programmed using Radio-Frequency Identification (RFID), Near Field Communications (NFC), or other types of radio-frequency (RF) communications (hereinafter collectively referred to as "RFID").

BACKGROUND

Pluggable transceivers include a broad range of standard device types, for example MSA pluggable transceivers; small form-factor pluggable (SFP), SFP+, SFP28, XFP, Quad SFP+(QSFP+), QSFP28, QSFP56, C form-factor pluggable types (e.g. CFP, CFP2, CFP4,), etc., and proprietary "smart" SFP types with integrated protocol processors, RJ45 Power over Ethernet (POE) devices and dongles, USB devices and dongles, Internet of Things (IoT) telematics devices and sensors, communications, computer and storage system plugin cards such as optical transponders/mux-ponders/switches, packet switch and router line interface cards, computer server cards and storage plugin devices, wireless transceiver and transponder cards, data acquisition and control equipment cards, audio/video encoder and decoder cards, and mobile transceiver devices, having various functions, configurations, form factors, and network, host, management and physical interfaces.

Based on current practices, service providers incur significant costs maintaining broad inventories of OEM compatible pluggable transceivers, and configuring/provisioning, deploying, servicing, maintaining and managing a plurality of devices and types in their networks. Likewise, manufacturers incur significant costs programming and maintaining broad inventories of pre-configured pluggable transceivers for a plurality of service providers and OEMs.

SUMMARY

Broadly described, systems, apparatus and methods for programming pluggable transceivers using RFID are provided. In some embodiments, the systems, apparatus and methods for programming pluggable transceivers using RFID can yield the following advantages over current practices, among others:

Supply chain, service delivery and maintenance improvements;

Optimize programming flexibility;
One platform for a plurality of MSA transceiver types,
Just-in-time/on-demand product configuration,
Integrated RFID based manufacturing, inventory and configuration management processes,
Inventory reduction opportunities,
Programming improvements;
Universal MSA transceiver RFID interface;
OEM transceiver identification, configuration and compatibility,
Service level provisioning,
DWDM transceiver wavelength tuning,
IC configuration,
Transceiver configuration authorization,
OS, software/firmware configuration, licensing/activation,
Transceiver diagnostics configuration and reporting,
Test configuration and reporting,
Logging, monitoring and debugging tools
Quickest methods;
"Tap and go" over the air device programming,
Unpowered programming without a host,
Simple and easy to use including mobile wireless programming;
Smart labels,
Smart label RFID printer/reader/writer based programming,
Smart Phone or PC based programming,
Integrated RFID Reader/Writer and RFID repeater interfaces,
RFID transceiver configuration data network database.

In the following described embodiments, a system for programming a pluggable transceiver includes a memory that is adapted to store pluggable transceiver programming/configuration data transmitted or received via RFID and is referred to as "RFID memory". Different types of RFID memory are described herein, and the RFID memory can be configured to interface with a pluggable transceiver controller in different ways.

In the following described embodiments, an external RFID reader/writer (e.g. hardware which can transmit and or receive data using RFID, referred to as an "external RFID reader") can be configured to program a pluggable transceiver RFID memory with data, wherein said data defines a desired operating configuration of said pluggable transceiver. In some embodiments, the pluggable transceiver controller can be configured to read said programmed data from the RFID memory and to program the pluggable transceiver to a desired configuration.

In described embodiments, an internal RFID reader/writer (e.g. hardware which can transmit and or receive data using RFID, referred to as an "internal RFID reader") can be configured to read data from an RFID memory and program a pluggable transceiver, wherein said data defines a desired configuration of said pluggable transceiver. In some embodiments, the pluggable transceiver controller can be configured to read said RFID memory using an internal RFID reader and to program the pluggable transceiver to a desired configuration.

According to an aspect, a method for programming a network or pluggable transceiver is provided. The method includes the steps of: a) providing a network transceiver comprising a programming interface and having a transceiver identifier associated therewith;

b) reading transceiver identification information from the transceiver identifier; c)

receiving configuration data for the network transceiver; d) verifying that the configuration data is compatible with the network transceiver based on the transceiver identification information; and e) if the configuration data is compatible with the network transceiver, programming the network transceiver using the configuration data via the programming interface.

According to an aspect, a system for programming a network transceiver is provided. The system includes: a programming interface for programming a network transceiver; a reader for reading transceiver identification information associated with the network transceiver; a communications interface for receiving configuration data for the network transceiver; and a processor in operative communication with the programming interface, the reader, and the communications interface, said processor being configured to verify that the configuration data is compatible with the network transceiver based on the transceiver identification information and, if the configuration data is compatible with the network transceiver, program the network transceiver using the configuration data via the programming interface.

According to an aspect, a non-transitory computer readable medium for programming a network transceiver having a programming interface and a transceiver identifier associated therewith is provided. The non-transitory computer readable medium has instructions stored thereon which when executed by a computer cause the computer to carry of the steps of: a) reading transceiver identification information from the transceiver identifier; b) receiving configuration data for the network transceiver; c) verifying that the configuration data is compatible with the network transceiver based on the transceiver identification information; and d) if the configuration data is compatible with the network transceiver, programming the network transceiver using the configuration data via the programming interface.

According to an aspect, a networking cable for programming a network transceiver is provided. The networking cable includes a connector having an RFID device embedded therein, said RFID device including RFID memory having programming data stored thereon defining a programmed configuration of the network transceiver, and an RFID antenna for transmitting the programming data to an RFID device in the network transceiver.

According to an aspect, a network transceiver is provided. The network transceiver includes: an electromagnetically shielding housing; a host interface for connecting to a host; a network interface for transmitting and receiving signals to and from a network; a first RFID antenna for receiving RFID data from an RFID device in proximity to the network transceiver; a second RFID antenna for receiving RFID data from an RFID device in proximity to the network interface of the network transceiver; at least one RFID reader or RFID memory positioned within the electromagnetically shielding housing, and in communication with the first and/or second RFID antenna; and a controller in operative communication with the network interface and the at least one RFID reader or RFID memory, said controller operating the network interface and/or host interface according to an operating configuration, wherein the operating configuration of the controller is programmed using the RFID data received via the first or second RFID antenna and the at least one RFID reader or RFID memory.

According to an aspect, a network transceiver is provided. The network transceiver includes: an electromagnetically shielding housing; a host interface for connecting to a host; a network interface for transmitting and receiving signals to and from a network; a handle or ejector secured to the housing, said handle or ejector having at least one RFID antenna embedded therein for receiving RFID data from an RFID device in proximity to the handle or ejector; an RFID reader or an RFID memory positioned within the electromagnetically shielding housing, and in communication with the RFID antenna; and a controller in operative communication with the network interface and the RFID reader or RFID memory, said controller operating the network interface and/or host interface according to an operating configuration, wherein the operating configuration of the controller is programmed using the RFID data received via the RFID antenna and RFID reader or RFID memory.

According to an aspect, a smart label for storing transceiver configuration data and/or identification information, and for programming a network transceiver is provided. The smart label includes: a substrate having a top side and a bottom side, said bottom side being configured to secure to a body of the network transceiver; an RFID device secured to or embedded in the substrate, said RFID device having RFID memory for storing identification information and/or configuration data; a first RFID antenna in communication with the RFID device, said first RFID antenna being exposed on the top side of the substrate for allowing communication with the RFID device; an RFID repeater for relaying RFID signals to and from predetermined positions on the top and the bottom surfaces of the substrate, said RFID repeater comprising a second RFID antenna exposed on the top side of the substrate and a third RFID antenna exposed on the bottom side of the substrate, said second and third RFID antennas being spaced apart from one another and being in operative communication with one another.

According to an aspect, a smart label for storing transceiver configuration data and/or identification information, and for programming a network transceiver is provided. The smart label includes: a substrate having a top side and a bottom side, said bottom side being configured to secure to a body of the network transceiver; an RFID device secured to or embedded in the substrate, said RFID device having RFID memory for storing identification information and/or configuration data; a first RFID antenna exposed on the top side of the substrate, said first RFID antenna being in operative communication with the RFID device; a second RFID antenna exposed on the bottom side of the substrate, said second RFID antenna being in operative communication with the RFID device, second RFID antenna being spaced apart from one another.

According to an aspect, a smart label for repeating transceiver configuration data and/or identification information, and for programming a network transceiver is provided. The smart label includes: a substrate having a top side and a bottom side, said bottom side being configured to secure to a body of the network transceiver; an RFID repeater for relaying RFID signals to and from predetermined positions on the top and the bottom surfaces of the substrate, said RFID repeater comprising a first RFID antenna exposed on the top side of the substrate and a second RFID antenna exposed on the bottom side of the substrate, said first and second RFID antennas being spaced apart from one another and being in operative communication with one another.

According to an aspect, a smart label for repeating transceiver configuration data and/or identification information, and for programming a network transceiver is provided. The smart label includes: a substrate having a top side and a bottom side, said bottom side being configured to secure to a body of the network transceiver; an RFID repeater for relaying RFID signals to and from predetermined positions on the top and the bottom surfaces of the substrate, said RFID repeater comprising one RFID antenna wherein a first repeater antenna portion is exposed on the top side of the substrate and a second repeater antenna portion of said RFID antenna is exposed on the bottom side of the substrate, wherein said bottom side RFID repeater antenna second portion may be configured differently from said top side RFID repeater antenna first portion.

According to an aspect, a dual antenna port RFID memory device for storing configuration data and/or identification information, and for programming a network transceiver is provided. The dual antenna port RFID memory device can be configured as an integrated circuit and includes: at least two independent RFID antenna ports; at least two independently programmable memories each connected to one said port wherein each said memory is addressable using a unique TID or UID identifier; a means to attached and or connect said IC to a substrate.

According to an aspect, said dual antenna port RFID memory device is configured with a controller interface, wherein a controller can be configured to read, write and program data in said independent memories.

According to an aspect, a dual memory RFID memory device for storing configuration data and/or identification information, and for programming a network transceiver is provided. The dual memory RFID memory device can be configured as an integrated circuit and includes: a single RFID antenna port; at least two independently programmable memories each connected to a said port wherein each said memory is addressable using a unique TID or UID identifier; a means to attached and or connect said IC to a substrate.

According to an aspect, said dual memory RFID memory device is configured with a controller interface, wherein a controller can be configured to read, write and program data in said independent memories.

According to an aspect, a host device for programming a network transceiver is provided. The host device includes a network transceiver interface and an RFID antenna positioned proximate said network transceiver interface for communicating with an RFID device provided in said network transceiver.

Other systems and methods to program RFID transceivers, barcode labels and RFID devices are described herein. Other configurations using external RFID readers and/or host RFID reader also are described in embodiments herein, for example systems and methods to program other cable connectors, POE and other pluggable devices.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
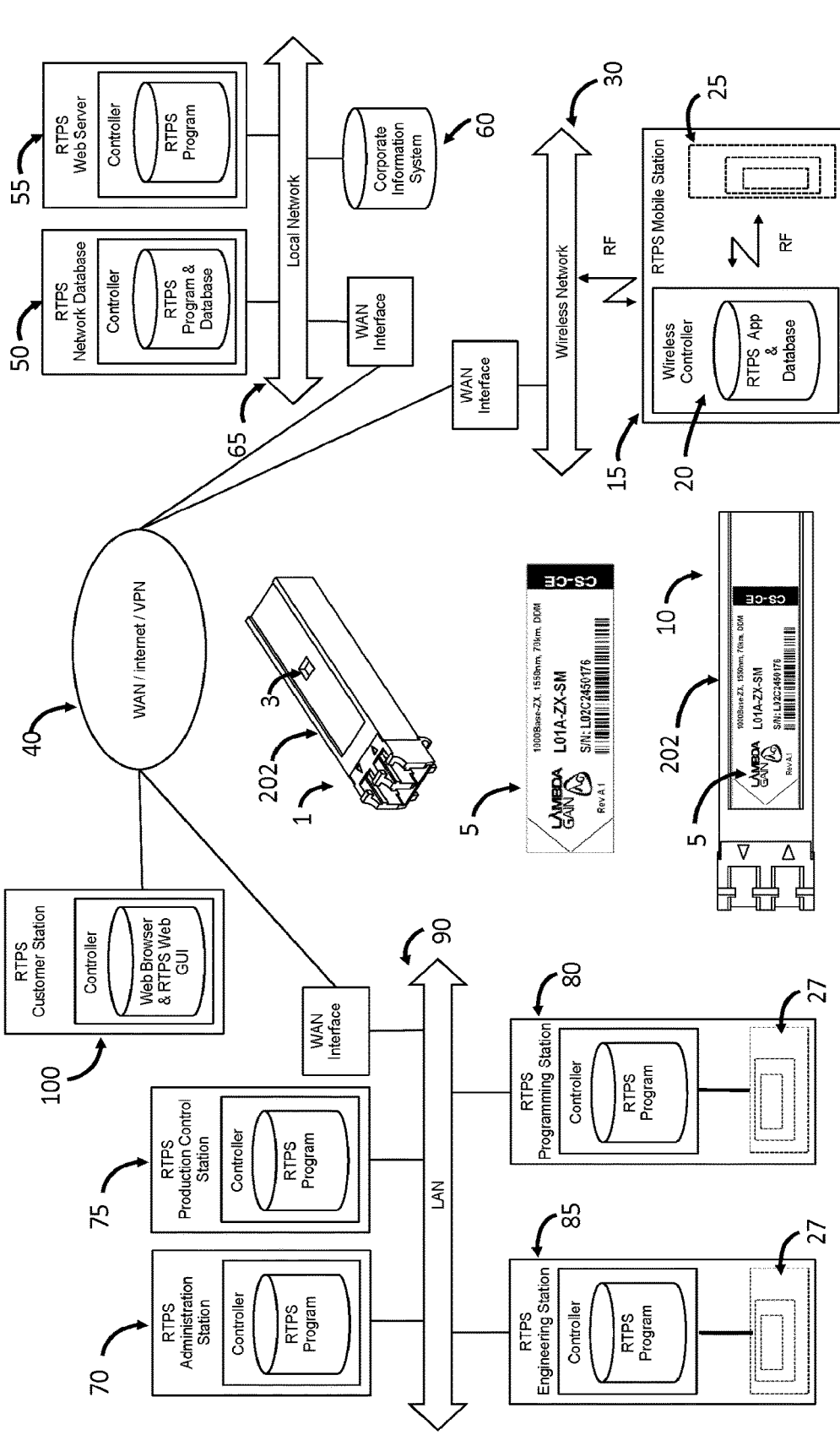
FIG. 1 is a schematic illustrating an exemplary RFID transceiver programming system (RTPS), according to an embodiment.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Various embodiments are described hereinafter with reference to the figures. It should be noted that the figures are not drawn to scale, and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with an embodiment is not necessarily limited to that embodiment and can be practiced in any other embodiments even if not so illustrated.

In some embodiments, a programming system to program pluggable transceivers using RFID includes: an RFID transceiver provided with a controller and: 1) at least one internal RFID reader and antenna, and corresponding RFID interface and or 2) at least one RFID memory and RFID antenna, and a corresponding RFID interface, wherein the RFID transceiver housing can be configured to provide said RFID interface, and wherein the RFID transceiver controller can be configured to transmit and receive RFID data therethrough, and wherein the controller can be configured to read RFID data from an RFID reader and or memory and to program the RFID transceiver to a desired operating configuration; 3) a smart label configured with at least one RFID memory used to store RFID data and or with an RFID repeater used to transmit and receive RFID data from a first interface to a second interface; and 4) an external RFID reader configured with an RFID interface used to transmit and receive RFID data to an RFID transceiver RFID interface and or to an smart label positioned proximate to said external RFID reader RFID interface, wherein the external RIFD reader can be configured to store RFID data and to program an RFID transceiver and or smart label with RFID data, and wherein said RFID data can be used by an RFID transceiver controller to program the RFID transceiver to a desired operating configuration.

For example, a RTPS can be used to program an MSA SFP+ transceiver host interface EEPROM memory defined in a standard and or a proprietary specification using RFID, wherein the SFP+ can be adapted with an RFID memory, antenna and interface, and wherein the SFP+ EEPROM memory can be programmed by the controller using identification and configuration RFID data received from the RTPS external RFID reader. The RTPS can also program pluggable transceiver memories that are not defined by an MSA specification, such as to configure an optical transceiver micro-controller IC or FPGA IC or ASIC non-volatile memories or registers and are manufacturer specific. In addition, the RTPS can also be used to configure RFID transceivers to perform tests and diagnostics such as to monitor, log and report pluggable transceiver performance, including service level and network performance, and to read back the test and diagnostics results data.

In some embodiments, the external RFID reader can comprise a computer system, such as a desktop Personal Computer (PC) configured with an operating system, a virtual machine with a virtualization OS, or other computing device, and can include: a processor configured to execute the RTPS program; a memory configured to store RFID data and to execute the RTPS program; at least one data communications network interface; and a pluggable external RFID reader device providing a standard computer electrical interface and RF interface for reading and programming RFID devices, for example a detachable hand held device configured to read and write smart labels, RFID tags and cards, NFC tags and cards, etc.

In some embodiments, the external RFID reader can comprise a mobile device such as a smartphone, tablet or laptop, or other computing device, and can include: a processor configured to execute the RTPS program wherein the RTPS program can be adapted to execute on the processor and operating system (e.g. referred to as the "RTPS App"); a memory configured to store at least RFID data and to execute the RTPS App; at least one wireless communications network interface; and an integrated RFID reader and RF interface for reading and programming RFID devices. For example, the external RFID reader can comprise a smart phone with a standard NFC and RFID reader/writer and interface configured to read and write smart labels, RFID cards and tags, NFC cards and tags, etc.

In some embodiments, the external RFID reader RF interface can be configured with optimized RF and physical interfaces to mate with at least one RFID transceiver RFID interface and or smart label RFID interface, wherein the optimized RFID interface can preferably be detachably connected to the external RFID reader.

In some embodiments, the RF interface can be adapted with an external RFID repeater configured with optimized RF and physical interfaces to mate with at least one RFID transceiver RFID interface and or smart label RFID interface and the mobile wireless controller RF interface, wherein the optimized RFID interface can be detachably connected to the mobile wireless controller RF interface.

In some embodiments, the external RFID reader can be configured to read, write and program data, such as RFID data, to a plurality of RFID devices and RFID device types positioned proximate to its RFID interface.

For example, the RTPS external RFID reader can be configured to detect a plurality of RFID devices located within its RFID interface read range and to program each compatible device individually, and for example to detect response collisions between multiple devices located within the read range and to manage those devices and responses to program each compatible device individually to a desired configuration. For example, the external RFID reader can be configured to read/write/program identification and configuration RFID data to SFP+, QSFP28 and CFP2 MSA transceiver types adapted with RFID interfaces and or associated smart labels, and for example it can be configured to read and program RFID data into the RFID transceiver RFID memory and an attached smart label RFID memory positioned proximate to the RFID interface.

In some embodiments, the RTPS program can be configured with functionality to manage and program RFID transceivers using RFID data, such as for example system administration, production control, production and mobile programming, engineering, and customer support functions. In an embodiment, the RTPS program can be configured to retrieve and store said RFID data in an RTPS database, and wherein the RTPS program can be configured to receive and transmit RFID data to a network, and wherein the RTPS program can be configured to receive and transmit identification and configuration RFID data to an RFID transceiver and or smart label and or another RFID device using an RFID interface.

In some embodiments, the external RFID reader and RTPS program can be configured with a graphical user interface (GUI) to enable an operator to control the RTPS program functions.

In some embodiments, the RTPS program can be configured to execute on at least one controller, wherein the controller can be configured to receive and transmit RFID data to a local RTPS database and or an RTPS network database connected to a network.

In some embodiments, the RTPS program can be configured to receive and transmit RFID transceiver production data from a corporate information system connected to a network, wherein said production data can be used to identify, configure and program and RFID transceivers and smart labels, wherein the RTPS program can be configured to create, manage and store corresponding RFID data using said production data.

In some embodiments, the external RFID reader and RTPS program can be configured to acquire geographic or global or GPS and or time of day location data from a network, and to program RFID transceivers and smart labels with said location data, for example said location data can be used to locate, track, configure, activate and manage RFID transceivers.

In some embodiments, an ejector or handle can be secured relative to RFID transceiver housing. The ejector or handle can be configured with an RFID interface, wherein the ejector external RFID interface can be positioned at least partially protruding from the RFID transceiver housing when the RFID transceiver is installed in a host system transceiver interface port. In such embodiments, said RFID transceiver internal RFID memory and antenna can be configured to be in communication with said ejector RFID interface, and wherein the internal RFID memory and antenna can be configured to be in communication with the external RFID reader RFID interface positioned proximate to said ejector external RFID interface, and wherein the external RFID reader can be configured to program the internal RFID memory using said ejector RFID interface to a desired operating configuration using RFID data.

In some embodiments, an RFID memory and antenna can be embedded in an electrical or optical cable connector housing and to provide a connector first RFID interface, wherein said cable connector RFID memory can be programmed with RFID data using an external RFID reader, or an RFID transceiver internal RFID reader, positioned proximate to said cable connector first RFID interface, and wherein said RFID data can be used to program an RFID transceiver to a desired configuration. In such embodiment, the RFID transceiver housing network interface connector can be adapted with a network connector second RFID interface configured to communicate with said cable connector first RFID interface, and wherein the RFID transceiver controller can be adapted with an internal RFID reader and antenna configured to read and write RFID data through said cable connector first RFID interface and said network connector second RFID interface, and wherein the controller can be configured to program the RFID transceiver to a desired operating configuration using RFID data read from said cable connector RFID memory. In an embodiment, the controller can be configured to program RFID data into said cable connector RFID memory.

In some embodiments, the external RFID reader controller can be configured with a pluggable transceiver interface port or cage (e.g. an MSA or other standard interface or proprietary pluggable transceiver interface port), wherein said transceiver interface port can be adapted with an internal RFID reader and RFID antenna to provide an RFID interface (e.g. a "host RFID reader"), and wherein said RFID transceiver interface port can be configured to house and operate a pluggable or network transceiver or an RFID transceiver, and wherein the external RFID reader controller and host RFID reader and RTPS program can be configured to read, write and program identification and configuration data to said pluggable transceiver or RFID transceiver host interface EEPROM memory, and to read, write and program identification and configuration RFID data to said RFID transceiver RFID memory and smart label using said RFID transceiver interface port configured with an internal RFID reader and antenna.

In some embodiments, a smart label can be configured with an RFID repeater, and can be referred to as a repeater smart label.

In some embodiments, a smart label can be configured with an RFID repeater and an RFID memory configured to store RFID data and can be connected to said RFID repeater, and can be referred to as a smart label.

In some embodiments, a smart label can be configured with an RFID repeater and an separate RFID memory, configured to store RFID data, and an RFID antenna, wherein said isolated RFID memory and antenna may not be connected to said RFID repeater, and can be referred to as a tagged smart label.

In some embodiments, a smart label can be configured with an RFID memory configured to store RFID data and an RFID antenna, wherein said smart label can be configured to be not externally programmable once it is installed.

In some embodiments, a smart label can be configured without an RFID memory and antenna, wherein said smart label can be configured with printed RFID data, and can be referred to as a printed smart label.

In an embodiment, an RFID memory device can be configured with at least two independent RFID antenna interface ports, RF receivers, TIDs/UIDs and associated memories, and at least one controller interface port configured enable a controller to read, write and program RFID data in both said memories.

In an embodiment, an RFID memory device can be configured with at least one RFID antenna interface port and RF receiver and two independent TIDs/UIDs and associated memories, and at least one controller interface port configured enable a controller to read, write and program RFID data in both said memories.

In summary, the RTPS can be configured to provide at least the following:

Operating at least one controller and mobile wireless controller and RFID interface to identify, select, and program a plurality of RFID devices and types positioned within the read range, Reading and writing at least RFID data in an RTPS database, wherein the RTPS database can be a local database, for example a database stored in the controller memory, and or a network database, for example a database stored on a network storage device, Receiving and transmit RFID transceiver production data from an external system connected to a network, Production control functions, such as;

Processing production data and RFID data, such as;

Importing production workorder data,

Creating workorder and report RFID data,

Importing finished good, assembly and barcode label identification data, configuration data and programming instruction data, Creating programming instruction RFID data, Creating configuration RFID data, Importing smart label print lists and printing labels, Exporting workorder report data, Exporting RFID transceiver finished good programmed identification and configuration RFID data, Exporting RFID transceiver assembly programmed identification and configuration RFID data, Programming functions, such as;

Executing workorder RFID data from an RTPS database, reading programming instruction, identification and configuration RFID data from an RTPS database, receiving location data and merging the location data identification and configuration RFID data, reading RFID transceiver and smart label RFID data using an RFID interface, selecting RFID devices corresponding to the work-order, saving selected RFID devices programmed identification and configuration RFID data in an RTPS database, executing programming instruction RFID data to program identification and configuration RFID data into selected RFID devices using an RFID interface, reading programmed identification and configuration RFID data using an RFID interface and saving said programmed RFID data in an RTPS database, displaying, updating and saving workorder and workorder report RFID data in an RTPS database, Engineering functions, such as;

Managing programming instruction RFID data consisting of least;

RFID transceiver finished good programming instruction data,

RFID transceiver assembly programming instruction data, smart label programming and printing instruction data.

Creating, editing and managing identification and configuration RFID data, and storing said RFID data in the RTPS database, such as;

RFID transceiver finished good identification and configuration data,

RFID transceiver finished good programmed identification and configuration data, RFID transceiver assembly programmed identification and configuration data, Reading and writing identification and configuration RFID data to the RFID transceiver and the smart label RFID memories using an RFID interface, Reading and writing configuration data to the RFID transceiver host interface memory using said host RFID transceiver interface (e.g. programming an MSA transceiver EEPROM memory using the host interface), Reading and writing data to the host RFID transceiver interface memory and to the RFID transceiver and or smart label RFID memories using a the host RFID transceiver interface adapted with an internal RFID reader, Testing RFID transceiver workorders, programming instructions, identification and configuration RFID data, and RFID transceiver programming, Viewing and editing identification and configuration RFID data using a GUI, including functions to create, edit, save, process, and test RFID binary data and MSA host interface EEPROM binary identification and configuration data, and including a data interpreter/translator to convert said RFID binary data and EEPROM binary data to readable text, graphical or other formats, and data presentation templates, Manage RFID transceiver identification and configuration RFID data security and transmission features for example RFID device access passwords, RFID workorder authentication, RFID configuration licensing, RFID data encryption and keys, RFID data error correcting codes and encoding, Control third part test equipment to perform automated RFID transceiver functional and performance tests.

System administration functions, such as;

creating and managing RTPS users, for example operators, engineers, administrators, etc., managing user access profiles and passwords, managing the RTPS programs and database, etc.

Web and application server functions, such as;

Providing a plurality of external RTPS customer functions and web interfaces, sessions and applications, such as hosting a private or public secure website to enable the following;

a corporate information system to share up-to-date account-specific data with customers such as inventory, orders, credit status, invoices, product, license, account, support, etc. data, and wherein each customer portal can be configured "see" only those products and services relevant to their contexts defined by their accounts, and a plurality of customer web sessions to enable selecting, ordering, purchasing and downloading RFID data and RFID transceiver and smart label shipping data including; receiving production data and or RFID data, such as workorders, identification and configuration data, programming instructions, data files, digital media data files, and RFID transceiver device and RFID data order data such as purchase orders, receipts and shipping data, etc., from a corporate information system, and downloading customer support technical documentation digital media data files and other data, and Hosting a plurality of internal RTPS functions and web interfaces, sessions and applications.

In some embodiments, identification and configuration RFID data can be programmed into an RFID transceiver RFID memory and or a smart label RFID memory, and wherein said RFID data can be stored in an RTPS database, for example said RFID data can include at least one of the following:

MSA and or other standard and or proprietary pluggable transceiver configuration data, for example manufacturer, part number (e.g. product equipment code), serial number, wavelength, alarm thresholds, etc. and used to program, configure, operate and or manage a pluggable transceiver and or RFID transceiver;

IC configuration data used to program an ASIC, FPGA, microcontroller, microprocessor, etc. memory or register;

GPS location data;

time of day data;

controller, processor or programmable device programming data, for example initialization, boot, operating or application program data;

network address or URL address data;

memory address pointer data that point to memory address locations within the pluggable transceiver non-volatile memory where the actual programming information or programmed information is stored;

program configuration and installation data used to install software or firmware programs such as operating system programs, programmable logic device programs, application programs, etc.;

RFID transceiver hardware and software compatibility data;

RFID label RF configuration data;

RFID memory configuration data;

RFID programming information version data;

RFID configuration authentication or licensing data;

RFID transceiver initialization status data;

error correcting codes data;

encryption key data;

password data;

test and diagnostic program data files and data, etc.

As can be appreciated, an RFID transceiver or smart label or other RFID device having its RFID memory programmed using RFID data can be said to be in a programmed or desired operating configuration. It should be noted that an RFID memory can be configured to store additional data, for example user data, etc.

The following describes systems, apparatus and methods used to program and configure network and pluggable transceivers and smart labels and other devices using RFID. Exemplary configurations of an RTPS for programming pluggable and network transceivers will now be described, but it can be appreciated that these examples represent but a few of many possible RTPS architectural configurations and implementations.

With reference to FIG. 1, an exemplary embodiment of an RTPS architecture, components and interfaces, is shown. The illustrated embodiment of the RTPS architecture includes: RFID transceiver 1 assembly (e.g. "RFID transceiver 1"), wherein RFID transceiver 1 can be configured with either an RFID reader RFID interface 3 or an RFID memory RFID interface 3 (e.g. RFID interface 3 is an aperture); smart label 5, wherein smart label 5 can be configured with printed identification data used to identify an assembly or finished good, and wherein smart label 5 can be configured with at least one RFID memory containing at least identification RFID data and an RFID interface; RFID transceiver 10 finished good (e.g. "RFID transceiver 10"), wherein RFID transceiver 10 comprises RFID transceiver 1 assembly and smart label 5 attached to RFID transceiver 1 RFID interface 3; and RTPS mobile station 15 configured with mobile wireless controller 20 (wireless controller 20) and the RTPS App and RFID interface 25 (e.g. an external RFID reader 15), wherein the wireless controller 20, RTPS App and RFID interface 25 can be configured to read, write and program RFID data to at least one selected RFID device of a plurality of RFID devices located proximate to RFID interface 25 and within the read range, and to program the selected RFID device with RFID data defining a desired configuration.

For example, the RTPS mobile station 15 can be configured to program an RFID transceiver 1, 10 devices and smart label 5 devices with identification RFID data and configuration RFID data defining a desired operating configuration. It should be noted that in some embodiments, said smart label 5 may be configured without an RFID memory, for example a repeater smart label 5 or an EMI suppressor smart label 5 or a printed smart label 5 label may be configured without an RFID memory, and wherein at least the identification RFID data can be printed on said smart label 5.

In some embodiments, the RTPS mobile station 15 can be configured with an optical character reader (e.g. to read a standard barcode, QR code, text, etc., using OCR), wherein the RTPS App can be configured to read at least the identification RFID data from said smart label 5 using said OCR and use said identification RFID data to program an RFID transceiver to a desired configuration.

In some embodiments, the external RFID repeater can be configured with optimized RF and physical interfaces to communicate with at least the RFID transceiver 1, smart label 5, RFID transceiver 10 and smart label 5 devices and their RFID interfaces and the wireless controller 20 integrated RFID interface, for example RFID interface 25 can be configured as an external RFID repeater and used to enable RFID communications between an external RFID reader wireless controller 20 RFID interface, such as a smart phone, and an RFID transceiver 10 and or a smart label 5 RFID interface.

In the present embodiment, wireless controller 20 and RTPS App and RFID interface 25 can be configured to read, write and program RFID data to any one of a plurality of compatible RFID devices located proximate to RFID interface 25. In the present embodiment, RFID interface 25 can be configured to read, write and program RFID data to at least one of a plurality of different RFID transceiver 1 and 10 and smart label 5 configurations, form factors and footprints. In an embodiment, the RFID interface 25 can be configured with at least one target or target area or target outline used to position an RFID device, for example RFID transceiver 1 and 10 and smart label 5 device, during operation, for example during programming.

For example, wireless controller 20 can be configured to read, write and program RFID data to the RFID transceiver 10 embedded RFID memory and smart label 5 embedded RFID memory positioned proximate to the RFID interface 25 RFID transceiver target area, and wherein the controller can be configured to individually read, write and program the RFID transceiver 10 RFID memory with identification and configuration RFID data and the smart label 5 RFID memory with identification and or configuration RFID data. In other examples, RFID transceiver 1 and 10 can be configured in SFP+, QSFP, CFP2, etc., MSA pluggable transceiver form factors and RFID interface 25 can be configured to program each MSA form factor, and wherein smart label 5 can be configured for SFP+, QSFP, CFP2, etc., MSA pluggable transceiver product label form factors and RFID interface 25 can be configured to program each type of MSA smart label 5 form factor.

In the present embodiment, wireless controller 20 and RTPS App can be configured to store a plurality of RFID data, for example data used to manage and program a plurality of RFID transceiver 1, smart label 5 and RFID transceiver 10 RFID devices, in an RTPS database wherein the RTPS database program and data can be programmed within the wireless controller 20 memory (e.g. a local RTPS database). In the present embodiment, each RFID device and corresponding RFID data can be identified and stored in at least an RTPS database 20 using at least a unique part number. In another embodiment, each RFID device and corresponding RFID data can be identified and stored in an RTPS database using at least said RFID device part number and a unique serial number.

For example, identification and configuration RFID data used to program a plurality of different RFID transceiver 1, 10 device part numbers and serial numbers using the RTPS App can be identified and stored in the RTPS mobile station 15 wireless controller 20 local RTPS database (e.g. a smart phone non-volatile memory).

In some embodiments, the wireless controller 20 and the RTPS App can be configured to transmit and receive RFID data to a wireless communications network 30 and a wide area network 40, and to read and write RFID data to an RTPS network database 50 connected to a network, such as local and wide area networks 65 and 40. In the present embodiment, the RTPS mobile station 15 wireless controller, RTPS App and RTPS local database 20 and the RTPS network database 50 controller and RTPS program can be configured to manage and store a plurality of RFID data used to program a plurality of RFID devices. In the present embodiment, the RTPS mobile station 15 RTPS App and RTPS local database and RTPS network database 50 RTPS program can be configured to periodically synchronize their RFID data stored in the RTPS local database 20 and the RTPS network database 50, wherein said RTPS local and network databases 20, 50 can be automatically updated with the most current or last version of RFID data stored in said RTPS databases 20, 50. For example, the RTPS local database 20 can be synchronized with the RTPS network database 50 by transmitting and receiving database change data notifications and vice versa, and or by uploading and downloading a copy of an RTPS database in a data file through a network, etc., as known in the art.

In some embodiments, the RTPS App and RTPS local database can be configured to store a plurality of said RFID data and a plurality of workorder RFID data, wherein in the RTPS App can be configured to enable selecting, downloading and executing said workorder RFID data and associated RFID data from the RTPS network database 50, and wherein said workorder RFID data and associated RFID data can be used to program RFID transceivers 1, 10 and smart labels 5.

In some embodiments, the RTPS mobile station 20 can be configured to acquire or receive geographical location or global positioning data, and time of day (TOD) data, from a network.

In some embodiments, RTPS mobile station 20 can be configured to read, write and program third party RFID devices positioned proximate to RFID interface 25. For example, to read RFID or NFC tags containing global positioning or geographical location data, and to read RFID or NFC cards containing credit card or debit card or personal identification card or credentials card data.

In the present embodiment, RFID transceiver 1 and smart label 5 can each be configured with at least one RFID memory programmed with partial identification RFID data, wherein said partial identification RFID data can be configured to at least identify said RFID memory device (e.g. with a tag or unique identification number (TID or UID), and wherein said partial identification RFID data can be read from RFID transceiver 1 and smart label 5 using RFID interface 25. In some embodiments, said RFID memory can be configured to contain partial identification RFID data to at least identify the RFID memory device part number. In some embodiments, said RFID memory can be configured to contain partial identification RFID data to at least identify the RFID memory device data organization, compatibility, etc. that can be used to program and operate an RFID memory device in an RFID transceiver 1,10 or smart label 5.

In the present embodiment, RFID transceiver 1 can be configured with an internal RFID memory, wherein said RFID memory can be programmed with RFID data to at least identify RFID transceiver 1 assembly, and wherein said identification RFID data can be configured to contain at least the RFID transceiver 1 assembly serial number. In some embodiments, said RFID memory can be configured to also contain identification RFID data to identify at least the assembly part number and serial number, etc. and that can be used to identify and program an RFID device.

In the present embodiment, a tagged repeater smart label 5 and smart label 5 can be programmed with RFID data to at least identify an RFID transceiver 1 assembly and or an RFID transceiver 10 finished good, wherein said identification RFID data can contain at least said RFID transceiver 1 assembly part number and serial number data and or at least said RFID transceiver 10 finished good part number and serial number data. For example the RFID data PN and SN identification data can be configured to be the same as the PN and SN product identification data printed on the finished good smart label 5. In an embodiment, the tagged repeater smart label 5 and smart label 5 can be programmed with RFID data to at least identify the smart label 5 device and RFID circuit configuration, for example; smart label device PN and SN data, tagged repeater smart label 5 device and smart label 5 circuit device configuration data, etc.

In the embodiment illustrated in FIG. 1, RFID transceiver 1 can be configured with an internal RFID reader and or RFID memory wherein an assembly smart label 5 (e.g. not shown in FIG. 1) can be attached to its housing 202, wherein said assembly smart label 5 can be used to identify RFID transceiver 1 assembly, and wherein assembly smart label 5 can be configured with an RFID memory that can be programmed with RFID transceiver 1 assembly identification RFID data (e.g. PN and SN data). For example, said assembly smart label 5 can be attached to the RFID transceiver 1 housing and can be used temporarily to identify the assembled device during the manufacturing process using RFID or OCR methods, said assembly smart label 5 can be removed when converting the assembled device into a finished good device and can be replaced with a finished good smart label 5 during the RFID transceiver manufacturing and or programming process.

In the present embodiment, the finished good tagged repeater smart label 5 can be configured with identification RFID data containing at least said RFID transceiver 10 finished good part number and serial number identification RFID data, and used to identify said tagged repeater smart label 5 and to program RFID transceiver 10 finished good to a desired operating configuration.

In the present embodiment, the finished good smart label 5 can be configured with identification and configuration RFID data containing at least said RFID transceiver 10 finished good part number and serial number identification RFID data and configuration RFID data used to program RFID transceiver 10 finished good to a desired operating configuration.

In the present embodiment, RFID transceiver 10 can be configured with an internal RFID memory that can be programmed using a repeater smart label 5 or tagged repeater smart label 5 with identification and configuration RFID data containing at least said RFID transceiver 10 finished good part number and serial number identification RFID data and configuration RFID data to program RFID transceiver 10 to a desired operating configuration.

In the present embodiment, RFID transceiver 10 can be configured with an internal RFID reader and smart label 5, wherein smart label 5 can be programmed with identification and configuration RFID data containing at least said RFID transceiver 10 finished good part number and serial number identification RFID data and configuration RFID data used to program RFID transceiver 10 to a desired operating configuration.

In the present embodiment, RFID transceiver 1, 10 and smart label 5 tagged repeater smart label 5 can be programmed and reprogrammed using RTPS mobile station 15. It should be noted that in some embodiments, RFID transceiver 10 and or smart label 5 can be configured such that they can not be reprogrammed. For example, RFID transceiver 10 can be programmed once during the manufacturing process wherein aperture 3 can be covered with finished good smart label 5 configured with an external EM suppressor substrate, wherein said finished good smart label 5 does not permit RFID communications between the RTPS mobile station 15 and an RFID memory embedded in said smart label 5 or in said RFID transceiver 10. For example, RFID transceiver 10 can be programmed once during the manufacturing process and the RFID memory embedded in said smart label 5 or in said RFID transceiver 10 can be configured to be read only.

In the present embodiment, the methods to identify an RFID transceiver 1 assembly can depend on the implementation of an assembly or finished good RFID interface and manufacturers preferred manufacturing practices. For example, the RFID transceiver 1 RFID interface can be configured with an internal RFID memory or an internal RFID reader and RFID antenna, for example wherein the RFID transceiver 1 can be configured and identified using any one of the following methods:

RFID transceiver 1 can be configured with an internal RFID memory programmed with assembly identification RFID data, or RFID transceiver 1 can be configured with an internal RFID memory containing partial RFID data (e.g. only a UID or TID) and an assembly smart label 5 programmed with the assembly identification RFID data, or RFID transceiver 1 can be configured with an internal RFID reader and an assembly smart label 5 programmed with assembly identification RFID data, for example a temporary assembly smart label 5 attached to another sidewall of housing 202 and programmed with the assembly part number and serial number and used to identify said transceiver assembly during the manufacturing process, or RFID transceiver 1 can be configured with an internal RFID memory containing identification RFID data and a printed smart label 5, for example said printed smart label 5 can be configured without an RFID memory and with printed assembly identification RFID data, or RFID transceiver 1 can be configured with an internal RFID memory containing partial RFID data and a printed smart label 5 containing identification RFID data, etc.

In other examples, the RFID transceiver 10 can be configured and identified using any one of the following methods:

RFID transceiver 10 can be configured with an internal RFID memory containing identification and configuration RFID data used to identify and program RFID transceiver 10 finished good to a desired operating configuration and a finished good tagged repeater smart label 5 covering aperture 3, wherein said smart label 5 can be programmed with RFID data used to at least identify said programmed configuration of RFID transceiver 10 finished good, or RFID transceiver 10 can be configured with and internal RFID reader and a finished good smart label 5 covering aperture 3 programmed with RFID data used to identify and to program RFID transceiver 10 finished good to a desired operating configuration, or RFID transceiver 10 can be configured with an internal RFID memory containing RFID data to identify and to program RFID transceiver 10 finished good to a desired operating configuration and a finished good repeater smart label 5 covering aperture 3 configured with printed RFID data used to identify an operating configuration of RFID transceiver 10 finished good, etc.

In another example, said identification and configuration RFID data can be read and written to RFID transceiver 1, 10 and smart label 5 on the production line, in work-in-progress (WIP), in inventory, in the supply chain, in transit, prior to installation, etc. using RTPS mobile station 15 wireless controller and RTPS App 20 and RFID interface 25, and or an external RFID reader configured to program RFID transceivers.

In the present embodiment, RTPS mobile station 15, wireless controller 20 and RTPS App and RFID interface 25 can be configured to provide RTPS mobile programming, storage and management functions used to program a plurality of RFID transceiver 1 assembly, smart label 5 and RFID transceiver 10 finished good devices, and other compatible RFID devices, using a plurality of RFID data.

In the present embodiment, the wireless controller 20 and RTPS App can be configured with a GUI to enable an operator to operate the RTPS mobile station 15 to program RFID transceivers 1 and 10 and smart label 5 devices and to manage RFID data. For example, the RTPS App and GUI can be configured to guide an operator through the RFID transceiver programming process and to minimize operator errors.

In the present embodiment, the RTPS App can be configured to enable an operator to at least list and select a plurality of workorder RFID data from RTPS database 20 or 50, and to execute a selected workorder RFID data to program an RFID transceiver 1 or 10 and or smart label 5 to a desired configuration defined by said selected workorder RFID data. For example, in some embodiments, the RTPS mobile programming function can be configured to enable an operator to list, select, view, download and execute workorder RFID data and associated RFID data from the RTPS database 50.

In an embodiment, the wireless controller 20 and RTPS App can be configured to receive workorder RFID data from a remote controller connected to a network, and to execute said workorder RFID data to program RFID transceiver 1 or 10 and or smart label 5 to a desired configuration defined by said selected workorder RFID data. For example, configured to receive RFID data from an automated RFID programming system or from a remote RFID programming station controller operate by an operator and connected to a network.

For example, said workorder RFID data can be configured to contain at least the following data:

a unique workorder identification data;

an RFID transceiver 10 finished good part number data;

an RFID transceiver 1 assembly part number data or RFID transceiver 10 finished good part number data;

a quantity data describing the number of RFID transceiver 10 finished goods to program.

In some embodiments, a workorder RFID data can also contain a unique workorder identification data for each RFID transceiver 10 finished good identified by said workorder RFID data, for example said identification data can be a serial number and or a license number, etc.

In some embodiments, a workorder RFID data can also contain a programmed quantity data, wherein the RTPS App can be configured to increment or decrement said programmed quantity data by 1 (one) for each RFID transceiver 10 identified in said workorder RFID data and programmed.

In some embodiments, a workorder RFID data can also contain workorder status data, wherein said workorder status data indicates said workorder RFID data operational and administrative states, for example workorder status data such as; valid/invalid, new, active or in-progress, locked or in-use, and completed states.

In some embodiments, a workorder RFID data can be encrypted and can only be unencrypted by the RTPS App, wherein said RTPS App can be configured with a private encryption key data securely stored in the wireless controller 20 memory, wherein said RTPS App can be configured to automatically unencrypt a selected workorder RFID data using said private encryption key data.

In some embodiments, the RTPS network database 50 can be configured to permit a first controller 20 and RTPS App to select a workorder RFID data when not in-use, and wherein RTPS network database 50 can be configured to deny a second controller 20 and RTPS App to select said workorder RFID data when in-use.

In some embodiments, a workorder RFID data can only be executed to program any RFID transceiver 10 finished good identified by said workorder RFID data once, and wherein a workorder RFID data can not be executed if all RFID transceivers 10 finished goods identified by said workorder RFID data have been programmed.

In some embodiments, the RTPS App can be configured with a workorder identification key RFID data securely stored in the wireless controller 20 memory, wherein said RTPS App can be configured to automatically validate a selected workorder identification RFID data using said workorder identification key RFID data, and to execute said selected workorder RFID data when said workorder identification RFID data is validated by the RTPS App, and to not to execute said selected workorder RFID data when said workorder identification RFID data is not valid.

In the present embodiment, the RTPS App can be configured to retrieve the programming instruction and configuration RFID data corresponding to a selected workorder RFID data from RTPS database 20 or 50, wherein said programming instruction and configuration RFID data can be defined or identified by at least the 1) RFID transceiver 10 finished good part number RFID data and 2) RFID transceiver 1 assembly part number data or RFID transceiver 10 finished good part number RFID data identified in said executed workorder RFID data. In the present embodiment, the RTPS App can be configured to program RFID transceiver 1 and 10 and smart label 5 to a desired configuration using said workorder RFID data, programming instruction RFID data and configuration RFID data retrieved from the RTPS database 20 or 50. In the present embodiment, the RTPS App can be configured to program RFID transceiver 1 and 10 and smart label 5 to a desired configuration using said workorder RFID data, programming instruction RFID data and configuration RFID data and using at least the finished good serial number identification RFID data read from a smart label 5 and or RFID transceiver 10 RFID memory. In the present embodiment, the RTPS App can be configured to program RFID transceiver 1 and 10 and smart label 5 to a desired configuration using said workorder, programming instruction and configuration RFID data and using at least the finished good part number and serial number identification RFID data read from a smart label 5 and or RFID transceiver 10 RFID memory. In some embodiments, the RTPS App can be configured to retrieve said programming instruction and configuration RFID data from RTPS database 20 or 50 using at least the 1) RFID transceiver 10 finished good part number data and serial number data and 2) RFID transceiver 1 assembly part number data or RFID transceiver 10 finished good part number data identified in said selected workorder RFID data.

In some embodiments, RFID transceiver 1 and 10 and smart label 5 can be configured to store workorder identification RFID data, and the RTPS App can be configured to automatically include or merge the selected workorder identification RFID data with the identification and configuration RFID data programmed into RFID transceiver 1 and 10 and smart label 5.

In some embodiments, a workorder RFID data can also identify the RFID transceiver 10 finished good part number data and version data, wherein said version data uniquely identifies a version of a configuration RFID data of said RFID transceiver 10 finished good part number, and wherein said part number configuration version may have a plurality of versions, and wherein the RTPS App can be configured to retrieve programming instructions and configuration RFID data for a given RFID transceiver 10 part number and version identification RFID data from RTPS database 20 or 50.

In the present embodiment, the RTPS App can be configured to select a RFID transceiver 1, 10 and smart label 5 using RFID interface 25 when said RFID device is programmed with identification RFID data that matches the identification RFID data specified by the selected workorder RFID. In some embodiments, the RTPS App can be configured to select said RFID device used to program RFID transceiver 1, 10 only when said RFID device part number and serial number identification RFID data matches the part number and serial number identification RFID data specified by the selected workorder RFID data. In some embodiments, said smart label 5 can be programmed with data to at least identify a smart label RFID memory device part number data and serial number data. For example, said smart label RFID memory device part number and serial number data can be used to identify said smart label 5 device and can be used to identify and program RFID transceiver 1, 10 and or smart label 5.

Note that the identification of pluggable transceiver assemblies and finished goods can typically be performed using a printed barcode label to identify the corresponding device part and or serial numbers, and wherein said label can be read using a printed barcode optical scanner/reader. Consequently, in some embodiments, a printed smart label 5 and optical reader can be used instead of RFID interface 25 or 27 to identify RFID transceiver 1 and 10 and smart label 5.

In some embodiments, smart label 5 can be configured with a printed barcode label, wherein said printed smart label 5 can be configured with printed data to at least identify a RFID transceiver 1 and 10, and wherein said printed identification RFID data contains at least contains said RFID transceiver 1 or 10 part number and serial number printed data. In some embodiments, said printed smart label 5 may not be configured with an RFID memory.

In some embodiments, the RTPS controller 20 and App can be configured with a printed barcode reader to read at least part number and serial number identification RFID data from said printed smart label 5, wherein the RTPS App can be configured to use said printed part number and serial number identification RFID data to program an RFID transceiver 1 and 10 to a desired configuration. For example, the wireless controller 20 can be configured as smart phone, wherein the RTPS App can be configured to use the camera and an OCR App to read printed part number and serial number RFID data from a barcode smart label 5, wherein the smart phone RTPS App can be configured to use this printed identification RFID data to program an RFID transceiver 1 or 10 using RFID interface 25.

As can be appreciated, the above described RTPS can be used to program network and pluggable transceivers and other devices using RFID.

A method of programming a pluggable transceiver configured with an internal RFID memory to a desired operating configuration will now be described according to an exemplary embodiment, wherein a RFID transceiver 1, a repeater or tagged repeater smart label 5 and the RTPS mobile station 15 can be used to produce an RFID transceiver 10 finished good programmed to a desired operating configuration.

The method can include the steps of: a) using the RTPS App to execute a workorder RFID data stored in RTPS database 20 or 50; b) reading at least identification RFID data from a finished good smart label 5 and selecting a finished good smart label 5; c) reading at least identification RFID data from RFID transceiver 1 and selecting an RFID transceiver 1; d) physically bonding the selected finished good smart label 5 and said RFID transceiver 1 together and covering aperture 3; and e) using RFID interface 25 and said smart label 5 to program said selected RFID transceiver 1 to a desired configuration using identification and configuration RFID data defined by said executed workorder RFID data to produce RFID transceiver 10 finished good programmed to a desired operating configuration.

For example, in the present embodiment, said identification and configuration RFID data can contain: at least the RFID transceiver 10 finished good part number and serial number identification RFID data; at least the RFID transceiver 1 assembly part number and serial number data; and at least the associated configuration RFID data stored in RTPS database 20 or 50.

In the present embodiment, at least said RFID transceiver 10 finished good serial number identification RFID data can be read from the selected finished good smart label 5 and at least said RFID transceiver 1 assembly serial number data read from RFID transceiver 1 assembly and used to program RFID transceiver 10. In another embodiment, at least said RFID transceiver 10 finished good part number and serial number identification RFID data can be read from the selected finished good smart label 5 and at least said RFID transceiver 1 assembly part number and serial number data can be read from RFID transceiver 1 assembly. In the present embodiment, said identification and configuration RFID data can be configured or formatted using the associated programming instruction RFID data stored in RTPS database 20 or 50, and wherein said associated programming instruction RFID data can be used to program said RFID transceiver 1,10 with said formatted identification and configuration RFID data to a desired operating configuration.

In an embodiment, said identification and configuration RFID data programmed into the RFID transceiver 1 internal RFID memory can also be at least partially written to said finished good smart label 5 using RFID interface 25. For example, smart label 5 can be configured as a tagged repeater smart label 5 wherein the RFID memory can be programmed with the RFID transceiver assembly 1 part number and serial number identification RFID data in step e).

For example, method includes the steps of: a) using the RTPS App to select and execute a workorder RFID data stored in RTPS database 20; b) using RFID interface 25 to read identification RFID data from a tagged repeater finished good smart label 5 and to select a tagged repeater finished good smart label 5; c) using RFID interface 25 to read identification RFID data from RFID transceiver 1 assembly smart label 5 and to select a RFID transceiver 1; d) physically bonding the selected tagged repeater finished good smart label 5 and said selected RFID transceiver 1 together covering aperture 3; and e) using RFID interface 25 to program selected RFID transceiver 1 and tagged repeater smart label 5 to a desired configuration, wherein RFID transceiver 1 can be programmed by writing identification and configuration RFID data to said RFID transceiver 1 internal RFID memory using said tagged repeater smart label 5 to produce RFID transceiver 10 finished good programmed to a desired operating configuration, and wherein the assembly smart label 5 can be subsequently removed from RFID transceiver 10.

In the present embodiment, a similar method can be applied to program an RFID transceiver 1 assembly configured with an internal RFID reader and using a finished good smart label 5 to produce an RFID transceiver 10 finished good programmed to a desired operating configuration.

The method can include the steps of: a) using the RTPS App to execute a workorder RFID data stored in RTPS database 20 or 50; b) reading at least identification RFID data from RFID transceiver 1 and selecting an RFID transceiver 1; c) reading at least identification RFID data from smart label 5 and selecting finished good smart label 5; and d) physically bonding the selected finished good smart label 5 and said RFID transceiver 1 together and covering aperture 3 to produce RFID transceiver 10 finished good programmed to a desired operating configuration using identification and configuration RFID data defined by said executed workorder RFID data, and wherein said identification and configuration RFID data is programmed in finished good smart label 5.

For example, in the present embodiment, said identification and configuration RFID data programmed in smart label 5 can contain: at least the RFID transceiver 10 finished good part number and serial number identification RFID data; and at least the associated configuration RFID data stored in RTPS database 20 or 50.

In the present embodiment, at least said RFID transceiver 10 finished good serial number identification RFID data can be read from the selected finished good smart label 5 and at least said RFID transceiver 1 assembly serial number data can be read from RFID transceiver 1 assembly. In another embodiment, at least said RFID transceiver 10 finished good part number and serial number identification RFID data can be read from the selected finished good smart label 5 and at least said RFID transceiver 1 assembly part number and serial number data can be read from RFID transceiver 1 assembly. In the present embodiment, said identification and configuration RFID data can be configured or formatted using the associated programming instructions stored in RTPS database 20 or 50, and wherein said associated programming instructions can be used to program said smart label 5 with said identification and configuration RFID data defining a desired operating configuration of RFID transceiver 10.

In an embodiment, said selected smart label 5 can be programmed with at least the identification RFID data read from RFID transceiver 1, wherein the part number and serial number identification RFID data read from RFID transceiver 1 in step b) can be written to finished good smart label 5 using RFID interface 25 in step c). In an embodiment, the selected smart label 5 configuration RFID data can be programmed or reprogrammed with the associated configuration RFID data stored in the RTPS database 20 or 50, wherein the RTPS App can be configured to compare the version of the configuration RFID data read from the selected smart label 5 with the version of the configuration RFID data stored in RTPS database 20 or 50, and program smart label 5 using the latest version of said configuration RFID data in step c).

For example, the method can include the steps of: a) using the RTPS App to execute a workorder RFID data stored in RTPS database 20; b) using RFID interface 25 to read identification RFID data from RFID transceiver 1 and to select a RFID transceiver 1; c) using RFID interface 25 to read identification RFID data from smart label 5 and to select finished good smart label 5 and to reprogram finished good smart label 5 with the RFID transceiver 1 assembly part number and serial number identification RFID data and the latest configuration RFID data from the RTPS database 50; and d) physically bonding the selected finished good smart label 5 and RFID transceiver 1 covering aperture 3 together to produce RFID transceiver 10 finished good programmed to a desired configuration, wherein said RFID transceiver 10 finished good can be automatically programmed using the latest identification and configuration RFID data stored in the selected finished good smart label 5.

In the present embodiment, a similar method can be applied to program an RFID transceiver 10 finished good configured with an internal RFID memory to produce an RFID transceiver 10 finished good with a new operating configuration using the RTPS mobile station 15.

The method can include the steps of: a) using the RTPS App execute a workorder RFID data stored in RTPS database 20 or 50; b) reading at least identification RFID data from RFID transceiver 10 and selecting an RFID transceiver 10; and c) using RFID interface 25 to program the selected RFID transceiver 10 to a desired configuration using identification and configuration RFID data defined by said executed workorder RFID data.

For example, in the present embodiment, said identification and configuration RFID data can contain: at least the RFID transceiver 10 finished good new part number identification RFID data; at least the original RFID transceiver 10 finished good part number and serial number identification RFID data; at least the original RFID transceiver 1 assembly part number and serial number RFID data; and at least the configuration RFID data stored in RTPS database 20 or 50 associated with the RFID transceiver 10 finished good new part number identification RFID data defining a new operating configuration.

In the present embodiment, at least said original RFID transceiver 10 finished good part number and serial number identification RFID data read from the selected finished good smart label 5 and or internal RFID memory. In the present embodiment, said identification and configuration RFID data can be configured or formatted using the associated programming instruction RFID data stored in RTPS database 20 or 50, and wherein said associated programming instruction RFID data can be used to program said RFID transceiver 10 with said formatted identification and configuration RFID data to a desired operating configuration.

In an embodiment, said identification and configuration RFID data programmed into RFID transceiver 10 can also be at least partially written to finished good smart label 5 using RFID interface 25. For example, smart label 5 can be configured as a tagged repeater smart label 5 wherein the RFID memory can be programmed with the RFID transceiver 10 new part number identification RFID data in step c).

For example, the method can include the steps of: a) using the RTPS App execute a workorder RFID data stored in RTPS database 20; b) using RFID interface 25 to read identification RFID data from RFID transceiver 10 and to select a RFID transceiver 10; and c) using RFID interface 25 to program selected RFID transceiver 10 and smart label 5 to a desired operating configuration, wherein RFID transceiver 10 can be programmed by writing identification and configuration RFID data to at least the RFID transceiver 10 internal RFID memory, and wherein said identification and configuration RFID data can be defined by said executed workorder RFID data.

In the present embodiment, a similar method can be applied to program an RFID transceiver 10 finished good configured with an internal RFID reader to produce an RFID transceiver 10 finished good with a new operating configuration using the RTPS mobile station 15.

The method can include the steps of: a) using the RTPS App to execute a workorder RFID data stored in RTPS database 20 or 50; b) reading at least identification RFID data from RFID transceiver 10 finished good smart label 5 and selecting RFID transceiver 10 finished good smart label 5; and c) using RFID interface 25 to program the selected RFID transceiver 10 finished good smart label 5 to a desired configuration, wherein said finished good smart label 5 can be programmed by writing identification and configuration RFID data to said smart label 5, wherein said identification and configuration RFID data can be defined by said executed workorder RFID data.

For example, in the present embodiment, said identification and configuration RFID data programmed in finished good smart label 5 can contain: at least the RFID transceiver 10 finished good new part number identification RFID data; at least the original RFID transceiver 10 finished good part number and serial number identification RFID data; at least the original RFID transceiver 1 assembly part number and serial number RFID data; and at least the configuration RFID data stored in RTPS database 20 or 50 associated with the RFID transceiver 10 finished good new part number.

In the present embodiment, at least said original RFID transceiver 10 finished good part number and serial number identification RFID data can be read from the selected finished good smart label 5. In the present embodiment, said identification and configuration RFID data can be configured or formatted using the associated programming instruction RFID data stored in RTPS database 20 or 50, and wherein said associated programming instruction RFID data can be used to program said RFID transceiver 10 smart label 5 with said identification and configuration RFID data defining a new desired operating configuration of RFID transceiver 10, and wherein said programmed identification and configuration RFID data contains at least said RFID transceiver 10 finished good new part number identification RFID data and associated configuration RFID data.

In an embodiment, RFID transceiver 10 can be programmed to a default operating configuration when the smart label 5 is removed from said RFID transceiver 10 aperture 3 and can be configured to be not reprogrammed or programmable. In another embodiments, RFID transceiver 10 can be programmed to a default operating configuration by removing smart label 5 covering aperture 3 and can then be programmed or reprogrammed using the methods described above.

In the present embodiment, the RTPS App can be configured to create a corresponding workorder report RFID data in RTPS database 20 or 50 when an workorder RFID data is executed. In the present embodiment, the RTPS App can be configured to retrieve said corresponding workorder report RFID data for an executed workorder RFID data from RTPS database 20 or 50 and to update said workorder report RFID data with the RFID transceiver programming status data and programming data for each RFID transceiver programmed using said selected workorder RFID data. For example, the workorder report RFID data can contain:

workorder identification data; workorder status data; programmed RFID transceiver 1 and or 10 part numbers and serial numbers and unprogrammed/in-progress/pass/fail/error programming status data, and programming data such as programmed identification and configuration RFID data and/original programmed identification and configuration RFID data, operator identification data and operator notes data, etc., and wherein each workorder report RFID data can be stored in the RTPS database 20 or 50. In an embodiment, the RTPS App can be configured to automatically log an operator username in said workorder report RFID data, and enable an operator to view workorder report RFID data, and to enter and save operator programming notes, text, data files, etc.

In an embodiment, the RTPS App can be configured to read back programmed identification and configuration RFID data stored in an RFID transceiver 1, 10 and or smart label 5 RFID memory prior to programming said RFID transceiver 1, 10 and or smart label 5 RFID memory, and to update the workorder report RFID data with said original programmed identification and configuration RFID data and store said workorder report RFID data and programming data in RTPS database 20 or 50.

In an embodiment, the RTPS App can be configured to read back identification and configuration RFID data stored in an RFID transceiver 1, 10 and or smart label 5 RFID memory after programming said RFID transceiver 1, 10 and or smart label 5 RFID memory and to update the workorder report RFID data with said programmed identification and configuration RFID data and store said workorder report RFID data and programming data in RTPS database 20 or 50.

In an embodiment, the RTPS App can be configured to automatically verify said programmed identification and configuration RFID data for programming errors, and to update the associated workorder report RFID data. In an embodiment, the RTPS App can be configured to notify the operator of said errors and to prompt the operator to select a) repeat programming or b) to abort programming the RFID device having said programming error, and to update the workorder report RFID data accordingly. For example, the RTPS App can verify that the RFID transceiver 1 internal RFID memory has been properly programmed by comparing the identification and configuration RFID data written to RFID transceiver 1 internal RFID memory and the programmed identification and configuration RFID data read back from RFID transceiver 1 internal RFID memory, or the RTPS App can be configured to read the error detection codes in the programmed identification and configuration RFID data read back from RFID transceiver 1 internal RFID memory.

In an embodiment, the wireless controller 20 and RTPS App can be configured to automatically acquire or receive data specifying the current geographic location or global positioning of wireless controller 20 from a network, such as a wireless or global positioning system network, wherein the RTPS App can be configured to automatically include or merge said location data with the identification and configuration RFID data programmed into RFID transceiver 1 and 10 and smart label 5 using the RFID interface 25.

In an embodiment, the wireless controller 20 and RTPS App can be configured to automatically acquire or receive data specifying the current TOD from a network, wherein the RTPS App can be configured to automatically include or merge said TOD data with the identification and configuration RFID data programmed into RFID transceiver 1 and 10 and smart label 5 using the RFID interface 25.

In an embodiment, the RFID transceiver 1 and 10 can be configured to store said identification and configuration RFID data programmed into the RFID memory at least partially in a non-volatile memory, for example selected RFID data can be copied from an RFID memory to an non-volatile memory by a controller upon initialization in a host device or system transceiver interface port, wherein said RFID transceiver 1 and 10 non-volatile memory can be configured to be read from the RFID transceiver 1, 10 host interface and or network interface. In an embodiment, the host system controller can be configured with a transceiver interface port to read said RFID data from said RFID transceiver 1, 10 host interface non-volatile memory using said transceiver interface. In an embodiment, the network system controller can be configured to read said RFID data from said non-volatile memory via said RFID transceiver 1, 10 network interface.

For example, workorder RFID data, RFID transceiver 10 finished good identification and configuration, location and TOD RFID data can be programmed into the RFID transceiver 10 finished good internal RFID memory, wherein said RFID data be copied to non-volatile memory and read electronically from said RFID transceiver 10 host interface. For example, location RFID data can be programmed into the RFID memory of an MSA compatible SFP+ RFID transceiver using RTPS mobile station 15 and then can be subsequently installed in an host SFP+ interface port, wherein a host controller can be configured to read said location RFID data from said SFP+ RFID transceiver EEPROM memory via said SFP+ host interface port. For example, the RTPS App running on the wireless controller 20 can execute a workorder RFID data and acquires its location data, such as its latitude and longitude in degrees, minutes, seconds, from a GPS network (e.g. a satellite network), wherein the RTPS App appends the location data to the identification and configuration RFID data programmed RFID transceiver 10 finished good, and wherein a host equipment or system can be configured to read said location RFID data from said programmed RFID transceiver 10 installed in said host interface and to identify said programmed RFID transceiver 10 location on a map using said location RFID data.

In some embodiments, smart label 5 can be configured to store said location RFID data and TOD RFID data and workorder RFID data in its RFID memory.

In an embodiment, RFID transceiver 1 and 10 can be configured with workorder identification key RFID data stored in non-volatile memory, wherein said RFID transceiver 1 and 10 can be configured to automatically validate a workorder identification RFID data read from an RFID memory using said workorder identification key RFID data stored in said non-volatile memory, and to program RFID transceiver 1 and 10 to a desired configuration using identification and configuration RFID data read from said RFID memory, and wherein said RFID data can be programmed into RFID transceiver 1, 10 when the workorder identification RFID data is validated by RFID transceiver 1 and 10 (e.g. controller) and not programmed into RFID transceiver 1, 10 when said workorder identification RFID data is not valid.

In an embodiment, RFID transceiver 1 and 10 and smart label 5 can be configured with a password protected RFID memory and memory area containing at least said RFID device identification and configuration RFID data, wherein the RTPS App can be configured to write a valid password into said RFID memory and wherein said RFID memory subsequently enables reading and or writing data to said RFID memory area when said written password is valid, and wherein the RTPS App can be configured to subsequently read and or write RFID data to said RFID memory. In an embodiment, said password can be contained in the selected programming instruction RFID data stored in the RTPS database 20 or 50 and the RTPS App can be configured to automatically retrieve said password and write said password to said RFID device.

In the present embodiment, the RFID transceiver 1 and 10 and smart label 5 RFID memory and the RFID transceiver 1 and 10 non-volatile memory can be configured with RFID data to indicate their RFID programming status, wherein said RFID programming status data stored in a non-volatile memory can be read electronically using at least their host interface and or network interface, and wherein said RFID programming status data stored in RFID memory can be read using the RTPS mobile station 15 interface 25. In the present embodiment, said RFID programming status data can be configured to indicate at least the administrative and also preferably the operational state of said RFID device, for example state data such as whether the RFID device is programmable or not, and if it is programmed to a desired operating configuration or not, and whether the programmed RFID data is valid or not, etc. For example, an MSA compatible SFP+ RFID transceiver EEPROM memory and RFID memory can be configured with RFID programming status data, wherein said status data can be read by a host Ethernet Switch controller, and for example the host Ethernet Switch controller can use the RFID programming status data to determine whether the installed SFP+ pluggable transceiver is RFID programmable or not and whether it is programmed to a desired configuration or a default configuration, etc., or for example the RTPS mobile station 15 RTPS App can be configured to read said RFID programming status from RFID transceiver 1, 10 and smart label 5 data using RFID interface 25 and determine the RFID programming state of said RFID devices.

In the embodiment illustrated in FIG. 1, the RTPS and RTPS programs (e.g. the RTPS program and the RTPS App as applicable) can be configured to provide additional RFID programming functions, wherein the RTPS program functionality can be configured to include system administration, production control, production programming, engineering, database, corporate information system, and customer support functions, in addition to the RTPS App mobile programming functions.

In the present embodiment, the RTPS program can be configured to be executed on a general-purpose controller and the RTPS App can be configured to be executed on a wireless controller 20.

In an embodiment, the RTPS can be configured with a plurality of controllers and mobile wireless controllers each executing the RTPS program and RTPS App respectively, and wherein each controller can be configured with a memory to at least store and operate the RTPS program or App and RFID data. Note that in an embodiment, a controller can be configured to execute the RTPS program and all the RTPS program system administration, production control, programming, engineering, and database functions, and in another embodiment, a controller can be configured to execute the RTPS program and least a one RTPS function.

In the present embodiment the RTPS can consist of: RTPS system administration station 70; RTPS production control station 75; RTPS programming station 80; RTPS engineering station 85; RTPS network database 50; and RTPS mobile programming station 15, wherein each said RTPS station can be configured with a controller or wireless controller configured to execute at least the RTPS program or RTPS App program and RTPS station functions.

In the present embodiment, the RTPS programming station 80, RTPS engineering station 85, RTPS production control station 75, RTPS system administration station 70, and RTPS network database 50 controllers and RTPS program can be configured to transmit and receive RFID data via a network such as local area network 90, 65 and wide area network 40, and wherein said RFID data can be stored in RTPS network database 50.

In an embodiment, said RTPS stations 15, 80, and 85 can be configured to acquire location and TOD data from a network.

In the present embodiment, the RTPS station 15, 50, 75, 80, and 85 controllers and the RTPS program can be configured with a GUI to enable an operator to manage the RTPS program, and manage and program RFID transceivers 1 and 10 and smart labels 5, and manage RFID data stored in RTPS network database 20 and 50.

In the present embodiment, RTPS system administration station 70 can be configured to execute at least the RTPS program system administration function, wherein the RTPS system administration function can be configured to enable a superuser/manager to create and manage user accounts, and wherein a superuser is provided a superuser password and can assign a username, password and access policies for a plurality of individual RTPS program users or operators.

In the present embodiment, the RTPS system administration function can be configured to prompt a user or operator to enter a valid username and password to operate the RTPS production control, administrator, engineering, database, production and mobile programming functions. For example, the RTPS program system administration function will prompt an operator to enter their username and password, and grant access to corresponding RTPS program functions on the RTPS mobile station 15, RTPS high capacity programming station 80, RTPS engineering station 85, RTPS production control station 75 and RTPS system administration station 70 according to a policy. In an embodiment, a user or operator can enter said credentials at least partially using a personal RFID card positioned proximate to RFID interface 25 or 27, wherein said RFID card contains said user name and or password.

In the present embodiment, the RTPS production control station 75 can be configured to at least execute the RTPS program system administration and production control functions, wherein said RTPS production control function can be configured to import and process production data, wherein said production data can be used to program an RFID transceiver 1 and 10 and smart label 5 to a desired configuration.

In the present embodiment, the RTPS production control station 75 and RTPS production control function can be configured to receive pluggable transceiver workorder, part number and serial number identification, programming instruction, and configuration production data from corporate information system 60 via a network such as networks 90, 40 and 65. For example the corporate information system 60 can be configured as a file system or a database system or enterprise or manufacturing resource planning system or corporate data management system such as proprietary Oracle database, SAP database, etc., management systems.

In the present embodiment, said identification and programming instruction data can comprise at least:

A plurality of RFID transceiver 10 finished good part numbers, and optional version data, A plurality of RFID transceiver 1 assembly part numbers, A programming instruction for each valid finished good part number and assembly part number combination or valid new finished good part number and original finished good part number combination, In the present embodiment, the RTPS production control function can be configured to process said production workorder and identification and configuration and programming instruction data and create a corresponding workorder RFID data and identification RFID data and configuration RFID data and programming instruction RFID data for at least each said finished good part number, and wherein said RFID data can be stored in RTPS database 20 and 50.

In an embodiment, the RTPS production control function can be configured to process said production data and to create a corresponding RFID data for each said finished good part number and serial number.

In the present embodiment, programming instruction RFID data can be configured to contain at least;

one RFID transceiver 10 finished good part number identification RFID data, and one corresponding RFID transceiver 1 assembly part number or one corresponding RFID transceiver 10 finished good part number RFID data.

In the present embodiment, the RTPS production control function can be configured to receive a plurality of workorder data, wherein the RTPS production control function can be configured to enable an operator or remote controller to select any one of a plurality of said workorders to process and create a workorder RIFD data. In the present embodiment, a workorder can comprise at least the following data:

Unique workorder identification data,

RFID transceiver 10 finished good part number data,

RFID transceiver 1 assembly or 10 finished good part number data,

Quantity data, describing the maximum number of RFID transceiver 10 finished good devices to program.

In an embodiment, the RTPS production control function can be configured with a workorder identification key data securely stored in the RTPS production control station 75 controller memory, wherein said RTPS production control function can be configured to automatically validate/authenticate a selected workorder identification data using said workorder identification key data, and to process said selected workorder data when said workorder identification data is validated by the RTPS production control function, and to not to process said selected workorder data when said workorder identification data is not valid. In an embodiment, the RTPS program production control function can be configured to require the operator to enter approval data to validate/authenticate said selected workorder identification data.

In the present embodiment, the RTPS production control function processes said selected workorder data and creates a corresponding workorder RFID data described above and stores said workorder RFID data and associated RFID data in RTPS database 50.

In the present embodiment, the RTPS production control function can process said selected workorder data and retrieve configuration data corresponding to the finished good identification data specified in said workorder data from corporate information system 60, wherein said configuration data contains data to program RFID transceiver 1 and 10 to a desired configuration. In the present embodiment, the RTPS production control function can create a corresponding configuration RFID data for each production configuration data containing and can store it in RTPS database 50. In some embodiments, the RTPS production control function can be configured to retrieve a plurality of production configuration data corresponding to the finished good part number specified in said workorder data and a plurality of finished good serial numbers corresponding to said plurality of configuration data, wherein said plurality of finished good part number and serial number configuration data can be stored in RTPS database 50. In an embodiment, the RTPS production control function can be configured to retrieve configuration data from the corporate information system 60 corresponding to the finished good part number data and the assembly part number or finished good part number data specified in said executed workorder data.

In the present embodiment, the RTPS production control function processes said selected workorder data and creates a corresponding workorder report RFID data report for each workorder RFID data created and stores said workorder report RFID data in RTPS database 50, for example the workorder report RFID data report data can contain workorder status data, and RFID transceiver programming status data and programming data, for each RFID transceiver specified in said selected workorder RFID data, such as:

workorder identification RFID data, workorder status RFID data, list of RFID transceiver 10 part number and serial number RFID data and corresponding RFID transceiver 1 part number and serial number RFID data, RFID transceiver 10 programming status data, RFID transceiver 1 and 10 programming data, such as:

finished good programmed identification and configuration RFID data for each serial number, assembly programmed identification and configuration RFID data for each serial number, operator identification data, noted data, data files etc.

In an embodiment, the RTPS production control function can be configured to enable an operator to at least view, print and approve workorder report RFID data, and to transmit workorder report RFID data to a network and to corporate information system 60.

In an embodiment, the RTPS can be configured with an smart label 5 printer connected to RTPS production control station 75 controller or a network such as 90, wherein the RTPS production control function can be configured to print and program at least part number and serial number identification RFID data onto and into smart labels 5. In some embodiments, the RTPS program production control function can be configured to receive a smart label 5 print list from corporate information system 60, wherein said list can contain part number and serial number data to be printed on each smart label 5 identified in said list, and wherein the RTPS program production control function retrieves the corresponding part number programming instruction RFID data, and prints and programs each smart label 5 identified in said list with said identification RFID data using said programming instruction RFID data. In an embodiment, said printed smart labels 5 are each programmed with at least a RFID transceiver 10 finished good part number and serial number identification RFID data. In an embodiment, said printed finished good smart labels 5 can be programmed with at least a finished good part number and serial number identification and configuration RFID data. In an embodiment, said printed smart labels 5 can be each programmed with at least RFID transceiver 1 assembly part number and serial number identification RFID data. In an embodiment, said barcode label print list can contain a finished good part number, assembly part number and serial number RFID data to be printed on each smart label 5 identified in said list, and wherein the RTPS program production control function retrieves the corresponding part number programming instruction RFID data, and prints and programs each smart label 5 identified in said list with said finished good part number and serial number identification RFID data using said programming instruction RFID data.

In the present embodiment, RTPS programming station 80 controller can be configured to execute at least the RTPS program programming function, for example which includes at least the RTPS App mobile programming function, and can be configured to execute the RTPS system administration function, wherein said RTPS programming station 80 and RTPS program can be configured to program RFID devices using at least one external RFID reader, wherein the external RFID reader can be configured with an RFID interface 27 and connected to the RTPS programming station 80 controller using a standard external RFID reader computer interface. For example, the external RFID reader and RFID interface 27 can be configured with a USB interface and cable, or Ethernet, or PCMCIA, etc., and wherein said electrical interface can be detachably connected to the RTPS programming station 80 controller. In an embodiment, the RFID interface 27 can be configured to provide optimal RFID and physical interfaces to at least one RFID transceiver 1 or 10 and smart label 5. In an embodiment, the external RFID reader RFID interface 27 can be detachable, wherein the RFID interface 27 can be connected to the external RFID reader using an RF cable connector or RFID repeater interface. For example, the RFID interface 27 can be configured with a standard RF electrical connector to connect to the external RFID reader. For example, the RFID interface 27 can be configured with a standard coaxial or BNC connector RF connector. In an embodiment, the RFID interface 27 can be configured as an external RFID repeater, wherein the said external RFID repeater can be configured to interface with the external RFID reader RF interface.

In the present embodiment, the RTPS programming station 80 controller and RTPS programming function and RFID interface 27 can be configured to read and write RFID data to a plurality of RFID devices, wherein a plurality of RFID devices can be located in proximity to RFID interface 27, and wherein the RTPS programming station 80 controller and RTPS programming function and RFID interface 27 can be configured to select and program any one of a plurality of RFID devices.

In the present embodiment, the RTPS programming station 80 controller and RTPS programming function and RFID interface 27 can be configured to read, write and program any one of a plurality of compatible RFID devices located proximate to RFID interface 27.

In the present embodiment, the RTPS engineering station 85 controller can be configured to execute at least the RTPS engineering function, and the RTPS programming and system administration functions, wherein RTPS engineering station 85 and RTPS engineering function can be configured to program RFID devices using at least one RFID interface device 27 connected to the RTPS engineering station 85 controller.

In the present embodiment, the RTPS engineering function can be configured to process programming instruction and configuration RFID data, and to program RFID transceivers 1 and 10 and smart labels 5, and to operate and test RFID transceivers 10 and 1 and smart label 5 programmed identification and configuration RFID data. In an embodiment, the RTPS engineering function can be configured create engineering workorder RFID data, wherein the engineering workorder RFID data contains a unique engineering workorder identifier and used to program RFID transceivers.

In an embodiment, the RTPS engineering function can be configured to enable a user to at least select, view and edit any one of a plurality of programming instruction RFID data stored in RTPS database 50. In an embodiment, a programming instruction RFID data can be configured to include additional RFID transceiver 10 finished good, RFID transceiver 1 assembly and smart label 5 device programming instruction data, wherein said additional programming instruction data can be used to program RFID transceiver 10 to a desired configuration. For example, in an embodiment, said RFID transceiver 1 and 10 and smart label 5 additional programming instruction RFID data can be configured to contain at least any of the following:

General programming methods and data, including:
    Password programming methods and RFID data,
    Identification programming methods and RFID data, such as:
        authentication, location, workorder identification, etc., methods and data,
    Configuration programming methods and RFID data, such as:
        RFID memory area programming methods and data
        Diagnostic monitoring warning and alarm threshold settings programming methods and data,
        Network address, RFID data encryption and key, RFID data error correction code, etc., programming methods and data Identification and configuration RFID data management methods and RFID data, for example methods and data used to create, configure, identify and store a plurality configuration RFID data and versions used to program RFID transceiver 10, Finished good programming process methods and data, such as:
    Selecting one or more of a plurality of RFID device programming process methods and steps data, test and configuration criteria data, and associated operator instructional or guidance data used to identify and program an RFID transceiver 1 and 10 and smart label 5, RFID memory device programming methods and algorithms and RFID data, such as:
    RFID reader/writer configuration and data,
    RFID device detection and collision management and data,
    RFID memory identification and organization data,
    RFID memory address map and programming location data,
    Configuration RFID data to RFID memory mapping data,
    RFID memory data encoding methods and data, such as error correction code, encryption and key code data,
    RFID memory programming and verification data,
    RFID device RFID configuration data, etc.

In an embodiment, the RTPS engineering function can be configured to enable a user to save a programming instruction RFID data using any one of a plurality of generic (e.g. master or temporary) or current or new finished good part number and or assembly part number identification RFID data in RTPS database 50.

In an embodiment, the RTPS engineering function can be configured to enable a user to select, view and edit any one of a plurality of programmed identification and configuration RFID data or configuration RFID data stored in RTPS database 50. In an embodiment, the RTPS engineering function can be configured to enable a user to save said RFID data using any one of a plurality of generic or current or new finished good part number and or assembly part number identification RFID data in RTPS database 50.

In an embodiment, the RTPS engineering function can be configured to enable a user to read programmed identification and configuration RFID data from RFID transceiver 1 and 10 and smart label 5 using RFID interface 27, and to select, view and edit said data. In an embodiment, the RTPS engineering function can be configured to enable a user to save said read RFID data using any one of a plurality of generic or current or new finished good part number and or assembly part number identification RFID data in RTPS database 50.

In an embodiment, the RTPS engineering function can be configured with an identification and configuration RFID data editor, wherein said RFID data editor can be configured to convert binary identification and configuration RFID data to human readable RFID data, such as plain text or ASCII encoded text or hexadecimal, etc., and preferably organized in templates such as memory mapped data, graphically mapped data, data lists, etc., and vice versa. For example, said RFID data editor can convert said RFID data and graphically display identification and configuration RFID data organized tables, wherein said RFID data editor can be used configure RFID transceiver 1 and 10 IC registers and memory, host interface EEPROM memory map, protocol processing functions, network interface service levels, diagnostic tests, etc.

In an embodiment, the RFID data editor can be configured to convert binary identification and configuration RFID data to an MSA or other standard host interface memory mapped data table such as for example SFF-8472 enhanced digital diagnostic interface memory map table and text data fields, and for example wavelength and frequency tuning modes supported in accordance with SFF-8690, etc. For example, the RTPS engineering function RFID data editor can be used to translate binary identification and binary configuration RFID data read from an MSA compatible SFP+ RFID transceiver 10, and display the desired configuration data of the transceiver host interface EEPROM memory map, including a plurality of diagnostic data fields and settable threshold data, etc., defined by said RFID data, and edit said threshold settings, and save the edited identification and configuration RFID data version in the RTPS database 50.

In an embodiment, the RTPS engineering function can be configured to enable an operator to read identification and configuration RFID data from RFID transceiver 1 and 10 and smart label 5, copy and edit said RFID data, and reprogram said RFID device or another RFID device with said copied RFID data using RFID interface 27.

In an embodiment, RFID transceiver 1 and 10 can be configured to read the identification and configuration RFID data programmed in an RFID memory and to program itself to a desired operating configuration, and wherein the RFID transceiver 1 and 10 controller can be configured to program said RFID memory with configuration and or operating and or status data. In some embodiments, said controller can be configured to program said RFID memory periodically with RFID transceiver 1 or 10 status and or configuration and or operating data, for example the controller can be configured to periodically update the RFID memory with network and service level performance diagnostic data monitored by the controller.

In an embodiment, the RTPS engineering function can be configured to enable an operator to test the RFID programming and operating configuration of an RFID transceiver 1 and 10. For example: 1) program identification and configuration RFID data into RFID transceiver 1 and 10 and smart label 5 using RFID interface 27, 2) install RFID transceiver 1 or 10 into a host transceiver interface port and program it to a desired operating configuration using the RFID data stored in the RFID memory, 3) remove said RFID transceiver 1 or 10 from said host transceiver interface port and 4) read the programmed status and or configuration and or operating RFID data from said RFID transceiver using RFID interface 27 to verify the RFID programming and operating configuration. For example, this method can be used to program the pluggable RFID transceiver to perform diagnostics, install it and operate it in a host system connected to a network, and then to disconnect it from the host, retrieve diagnostic and configuration data from the pluggable RFID transceiver and review said data.

In the present embodiment, RTPS mobile station 15 wireless controller 20 and RTPS App and RFID interface 25 can be configured to execute said RTPS mobile programming functions and at least the RTPS system administration, production control, production programming and engineering functions described above.

In the present embodiment, corporate information system 60 can be configured to at least store a plurality of RFID transceiver 1 and 10 production data, such as workorder data, part number and serial number identification data, programming instruction data, configuration data, smart label 5 print data, and workorder identification key data, etc. (collectively referred to as "production data"). In the present embodiment, the corporate information system 60 can be configured to transmit said production data to the RTPS stations via a network such as network 65, and wherein the corporate information system 60 can be configured to receive at least corresponding production report data, such has workorder report RFID data, from at least RTPS production control station 75 via a network. In an embodiment, the corporate information system 60 can be configured to transmit and receive production data and production report data from the RTPS network database 50 via a network.

In the present embodiment, the RTPS can be configured with an RTPS web server 55, wherein the RTPS web server 55 controller can be configured execute at least the RTPS program web and application server functions, wherein said RTPS web server functions can be configured to provide an RTPS website and to connect to a plurality of RTPS customer stations 100 via a network such as local area network 65 and the internet 40. It should be noted that in some examples, the RTPS web server and application server can be implemented using separate controllers. In the present embodiment, the RTPS customer station 100 controller can be configured with at least an operating system, GUI, web browser, a memory, and a network interface connected to RTPS web server 50 via a network such as the internet 40. In the present embodiment, RTPS web server functions can be configured to provide a secure web connection to each RTPS customer station 100 and to securely process a plurality of individual customer RTPS web sessions, transactions and data. For example, the RTPS web site can be configured for displaying catalogs of OEM host system and RFID device part number selectors, and of a plurality RFID device and associated configuration RFID data and associated license items, etc., and for creating shopping carts of said items, and for placing purchase orders, and for processing financial transactions such as using a credit card or an account to purchase and item, and for receiving receipts, and for receiving tracking and shipping data for purchased items, etc., and for transmitting and receiving said data in email or other notification methods, and printing receipts and reports, etc.

In the present embodiment, the RTPS web server function can be configured receive and process an order (e.g. a purchase order) and related data specifying at least an ordered or purchased item part number data and item quantity data using the RTPS customer station 100. In the present embodiment, the RTPS web server can be configured to transmit said order to corporate information system 60 and to receive a corresponding order receipt data and ordered data items from corporate information system 60 and to transmit said ordered data from corporate information system 60 to said RTPS customer station 100.

In the present embodiment, the RTPS web server function can be configured to enable a customer to select items to a shopping cart, create an order and related data for said shopping card items, including payment or authorization and account data as applicable, using RTPS customer station 100. In the present embodiment, the RTPS web server can be configured to transmit said order data to the corporate information system 60 for processing and authorization, wherein the RTPS web server function can be configured to receive the corresponding authorized ordered data items from corporate information system 60 and to transmit said data items to said RTPS customer station 100, and wherein RTPS customer station 100 can be configured to download said ordered data items from RTPS web server 55 or corporate informant system 60 and store said data items in a memory.

For example, in the present embodiment, RTPS web server function can be configured to display a catalog of items and enable a customer to select items to a shopping cart, and to order/purchase said selected items, for example, said items consisting of at least any of the following items;

RFID transceiver 1 and 10 and smart label 5 devices and shipping data,
  production workorder data,
  production part number and serial number identification data,
  production programming instruction data,
  production configuration data,
  RFID transceiver 1 and 10 and smart label 5 data sheet data and other technical support material data,
  RTPS programs,
  RFID data.

For example, in an embodiment, RTPS web server function can be configured to display a catalog of items and enable a customer to select RFID transceiver 1, 10 part numbers using an OEM system lookup database, wherein a customer can enter an OEM system part and or port and or software release or version data and said database can be configured to provide a list of compatible or recommended RFID transceiver 1, 10 and smart label 5 devices and associated part number data, for example used to order said devices.

In the present embodiment, the RTPS production control function can be configured to receive at least the following production data from RTPS customer station 100 via a network; production workorder data, production part number identification data, production programming instruction data, and production configuration data.

In an embodiment, the RTPS web server function can be configured to remotely host any and all RTPS station functions such as programming and production control functions, wherein said station controllers can be configured with at least an OS, GUI, web browser program, a memory, network interface connected to the internet 40, and RFID interface 25 or 27 as appropriate, and wherein said RTPS web server function can be configured to provide a secure web connection to each said RTPS station.

In an embodiment, the RTPS program can be configured to operate in an automated production line and to receive control inputs and data to operate the RTPS station controllers and RTPS programs to program RFID transceivers 1 and 10 and smart label 5 from an RTPS remote controller connected to a network such as networks 30, 90 and 40, and to transmit control inputs and data to said RTPS remote controller. For example, the RTPS programming station functions can be adapted wherein the operator inputs are provided by the RTPS remote controller instead of the operator, and the operator notifications (e.g. tag detect notifications) are sent to the RTPS remote controller, and wherein the RTPS remote controller can be configured with an automated pick and place system used to position the RFID devices on RFID interface 25 or 27, and wherein the RTPS remote controller can be configured to at least select workorder RFID data, transmit the workorder RFID data to the RTPS programming control station, and to execute said workorder RFID data to program said RFID devices to a desired operating configuration.

In the present embodiment, the RTPS engineering station 85 controller and RTPS programming station 80 controller can be configured with a pluggable transceiver interface port, for example a standard MSA SFP+ transceiver interface port that can be used to operate a transceiver. In the present embodiment, said controllers can be configured to read, write and program configuration data to a of a pluggable transceiver or an RFID transceiver 1, 10 host interface non-volatile memory installed in said transceiver interface port, and to program said pluggable transceiver or RFID transceiver 1, 10 to a desired configuration using said data. In the present embodiment, said configuration data read from or written to said pluggable transceiver or RFID transceiver 1, 10 host interface non-volatile memory installed in said transceiver interface port can be stored in the RTPS database 50. For example, the controller reads, writes and programs configuration data to a standard MSA SFP+ transceiver or RFID transceiver 1 or 10 installed in said transceiver interface port using the standard MSA SFP+ transceiver 12C serial EEPROM communications interface.

In the present embodiment, the RTPS engineering function RFID data editor can be configured to compare and process identification and configuration RFID data read from an RFID transceiver 1, 10 or smart label 5 or RTPS database 50 and the programmed configuration data read from said RFID transceiver 1, 10 installed in the host transceiver interface port, and to report differences or errors in said data programmed configuration data, such as program data errors or error states. In an embodiment, the RTPS engineering function RFID data editor can be configured to display said data and comparisons on the GUI. For example, the RTPS program can be configured to display identification and configuration RFID data used to program an SFP+ pluggable transceiver using RFID such as MSA SFF-8074 SFP+ configuration data in text form and using tables, and the RTPS program can be configured to read the programmed configuration of said SFP+ installed in the host transceiver interface port and to display said SFP+ configuration data, and the RTPS program can be configured to compare said data indicate and report errors between the two data sets.

In an embodiment, the RTPS engineering station 85 controller transceiver interface port can be configured to transmit and receive high speed data communications signals received to a pluggable transceiver or RFID transceiver 1, 10 host interface installed in said transceiver interface port. For example, the RTPS engineering station 85 controller can be configured with an Ethernet protocol and signal generator used to transmit and receive optical Ethernet signals from a 10GBASE-LR SFP+ pluggable transceiver installed in said transceiver interface port.

Although particular systems, apparatus and methods for programming pluggable transceivers using the RTPS and RFID are described above, it can be appreciated that other systems, apparatus and methods can be provided, including other types and configurations of RFID devices and RFID transceivers 1 and 10 and smart labels 5 devices and RFID interfaces.

Figure 2:
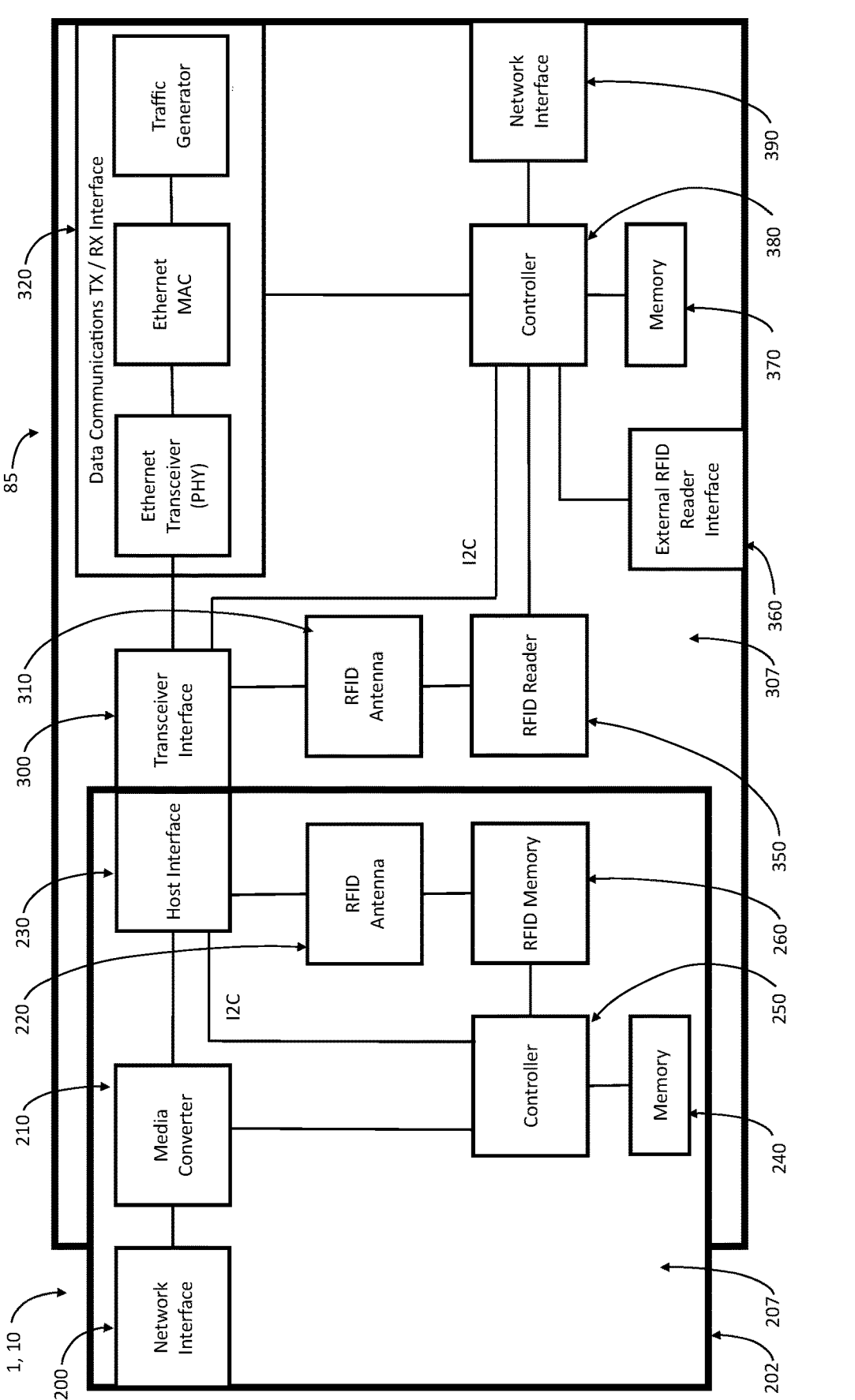
FIG. 2 is a block diagram of an RFID transceiver and host RFID programming system, according to an embodiment.
Figure 3:
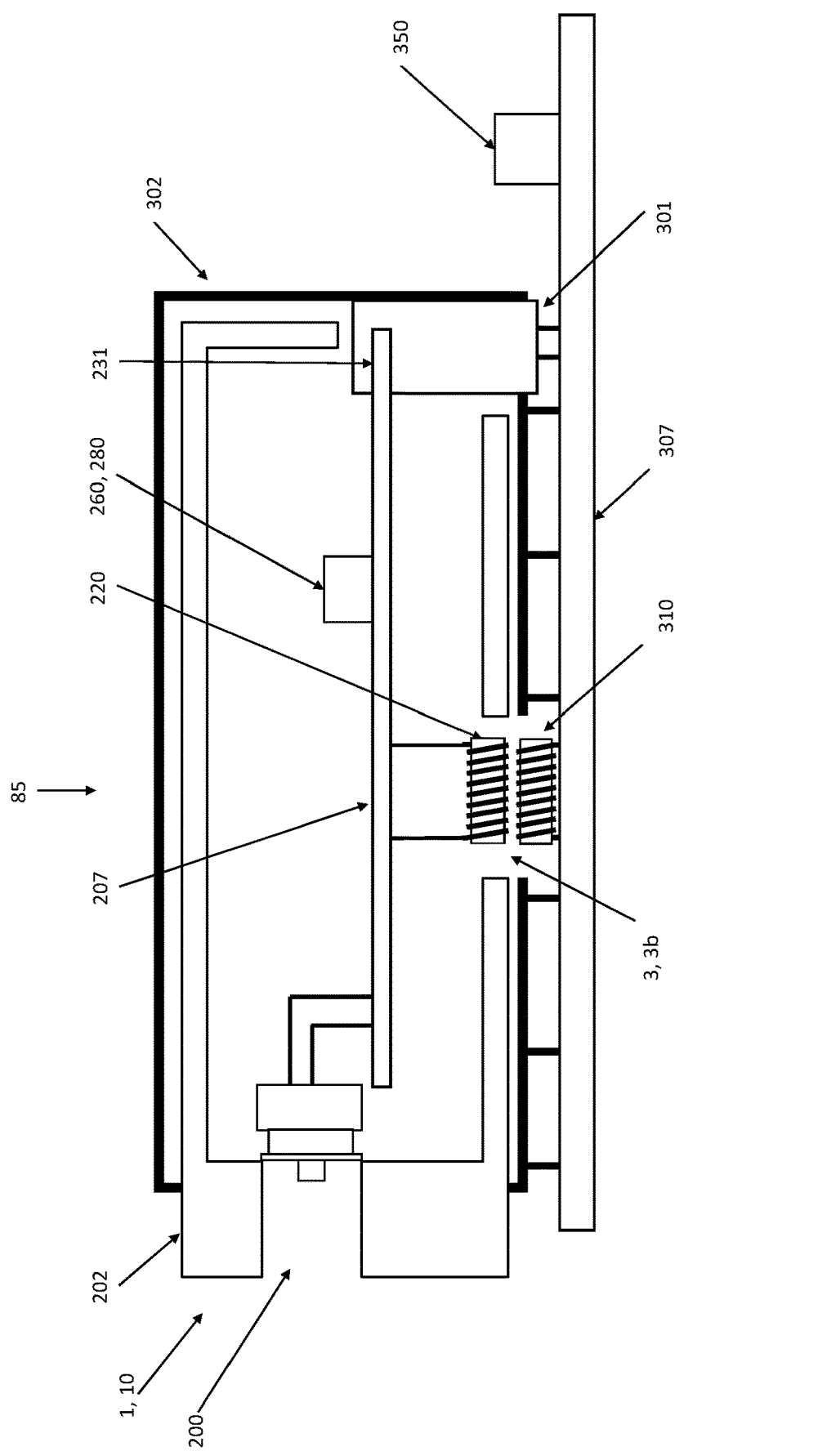
FIG. 3 is a cutaway profile view of an RFID transceiver and a host RFID transceiver interface port and RFID reader, according to an embodiment.

In the embodiment illustrated in FIGS. 1, 2 and 3, the RTPS can be configured to program a pluggable transceiver installed in a transceiver interface port using RFID. In the illustrated embodiment, the system includes: RFID transceiver 1 configured with RFID interface aperture 3 and RFID transceiver 10 configured with smart label 5 covering RFID interface aperture 3, for example shown in FIG. 1, and for example RFID transceiver 1, 10 installed in a host 85 shown in FIG. 2; an external RFID reader, for example the RTPS mobile station 15 shown in FIG. 1; and a host 85 configured with a transceiver interface 300 adapted with an RFID antenna 310 and RFID reader 350, wherein the host 85 controller 380 can be configured to program RFID transceiver 1, 10 to a desired configuration using RFID antenna 310 and RFID reader 350, for example the RTPS host shown in FIG. 2 wherein the host 85 can be the RTPS engineering station 85 shown in FIG. 1 adapted with a transceiver interface 300 shown in FIG. 2.

For example, in the embodiment illustrated in FIG. 2, RFID transceiver 1, 10 can be configured with network interface 200, media converter 210 such as a high speed optical media signal converter, and a host interface 230. In the present embodiment, host interface 230 can be configured with host interface connector 231, and wherein host interface 230 can be adapted with an RFID interface located at aperture 3 on the housing 202. In the embodiment illustrated in FIGS. 2 and 3, said host interface 230 can be configured with a connector 231 and configured to provide at least a data communications interface, a management interface, and power and physical interfaces, and to detachably connect to a transceiver interface 300 port and connector 301, for example RFID transceiver 1, 10 host interface connector 231 can be configured to mate with host 85 transceiver interface connector 301. In the present embodiment, RFID memory 260 and RFID antenna 220 can be configured to transmit and receive RFID data to and from said host interface 230 RFID interface using aperture 3. In another embodiment, RFID memory 260 and RFID antenna 220 can be configured to transmit and receive RFID data to and from said host interface 230 RFID interface using a tagged repeater or repeater smart label 5 covering aperture 3. In the present embodiment, controller 250 can be configured to read and write RFID data from RFID memory 260 and to read and write data to memory 240, and to program RFID transceiver 1, 10 to a desired operating configuration using RFID data programmed in RFID memory 260. In another embodiment illustrated in FIG. 3, an RFID reader 280 and RFID antenna 220 can be configured to transmit and receive RFID data to and from said host interface 230 RFID interface using aperture 3. In another present embodiment, controller 250 can be configured to read and write RFID data from RFID reader 280, and to program RFID transceiver 1, 10 to a desired operating configuration using RFID data programmed in a smart label 5 covering aperture 3.

For example, in the embodiment illustrated in FIG. 1, an external RFID reader such as the RTPS mobile station 15 can be configured with a memory containing RFID data stored thereon defining a desired configuration of said RFID transceiver 1, 10. In the present embodiment, the RFID transceiver 1, 10 RFID interface can be positioned proximate to RFID interface 25, wherein the RTPS mobile station 15 can be configured to program RFID transceiver 1, 10 RFID memory 260 to a desired operating configuration using said RFID data, and wherein controller 250 can be configured to read said RFID data from RFID memory 260 and to program RFID transceiver 1, 10 to a desired operating configuration using said RFID data when said RFID transceiver 1, 10 is installed in host 85 transceiver interface 300 port shown in FIG. 2.

For example, in the embodiment illustrated in FIGS. 1, 2 and 3, the host 85 and controller 380 can be configured with a standard MSA SFP+ transceiver interface 300 providing at least a transceiver interface connector 301 and an electromagnetically shielded housing or cage or port 302 and configured to provide at least a data communications interface, a management interface such as a standard MSA SFP+I2C serial EEPROM interface, and power and physical interfaces.

In the embodiment illustrated in FIG. 3, said host transceiver interface 300 can be adapted with an RFID interface consisting of RFID antenna 310, RFID reader 350 and an aperture 3b, wherein aperture 3b can be located on the host 85 transceiver interface cage 302 sidewall, and wherein aperture 3b can be configured to interface with the RFID transceiver 1, 10 aperture 3 and a smart label 5 (e.g. smart label, repeater smart label or tagged repeater smart label) installed in said transceiver interface 300 port cage 302 and connected to connector 301. It should be noted that the installed smart label 5 is not illustrated in FIG. 3 to simplify the figure and make it clearer.

In the embodiment illustrated in FIG. 2, the RFID transceiver 1, 10 host interface 230 and RFID interface can be installed and connected to host 85 transceiver interface 300 configured with an corresponding RFID interface. In the embodiment illustrated in FIG. 3, the RFID transceiver 1, 10 host interface 230 RFID interface aperture 3 can be positioned proximate to host 85 transceiver interface 300 RFID interface aperture 3b to enable RFID data communications therethrough.

In the embodiment illustrated in FIG. 2, controller 380 can be configured with a memory 370 having RFID data stored therein defining a desired configuration of RFID transceiver 1, 10 and smart label 5. In the present embodiment, controller 380 can be configured with an RFID reader 350 and RFID antenna 310, wherein controller 380 can be configured to transmit and receive RFID data to said transceiver interface 300 RFID interface aperture 3b using said RFID antenna 310 and reader 350. In the present embodiment, host 85 controller 380 can be configured to program RFID transceiver 1, 10 and smart label 5 to a desired configuration using said RFID data read from memory 370, wherein the RFID transceiver 1, 10 and smart label 5 RFID interface can be positioned proximate to the host 85 transceiver interface 300 RFID interface aperture 3b, and wherein controller 380 and RFID reader 350 can be configured to program said RFID data in RFID transceiver 1, 10 and smart label 5.

In the embodiment illustrated in FIG. 3, RFID antenna 310 can be connected to host 85 PCBA 307 and positioned within aperture 3b and not protruding from aperture 3b, for example positioned within aperture 3b and not protruding into the interior space of cage 302 causing a mechanical interference, wherein aperture 3b can be formed in a sidewall of cage 302 to provide said transceiver interface 300 RFID interface. For example, RFID antenna 310 and aperture 3b are positioned on PCBA 307 and cage 302 to mate with RFID transceiver 1, 10 housing 202 aperture 3 or smart label 5 and RFID antenna 220. In the present embodiment, the RFID antenna 310 can be positioned within a dielectric aperture 3b formed on a shielded sidewall or connector of the host 85 transceiver interface cage 302. For example RFID antenna 310 can be positioned within an aperture 3b of a pluggable transceiver EMI/metallic cage 302 bottom sidewall and installed on PCBA 307. In the present embodiment, RFID antenna 310 can be configured as an inductor coil antenna positioned within aperture 3b, wherein the magnetic axis can be in the x-y plane, for example a surface mounted chip inductor having approximate dimensions of 2.3 mm W×1.8 mm D×1.6 mm H. In another embodiment, RFID antenna 310 can be configured as a planar coil antenna positioned within aperture 3b, wherein the magnetic axis can be in the z plane. In another embodiment, RFID antenna 310 can be configured as a planar coil antenna positioned on an interior sidewall at least partially within cage 302, wherein the cage 302 and RFID antenna 310 can be formed to enable receiving a pluggable transceiver within said cage 302, and wherein the RFID antenna 310 terminals or conductors can be connected through aperture 3b to PCBA 307. For example, the linear dimension of the aperture 3b can be approximately 6 mm in length, and in another example the aperture 3b can be sized to have a surface area of approximately 29 mm². Preferably still, aperture 3b can be sized to attenuate unwanted or unintended EM signals from passing through. In another embodiment, the aperture 3b can be sized to attenuate unwanted or unintended EM signals by at least 60 dB at 10 GHz. It should be noted that the size of the aperture 3b can be increased to improve the field coupling between RFID antenna 220 and 310 by decreasing the RFID shielding or interference effects caused by the surrounding metallic cage 302, however the electro-magnetic shielding effectiveness of cage 302 may be compromised.

In an embodiment, RFID antenna 220 can be positioned on the host interface PCBA connector 231 and configured to provide an RFID interface, for example a printed coil antenna circuit on PCBA 207, and transceiver interface connector 301 installed on PCBA 307 can be adapted with RFID antenna 310, wherein RFID antenna 310 can be connected to PCBA 307 and positioned within a dielectric aperture of an interior sidewall of said transceiver interface connector 301 housing to provide a corresponding RFID interface, wherein said transceiver interface connector 301 RFID interface can be positioned proximate to said mated host interface connector 231 RF interface to enable RFID communications therethrough. In an embodiment, said transceiver interface connector 301 can be configured with two additional connector pins positioned on an exterior sidewall of said transceiver interface connector 301 housing, wherein said connector pins can be connected internally to RFID antenna 310 formed within said transceiver interface connector 301 housing and connected externally to PCBA 307 or a cable within host 85, and wherein said RFID antenna 310 can be connected to RFID reader 350.

In the present embodiment, RFID transceiver 1, 10 controller 250 can be configured to read configuration data from memory 260 and or memory 240 and to program RFID transceiver 1, 10 to a desired configuration using said data.

In the present embodiment, memory 370 can be programmed with said configuration data wherein controller 380 can be configured to read said data from memory 370 and to write said configuration data in memory 240 using transceiver interface 300 management interface, host interface 230 management interface and controller 250, and to program RFID transceiver 1, 10 to a desired configuration using said configuration data.

In the present embodiment, RFID transceiver 1, 10 controller 250 can be configured to read RFID data from memory 260 and to program RFID transceiver 1, 10 to a desired configuration using said RFID data. In the present embodiment, memory 370 can be programmed with RFID data wherein controller 380 can be configured to read RFID data from memory 370 and to write said RFID data to RFID memory 260 using RFID reader 350, RFID antenna 310, transceiver interface 300 RFID interface, host interface 230 RFID interface, and RFID antenna 220, and to program RFID transceiver 1, 10 to a desired configuration using said RFID data.

In the present embodiment, controller 380 can be configured to read data stored in RFID memory 260 and memory 240 and to store said data in memory 370.

In the present embodiment, controller 380 can be configured to receive and transmit said configuration data and RFID data to network interface 390 and to a network connected to interface 390, and wherein controller 380 can be configured to store said received configuration data and RFID data in memory 370.

In the present embodiment, a data communications transmitter/receiver interface 320 ("data communications interface 320") can be configured to transmit and receive data communications signals from the transceiver interface 300 data communications interface, wherein said data communications signals can be formatted to be compatible with the data communications signals transmitted and received from RFID transceiver 1, 10 host interface 230 data communications interface. In an embodiment, controller 380 can be configured to program, control and monitor data communications interface 320. For example, data communications interface 320 can be an embedded Ethernet protocol testing subsystem configured with an Ethernet PHY, MAC and traffic generator and used to test 10 Gbps Ethernet signals received from SFP+ RFID transceiver 1 or 10 host interface 230. For example, data communications interface 320 can be configured to breakout and connect high speed signals received from an SFP+ RFID transceiver 1 or 10 host interface 230 and connect said signals to SMA test connectors, wherein said host 85 SMA connectors can be configured to connect to external cables and external signal analyzers and protocol analyzers, etc. For example, data communications interface 320 can be configured with an Ethernet line interface, Ethernet PHY and packet switch or packet switch interface, etc., and used to connect host 85 PCBA 307 to a packet switch or test system. For example, data communications interface 320 can be configured with an external Ethernet network interface and connector (e.g. similar to network interface 390) and used to connect host 85 data communications interface 320 to a packet switched network or test system. In an embodiment, controller 380 can be configured to connect to a network through data communications interface 320, for example to transmit and receive Ethernet data communications signals to said network.

In an embodiment, controller 380 can be configured with external RFID reader interface 360, for example to connect to a hand held external RFID reader device configured with RFID interface 27.

As can be appreciated, in the present embodiment, the RTPS can be used to program an RFID transceiver 1 and 10 and said smart labels 5 connected to host 85 transceiver interface 300 using RFID. For example, a method for programming the RFID transceiver 1, 10 can include the steps of:

a) providing a host 85 having RFID data stored in memory 370 defining a desired configuration of RFID transceiver 1, 10;

b) plugging RFID transceiver 1, 10 host interface 230 into host 85 transceiver interface 300 placing host interface 230 RFID interface proximate to transceiver interface 300 RFID interface;

c) powering up RFID transceiver 1, 10;

d) writing said RFID data to RFID reader 350 using controller 380;

e) using an RFID interface on transceiver interface 300 to transmit said RFID data;

f) using an RFID interface on host interface 230 to receive said RFID data in RFID memory 260;

g) reading said RFID data from RFID memory 260 using controller 250;

h) programming RFID transceiver 1, 10 according to the desired configuration defined by said RFID data read in step g).

In an embodiment, the method can include the steps of:

a) providing host 85 having RFID data stored in memory 370 defining a desired configuration of RFID transceiver 1, 10;

b) plugging RFID transceiver 1, 10 host interface 230 into host 85 transceiver interface 300 placing host interface 230 RFID interface proximate to transceiver interface 300 RFID interface;

c) writing said RFID data to RFID reader 350 using controller 380;

d) using an RFID interface on transceiver interface 300 to transmit said RFID data;

e) using an RFID interface on host interface 230 to receive said RFID data in RFID memory 260;

f) powering up RFID transceiver 1, 10;

g) reading said RFID data from RFID memory 260 using controller 250;

h) programming RFID transceiver 1, 10 according to the desired configuration defined by said data read in step g).

For example, the host RTPS engineering station 85 controller 380 can be configured with a transceiver interface 300, wherein said transceiver interface 300 can be configured to receive a RFID transceiver 1, 10 host interface 230 and an MSA pluggable transceiver host interface, wherein the controller 380 can be configured to read, write and program configuration data and RFID data to the RFID transceiver 1, 10 host interface EEPROM memory 240 and RFID memory 260 respectively. For example, said host 85 transceiver interface 300 can be used to efficiently test various RFID transceiver 1, 10 and said smart label 5 devices, RFID programming methods, algorithms, instructions, identification and configuration RIFD data, and MSA pluggable transceiver configurations and host interface memory configuration data, etc. In an embodiment, controller 380 can be configured to connect to a network using network interface 390, for example to connect to third party test and measurement equipment and to control and monitor said test equipment and to perform RFID transceiver 1, 10 RFID programming tests, functional tests and performance tests.

In an embodiment, controller 250 can be configured without an I2C management interface connection to host interface 230, and controller 380 can be configured without an I2C management interface connection to transceiver interface 300, wherein controller 380 can be configured to read, write and program RFID data to memory 260 using said transceiver interface 300 and host interface 230 RFID interfaces and to program to RFID transceiver 1, 10 according to a desired configuration defined by said RFID data.

In an embodiment, controller 380 can be connected to the transceiver interface 300 RFID interface and a management interface, wherein the RFID transceiver 1, 10 can be configured with or without the host interface 230 management interface, and wherein controller 380 can be configured to read, write and program configuration data or RFID data in RFID transceiver 1, 10 memory 260 or 240 accordingly, and to program RTID transceiver 1, 10 to a desired configuration using said data. For example, such a controller 380 can be configured with a transceiver interface 300 RFID interface and MSA I2C management interface, wherein the controller 380 can be used to program an RFID transceiver 10 RFID memory 260 using the transceiver interface 300 and host interface 230 RFID interface and to program an MSA pluggable transceiver memory 240 using the transceiver interface 300 and host interface 230 I2C management interface.

In another embodiment, for example illustrated in FIG. 2, an RTPS to program a Power Over Ethernet (POE) pluggable transceiver installed in a transceiver interface port of a host device using RFID is provided. The system can include: a host 85, wherein the host 85 transceiver interface port 300 can be configured with at least an RFID interface and a Power Over Ethernet (POE) interface, and wherein the controller 380 can be configured to program RFID transceiver 1, 10 with RFID data defining a desired configuration using said transceiver interface port 300 RFID interface and POE interface; RFID transceiver 1, 10, wherein the host interface 230 can be configured with an RFID interface and a POE dongle or device interface, and wherein the controller 250 can be configured to program RFID transceiver 1, 10 using RFID data defining a desired configuration received from said host interface 230 RFID interface and POE interface; and an external RFID reader 15.

For example, in the present embodiment, said transceiver interface 300 POE interface can be configured to provide 1000BASE-T Ethernet POE interface defined in standards such as IEEE 802.3af, 802.3at, 802.3bt, etc. In the present embodiment, the data communications interface 320 and said transceiver interface 300 POE interface can be configured to transmit and receive data communication signals and power signals using at least two differential conductor pairs, and wherein transceiver interface 300 POE interface can be configured with an "RJ45" style or type socket connector configured to receive a cable assembly terminated with an RJ45 connector such as a "CAT 5" cable. In the present embodiment, said transceiver interface 300 POE interface RJ45 socket connector can be adapted with an RFID interface.

In the present embodiment, host 85 memory 370 can be programmed with RFID data defining a desired configuration of RFID transceiver 1, 10, wherein controller 380 can be configured with an RFID reader 350 and RFID antenna 310 used to read, write and program RFID data to said POE RJ45 socket connector RFID interface, and to program RFID transceiver 1, 10 to a desired configuration using said RFID data.

For example, in the present embodiment, RFID transceiver 1, 10 can be configured as a POE dongle or device such as a POE optical transceiver providing an Ethernet 802.3ae 10GBASE-LR network interface 200, wherein the host interface 230 can be configured with a POE interface and mating RJ45 plug connector, and wherein said mating RJ45 plug connector can be adapted with an RFID interface, and wherein said transceiver interface 300 RFID interface can be mated to said host interface 230 RFID interface and can be positioned proximate to one another to enable RFID data communications therethrough. In the present embodiment, controller 250 can be configured to read RFID data from RFID memory 260 and to program said RFID transceiver 1, 10 POE dongle to a desired configuration using said RFID data.

For example, RTPS mobile station 15 can be configured with a memory having RFID data stored therein defining a desired configuration of POE dongle RFID transceiver 1, 10, wherein the POE dongle RFID transceiver 1, 10 host interface 230 RFID interface can be positioned proximate to the RTPS mobile station 15 RFID interface 25, and wherein the RTPS mobile station 15 can be configured to program the POE dongle RFID transceiver 1, 10 to a desired configuration using said RFID data. For example, the POE dongle RFID transceiver 1, 10 can be programmed using an external RFID reader 15 or it can be programmed when it is installed in the host 85 POE transceiver interface 300.

In an embodiment, said POE transceiver interface 300 RJ45 socket connector 301 can be installed on host 85 PCBA 307, wherein said connector 301 housing can be adapted with an RFID antenna 310, wherein RFID antenna 310 can be positioned on an interior sidewall of said RJ45 socket connector 301 housing and positioned to provide an RFID interface. In the present embodiment, said RJ45 socket connector 301 RFID interface can be configured to mate with an RJ45 plug connector 231 configured with a corresponding RFID interface. For example, said RFID antenna 310 can be configured as a planar coil antenna having approximate dimensions of 4.0 mm×4.0 mm×0.35 mm. For example, said RFID antenna 220 can be configured as an inductor coil antenna having approximate dimensions of 2.3 mm W×1.8 mm D×1.3 mm H.

In an embodiment, said POE transceiver interface 300 RJ45 socket connector 301 housing can be configured with at least two connector pins positioned on an exterior sidewall of said RJ45 socket connector 301 housing, wherein said connector pins can be connected to RFID antenna 310 and to PCBA 307 or cable within host 85, and wherein RFID antenna 310 can be connected to RFID reader 350.

In an embodiment, said POE host interface 230 RJ45 plug connector 231 housing can be configured with an RFID antenna 220, wherein RFID antenna 220 can be positioned within an exterior sidewall of said RJ45 connector 231 plug housing and positioned to provide an RFID interface. In the present embodiment, said RJ45 plug connector 231 RFID interface can be configured to mate with an RJ45 socket connector 301 configured with a corresponding RFID interface. For example, said RFID antenna 220 can be configured as a planar coil antenna having approximate dimensions of 4.0 mm×4.0 mm×0.35 mm.

In the present embodiment, said POE host interface 230 RJ45 plug connector 231 housing can be configured with at least two connector pins positioned on an sidewall of said RJ45 plug connector 231 housing, wherein said connector pins can be connected to RFID antenna 220 and connected to a cable, such as a "CAT 5" cable, or connected to a PCBA 207 within RFID transceiver 1, 10, wherein RFID antenna 220 can be connected to RFID memory 260.

In an embodiment, said POE host interface 230 RJ45 plug connector 231 can be configured with RFID memory 260 connected to RFID antenna 220 to provide an RFID interface, wherein RFID memory 260 an RFID antenna 220 can be formed on a substrate and embedded within an exterior sidewall of said RJ45 plug connector 231 housing, for example an NFC or RFID tag embedded in a molded plastic RJ45 connector, and wherein POE host interface 230 RJ45 plug connector 231 can be configured to attach to a standard twisted pair cable, such as a "CAT 5" cable. For example, said POE host interface 230 RJ45 plug connector 231 RFID tag can be programmed using RTPS mobile station 15 RFID interface 25. For example, said RFID tag can be configured to have approximate dimensions of 4.0 mm×4.0 mm×0.35 mm.

In an embodiment illustrated in FIG. 2, host controller 380 and controller 250 can be configured to exchange RFID data through shared RFID memory 260, for example using mailbox, FIFO, memory mapped, file transfer, communication, etc., protocols and methods as known in the art to exchange or transfer said RFID data and data files. For example, said exchanged data can be used to program, configure, control and monitor RFID transceiver 1, 10 to a desired configuration, for example said RFID data can comprise at least any of the following:

Transceiver part and serial number identification and configuration data

IC configuration data,

Program configuration data,

Memory configuration data,

Diagnostic data,

MSA pluggable transceiver memory mapped data,

Communications protocol and message data,

Binary, program, and user data files,

Network and service fault and performance diagnostic data,

Location data,

Security data, encryption key data, password data, authentication data,

Network address data,

Hardware and software compatibility data, etc.

Figure 4:
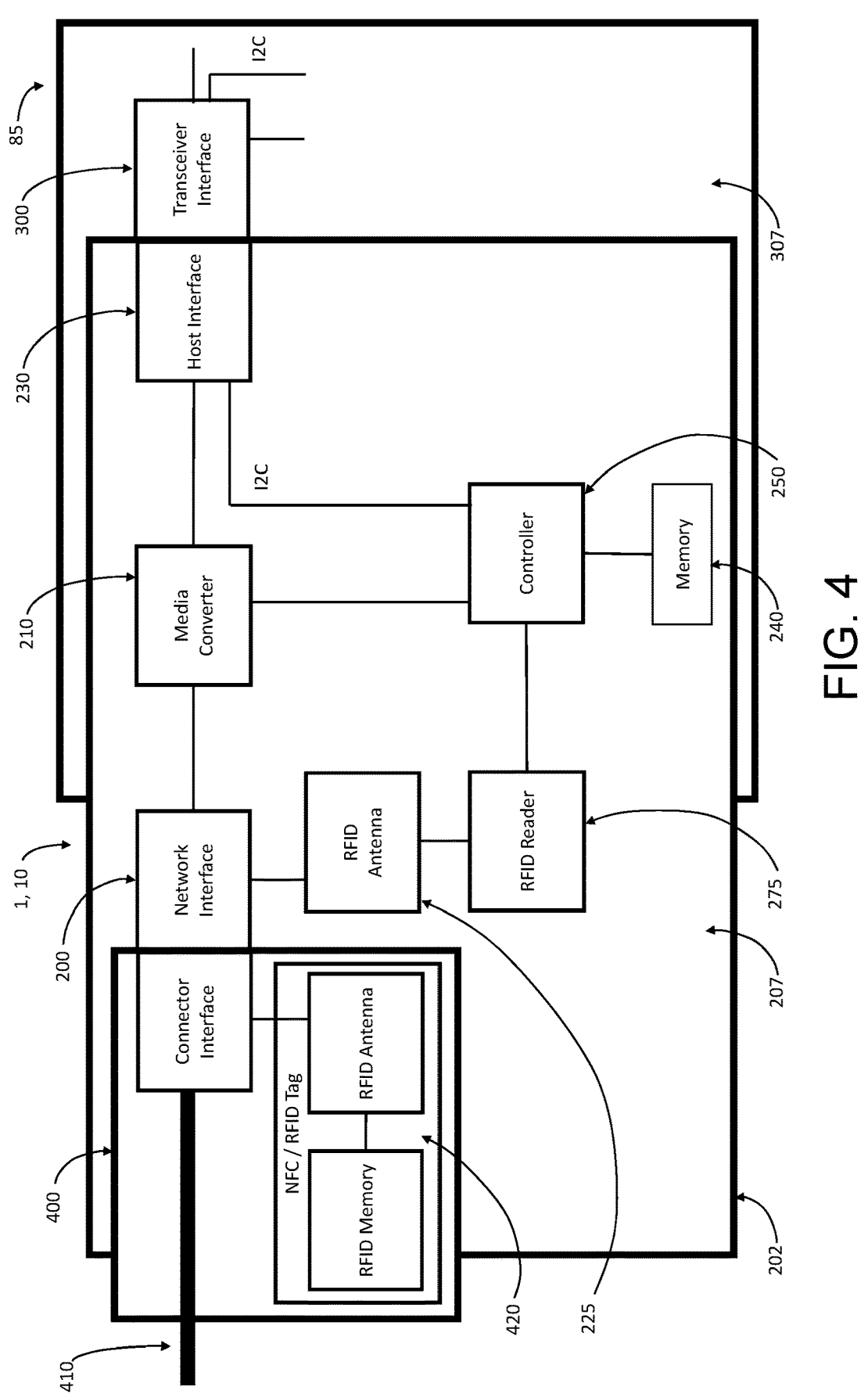
FIG. 4 is a block diagram of an RFID cable connector, RFID transceiver, and host RFID transceiver interface, according to an embodiment.
Figure 5:
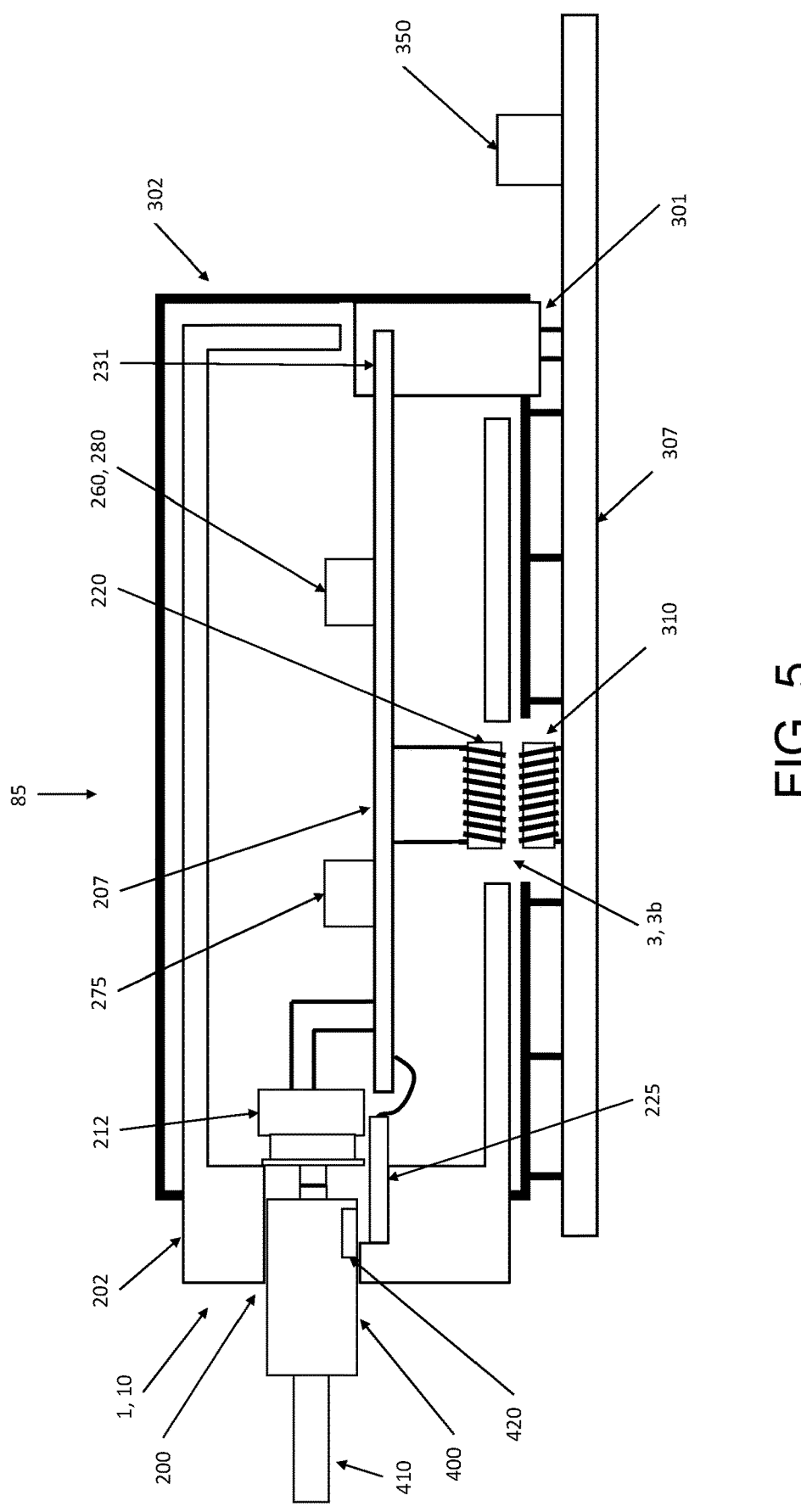
FIG. 5 is a cutaway profile view of an RFID cable connector, RFID transceiver, and a host RFID transceiver interface port and RFID reader, according to an embodiment.

In the embodiment illustrated in FIG. 4 and FIG. 5, the RTPS can be configured to program a pluggable transceiver installed in a transceiver interface port of a host device using RFID and to program said pluggable transceiver with a cable connector installed in said pluggable transceiver network interface using RFID.

In the illustrated embodiments, the system includes: a host 85 (e.g. only partially illustrated in FIG. 4), wherein transceiver interface 300 can be configured with at least a data communications interface, management interface, power and physical interfaces, and preferably also an RFID interface; a fiber optic cable 410 and plug connector 400 assembly, wherein plug connector 400 can be adapted with an RFID interface and programmed with RFID data; an RFID transceiver 1, 10, wherein network interface 200 can be configured with at least one fiber optic socket connector, wherein said socket connector can be adapted with an RFID interface and configured to receive RFID data from the plug connector 400 RFID interface.

In the present embodiment, network interface 200 socket connector can be positioned on a faceplate of RFID transceiver 1, 10 housing 202 and configured to detachably connect to said fiber optic cable plug connector 400, wherein network interface 200 fiber optic socket connector can be connected to media converter 210 to enable optical communications therethrough. In the present embodiment, media converter 210 can be configured to transmit and receive optical data communication signals to network interface 200 fiber optic cable connector socket and to convert the optical signals to electrical signals and to transmit and receive electrical data communication signals to host interface 230 data communications interface.

In the present embodiment, plug connector 400 RFID interface can be configured with an RFID antenna and RFID memory 420 (e.g. an RFID tag), wherein RFID antenna and RFID memory 420 can be configured to transmit and receive RFID data from said fiber optic cable plug connector 400 RFID interface upon RFID interrogation, and wherein said RFID memory 420 can be programmed to contain RFID data defining a desired configuration of RFID transceiver 1, 10.

For example, said connector plug 400 can be configured to be a detachable molded plastic LC fiber optic plug connector 400 assembled onto a fiber optic cable 410 to form a fiber optic cable assembly, wherein a miniature NFC or RFID tag 420 can be configured with an RFID antenna and memory, and wherein said RFID tag can be configured to be embedded in said LC plug connector 400 housing, and wherein said RFID tag can be programmed with RFID data. For example, said RFID tag can be configured to have approximate dimensions of 3.0 mm×2.0 mm×0.35 mm or preferably smaller. For example, the RFID transceiver 1, 10 faceplate and network interface 200 socket connector can be configured to be compatible with MSA standard INF-8074 and configured to receive said LC plug connector 400. For example, media converter 210, network interface 200 and LC fiber optic connector socket can be configured to provide an Ethernet 802.3ae 10GBASE-LR interface. For example, the media convertor 210 can consist of at least a TOSA, ROSA, laser driver and optical receiver amplifier mounted on a PCBA 207 and can be configured to transmit and receive said Ethernet 802.3ae 10GBASE-LR communications signals to the network interface 200 and the host interface 230 data.

In the present embodiment, said fiber optic cable plug connector 400 RFID interface can be configured to mate to said network interface 200 fiber optic cable socket connector RFID interface, wherein said RFID interfaces can be positioned proximate to one another when mated to enable RFID data communications therethrough.

In the present embodiment, controller 250 can be configured with an RFID reader 275 and RFID antenna 225, wherein controller 250, RFID reader 275 and RFID antenna 225 can be configured to transmit and receive RFID data to said network interface 200 socket connector RFID interface and plug connector 400 RFID interface, and to receive RFID data stored in plug connector 400 RFID tag 420 from said network interface 200 RFID interface and plug connector 400 RFID interface, and to program RFID transceiver 1, 10 to a desired configuration using said received RFID data.

In the present embodiment, said connector plug 400 RFID memory 420 can contain RFID data describing a fiber optic cable 410 and connector 400 assembly configuration, wherein said cable configuration RFID data can be used to configure RFID transceiver 1, 10, for example said cable configuration data can comprise at least any of the following RFID data:

Cable assembly part number and serial number identification data,

RFID memory part number, serial number, UID identification data

Cable physical parameter data such as cable type, e.g. SMF, and cable length, etc., Cable transmission parameter data such as optical attenuation, CD, PMD, PDL, etc., Location data, etc.

In the embodiment illustrated in FIG. 5, housing 202 and network interface 200 fiber optic socket connector can be adapted with RFID antenna 225 positioned within a dielectric aperture or material of an interior sidewall of said network interface 200 fiber optic connector socket housing 202, wherein RFID antenna 225 can be positioned to provide said network interface 200 connector RFID interface proximate to said mated fiber optic cable plug connector 400 configured with a corresponding RFID interface. In the present embodiment, RFID antenna 225 can be configured as a coil antenna, for example a planar coil on a flexible printed circuit or a planar wire coil mounted on a flexible substrate and configured to be connected to a PCBA or cable within RFID transceiver 1, 10 housing 202 and connected RFID reader 275. In an embodiment, housing 202 can be composed of metallic materials, wherein RFID antenna 225 can be configured with a ferrite substrate attached to its base and configured to isolate and shield RFID antenna 225 from the housing 202 metal sidewalls, and to minimize RFID transmission interference from said housing 202 metal sidewalls, and to maximize RFID coupling with RFID tag 420. In an embodiment, housing 202 can be composed of metallic materials and can be configured with ferrite materials attached to the interior sidewalls of said network interface 200 socket connector and configured to isolate and shield RFID antenna 225 from said housing 202 metal sidewalls, and to minimize RFID transmission interference from said housing 202 metal sidewalls, and to maximize RFID coupling with RFID tag 420. For example, said RFID antenna 225 can be configured with a planar coil antenna on a flex circuit having approximate dimensions of 3.0 mm×3.0 mm×0.35 mm.

In the present embodiment, fiber optic cable plug connector 400 RFID memory and antenna 420 can be embedded within the connector plug 400 housing, wherein said RFID antenna 420 can be positioned within an exterior sidewall composed of dielectric material of said connector plug 400 housing and positioned to provide said connector plug 400 RF interface.

In an embodiment, controller 250 can be configured to detect the presence or absence of fiber optic cable plug connector 400 positioned in network interface 200 fiber optic socket connector by detecting the presence or absence of said plug connector 400 RFID memory 420, for example controller 250 reads RFID memory 420 periodically and determines when RFID communications with RFID memory 420 is established or not.

In the present embodiment, controller 250 can be configured to read RFID data read from plug connector 400 RFID memory 420 and to program RFID transceiver 10 to a desired configuration using said RFID data. In an embodiment, controller 250 can be configured to store said RFID data read from said fiber optic plug connector 400 RFID memory 420 in memory 240.

In the present embodiment, controller 250 can be configured to read RFID data read from memory 240 and to program said connector plug 400 RFID memory 420 to a desired configuration using said RFID data.

For example, RFID tag 420 can be programmed with RFID data identifying a fiber optic cable assembly configuration can be embedded in the housing of an LC fiber optic plug connector 400 of said optical cable 410 assembly, wherein said LC plug connector 400 can be installed in RFID transceiver 10 network interface 200 fiber optic socket connector to position said plug connector 400 RFID interface proximate to said network interface 200 socket connector RFID interface, and controller 250 can be configured to read and write RFID data to said NFC tag 420 and to program media converter 210 to a desired operating configuration using said cable configuration RFID data, for example to configure the laser transmitter output power and or wavelength.

As can be appreciated, a method for configuring RFID transceiver 1, 10 connected to host 85 and a plug connector 400 using RFID can be provided. The method can include the steps of:

a) providing host 85;

b) plugging RFID transceiver 1, 10 into host 85 and mating host interface 230 to transceiver interface 300;

c) powering up RFID transceiver 1, 10;

d) providing a plug connector 400 having RFID data stored in RFID memory 420 defining a desired configuration of RFID transceiver 1, 10;

e) plugging the plug connector 400 into RFID transceiver 1, 10 network interface 200 placing the plug connector 400 RFID interface proximate to network interface 200 RFID interface;

f) using an RFID interface on the connector plug 400 to transmit RFID data from the connector plug 400 RFID memory 420;

g) using an RFID interface on network interface 200 to receive said RFID data; h) using controller 250 and RFID reader 275 to read said RFID data from network interface 200 RFID interface;

i) programming RFID transceiver 1, 10 according to the desired configuration defined by said RFID data read in step h).

In an embodiment, the method can include the steps of:

a) providing a host 85;

b) plugging RFID transceiver 1, 10 into host 85 and mating host interface 230 to transceiver interface 300;

c) powering up RFID transceiver 1, 10;

d) providing RFID transceiver 1, 10 configured with memory 240 having RFID data programmed in memory 240 defining a desired configuration of connector plug 400;

e) plugging the connector plug 400 into RFID transceiver 1, 10 network interface 200 placing network interface 200 RFID interface proximate to the plug connector 400 RFID interface;

f) using controller 250 and RFID reader 275 to write said RFID data to network interface 200 RFID interface;

g) using an RFID interface on network interface 200 to transmit RFID data;

h) using an RFID interface on the plug connector 400 to receive RFID data in RFID memory 420;

i) programming the plug connector 400 according to the desired configuration defined by said RFID data written in step h).

In an embodiment, a method of programming plug connector 400 to a desired configuration using smart label 5 and RTPS mobile station 15 can be provided, wherein plug connector 400 RFID memory 420 can be configured with identification RFID data to at least identify plug connector 400 part number and serial number, and wherein smart label 5 can be programmed with identification RFID data to at least identify a configuration of said cable 410 and plug connector 400 assembly part number and serial number.

The method can include the steps of: a) using the RTPS App to execute a workorder RFID data stored in RTPS database 20 or 50; b) using RFID interface 25 to read identification RFID data from smart label 5 and to select a smart label 5; c) using RFID interface 25 to read identification RFID data from plug connector 400 and to select a plug connector 400; d) using RFID interface 25 to program selected plug connector 400 to a desired configuration, wherein plug connector 400 can be programmed by writing identification and configuration RFID data to plug connector 400, and wherein said written identification RFID data at least contains the part number and serial number identification RFID data read from selected smart label 5; and e) physically attaching the selected smart label 5 and programmed plug connector 400 together. In some embodiments, smart label 5 can be attached to cable 410 prior to starting said method, and consequently step e) may not be required for said method. For example, smart label 5 can be configured to be attached to cable 410 using a standard plastic cable tie. For example, said written RFID data can be defined by the workorder, programming instructions, identification and configuration RFID data stored in RTPS database 20 or 50, wherein said RFID data can define an operating configuration of said cable 410 and or RFID transceiver 1, 10 to which it is connected to.

In an embodiment, a method for configuring a plug connector 400 using an RTPS mobile station 15 can include the steps of:

a) providing an RTPS mobile station 15 configured with a memory having RFID data stored in said memory defining a desired configuration of connector plug 400;

b) placing said RTPS mobile station 15 RFID interface 25 proximate to the plug connector 400 RFID interface;

c) using the RFID interface 25 on the RTPS mobile station 15 to transmit said RFID data;

d) using an RFID interface on plug connector 400 to receive said RFID data in RFID memory 420;

e) programming plug connector 400 according to the desired configuration defined by said RFID data written in step d).

In the embodiments illustrated in FIGS. 6, 7A, 7B, and 8, the RTPS can be configured to program a pluggable transceiver installed in a transceiver interface port of a host device using RFID and to program said pluggable transceiver configured with a pluggable transceiver housing handle or ejector using RFID.

For example, an RTPS can include: host 85 (e.g. at least partially illustrated in FIG. 6), wherein transceiver interface 300 can be configured with at least a data communications interface, a management interface, and power and physical interfaces, and preferably also an RFID interface; RFID transceiver 1, 10, wherein housing 202 can be configured with an ejector 217 adapted with an RFID repeater 500 mated to said housing 202, wherein the RFID repeater 500 can be configured to provide internal and external repeater RFID interfaces, wherein RFID transceiver 1, 10 can be configured to receive RFID data from an external RFID reader 15; and an external RFID reader 15 configured with a memory having RFID data stored therein defining a desired operating configuration of RFID transceiver 1, 10.

Figure 7B:
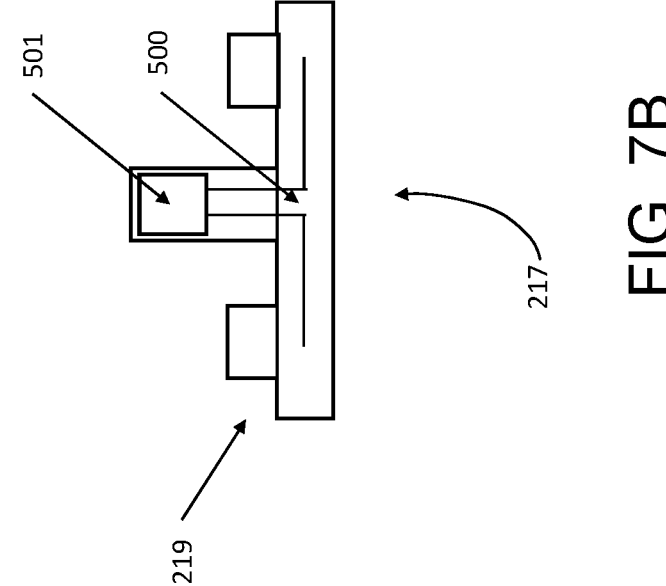
FIG. 7B is a cutaway view of showing a connector for connecting the ejector to the RFID transceiver.
Figure 7A:
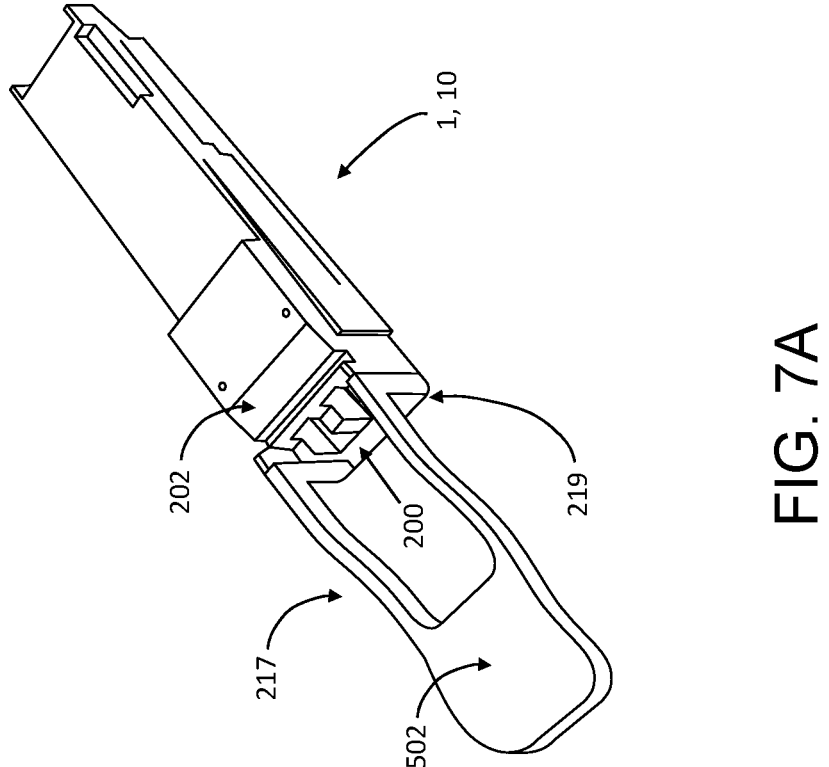
FIG. 7A is an isometric view of an RFID transceiver, according to an embodiment configured as an optical SFP+ compatible pluggable transceiver comprising an ejector with an external field-concentrating RFID repeater integrated therein.
Figure 8:
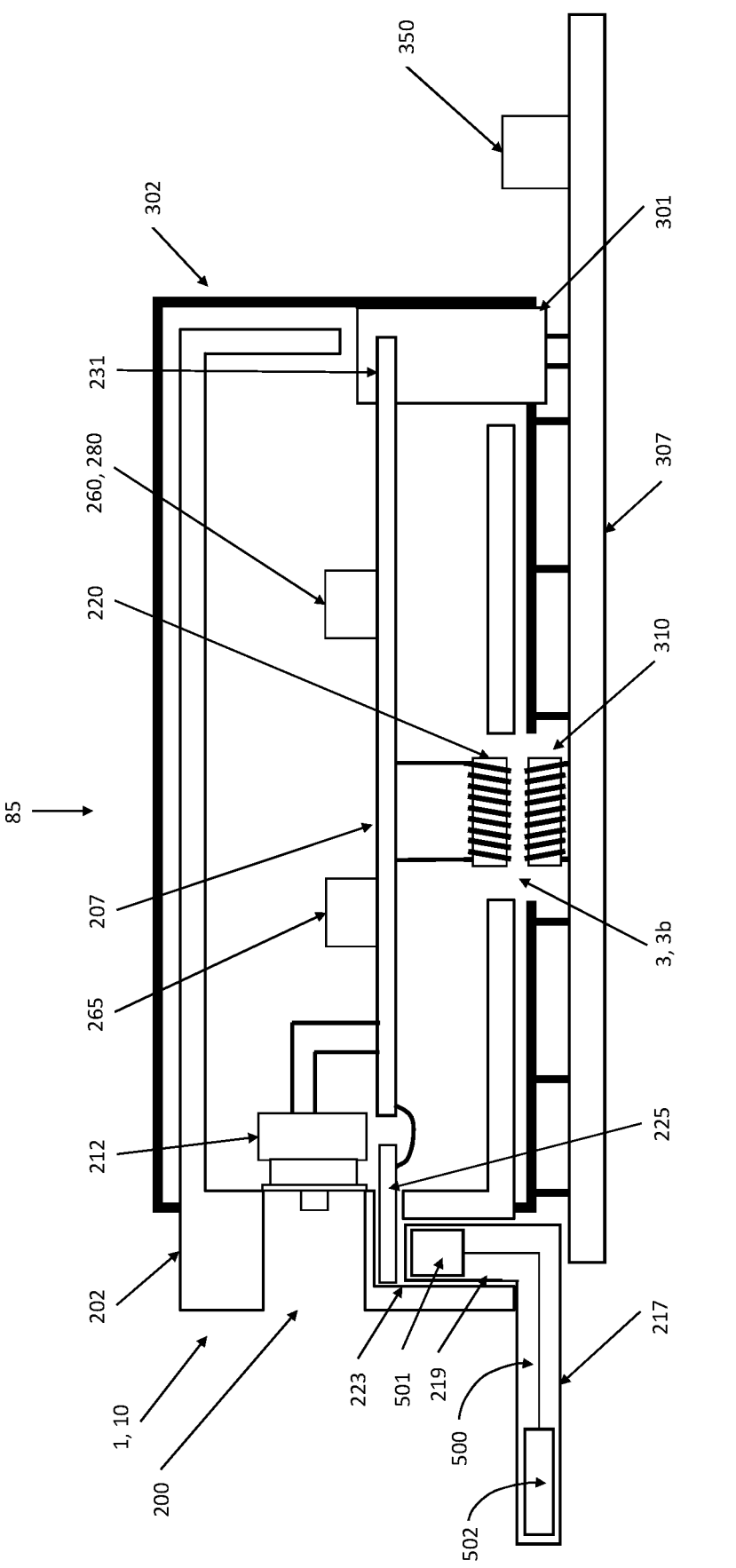
FIG. 8 is a cutaway profile view of the RFID of FIG. 7A engaged in a host RFID transceiver interface port.

In the embodiment illustrated in FIGS. 7A, 7B, and 8, said RFID repeater 500 can be configured to concentrate and couple magnetic fields and passively relay RFID signals between the external RFID reader 15 and the pluggable transceiver 1,10 ejector 217 RFID interface to facilitate programming the RFID transceiver 1, 10 to a desired configuration. In the present embodiment, ejector 217 can be configured with a connector 219, wherein connector 219 can be formed to mate with RFID transceiver 1, 10 housing 202, wherein ejector 217 can be at least partially composed of dielectric materials containing at least RFID repeater 500 RFID antenna 501 and RFID antenna 502. In the present embodiment, RFID antenna 501 can be positioned within the ejector 217 connector 219 body, wherein connector 219 and RFID antenna 501 can be configured to be attached to a corresponding mating connector 223 formed on housing 202 faceplate, and a second RFID antenna 502 can be positioned within the ejector 217 handle body. In the present embodiment, RFID antenna 502 can be configured to transmit and receive RFID data from an external RFID reader 15 positioned proximate to ejector 217 handle RFID antenna 502.

In the present embodiment, RFID transceiver 1, 10 connector 223 can be configured to provide an RFID interface, wherein connector 223 can be positioned on an exterior sidewall of housing 202 and configured to mate with ejector 217 connector 219 and RFID antenna 501. In the present embodiment, RFID antenna 225 can be positioned within a dielectric aperture or material of said housing 202 connector 223 to provide an RFID interface, and wherein RFID repeater 500 RFID antenna 501 can be positioned proximate to housing 202 RFID antenna 225 to enable RFID data communications therethrough. In the present embodiment, the RFID transceiver 1, 10 controller 250 can be configured with RFID memory 265 and RFID antenna 225 configured to transmit and receive RFID data from housing 202 connector 223 RFID interface, and wherein controller 250 can be configured to read RFID data from RFID memory 265 and to program RFID transceiver 1, 10 to a desired configuration using said RFID data.

In the present embodiment, the external RFID reader 15 can be positioned proximate to ejector 217 RFID interface 502, wherein external RFID reader 15 can be configured to program RFID memory 265 using RFID data, and wherein controller 250 can be configured to read said RFID data from RFID memory 265 and to program RFID transceiver 1, 10 to a desired configuration defined by said RFID data. In an embodiment, controller 250 can be configured to read RFID data from memory 240 and write said RFID data to RFID memory 265, wherein said external RFID reader positioned proximate to ejector 217 RFID antenna 502 can be configured to read said RFID data from RFID memory 265 and store it in its memory.

For example, a pluggable RFID transceiver 1, 10 can be configured with an ejector 217 RFID interface and installed in a host device 85, wherein the pluggable transceiver can be programmed to perform diagnostic tests using the external RFID reader 15 and to transmit diagnostic test result data to said external RFID reader 15 using the ejector 217 RFID interface.

In an embodiment, RFID repeater 500 RFID antenna 501 can be configured as a coil antenna such as a inductor coil or wire coil antenna and RFID antenna 502 can be configured as a planar wire coil or printed coil antenna, wherein both RFID antenna are interconnected using an electrical conductor wires or printed circuit, and wherein each RFID antenna 501, 502 circuit and electrical connecting circuit can be embedded in a dielectric material of ejector 217 handle and connector 219 body. For example, RFID antenna 501 can be configured as an inductor coil having approximate dimensions of 2.3 mm W×1.8 mm D×1.6 mm H or preferably smaller. For example, said RFID antenna 502 can be configured with a planar coil antenna on a flex circuit having approximate dimensions of 10.0 mm×10.0 mm×1.0 mm or preferably larger. For example, said housing 202 connector 223 can be configured to receive ejector 217 connector 219 having approximate dimensions of 3.5 mm W×2.8 mm D×2.6 mm H or preferably smaller.

In the present embodiment, the ejector 217 and connector 219 and RFID transceiver 1, 10 housing 202 and connector 223 can be formed to be attached together and to provide a means to reliably and repeatably insert and extract RFID transceiver 1, 10 from host 85 transceiver interface 300 port using the ejector 217 handle.

In the embodiment illustrated in FIG. 8, housing 202 connector 223 can be adapted with RFID antenna 225 positioned within a dielectric aperture or material of an interior sidewall of said connector 223 housing 202, wherein RFID antenna 225 can be positioned to provide an RFID interface to ejector 217 connector 219 repeater 500 RFID antenna 501 RFID interface. In the present embodiment, RFID antenna 225 can be configured as a coil antenna, for example a planar coil on a flexible printed circuit or a planar wire coil mounted on a flexible substrate and configured to be connected to a PCBA or cable within RFID transceiver 1, 10 housing 202 and connected RFID memory 265. In an embodiment, housing 202 can be composed of metallic materials, wherein RFID antenna 225 can be configured with a ferrite substrate attached to its base and configured to isolate and shield RFID antenna 225 from the housing 202 metal sidewalls, and to minimize RFID transmission interference from said housing 202 metal sidewalls, and to maximize RFID coupling with RFID tag 420. In an embodiment, housing 202 can be composed of metallic materials and can be configured with ferrite materials attached to the interior sidewalls of said connector 223 and configured to isolate and shield RFID antenna 225 from said housing 202 metal sidewalls, and to minimize RFID transmission interference from said housing 202 metal sidewalls, and to maximize RFID coupling with RFID antenna 501. For example, said RFID antenna 225 can be configured with a planar coil antenna on a flex circuit having approximate dimensions of 3.0 mm×3.0 mm×0.35 mm or preferably smaller.

In the present embodiments, the RFID antenna 225 and RFID repeater 500 RFID antenna 501 and 502 can be configured for resonant inductive coupling, and near field communications. It should be noted that resonant inductive circuits can also be used as bandpass filters due to their relatively narrow EM signal frequency pass band around the resonant operating frequency. In an embodiment, RFID repeater 500 and ejector 217 can be configured with an electro-magnetic filter, such as an electronic filter device formed using inductor, capacitor and resistor elements, structures and or components and the RFID repeater 500 circuits and ejector 217 materials, to minimize unintended electro-magnetic emissions from RFID transceiver 1, 10 RFID interface connector 223 and connector 219. In an embodiment, RFID repeater 500 can be configured with an electro-magnetic shielding filter, such as an electronic filter device formed using ferrite materials and the RFID repeater 500 circuits and ejector 217 materials, to minimize unintended electro-magnetic emissions from RFID transceiver 1, 10 RFID interface connector 223 and connector 219. Note that the RFID antenna and repeater electronic tuning elements, structures and or components, and resulting antenna tuning, can be used to minimize unintended electro-magnetic radiation while optimizing RFID communications therethrough. For example, the RF repeater 500 can be tuned to a frequency 13.56 MHz to passively receive and transmit RIFD or NFC RF signals, and can filter out other unwanted EM signals from passing through the RFID transceiver 1, 10 RFID interface connector 223 and the ejector 217 RFID interface.

In an embodiment, ejector 217 can be adapted with RFID antenna 502 configured as a coil antenna such as a planar printed circuit or wire coil antenna, wherein the RFID antenna 502 circuit can be connected to an electrical connector or wire terminals 501 on formed on connector 219, and wherein said electrical connector 501 and can connector 219 can be detachably connected to RFID transceiver 1, 10 PCBA 207, or a cable connected to PCBA 207, through housing 202 connector 223, and wherein RFID antenna 502 can be connected to RFID memory 265 to enable RFID communications therethrough.

Figure 6:
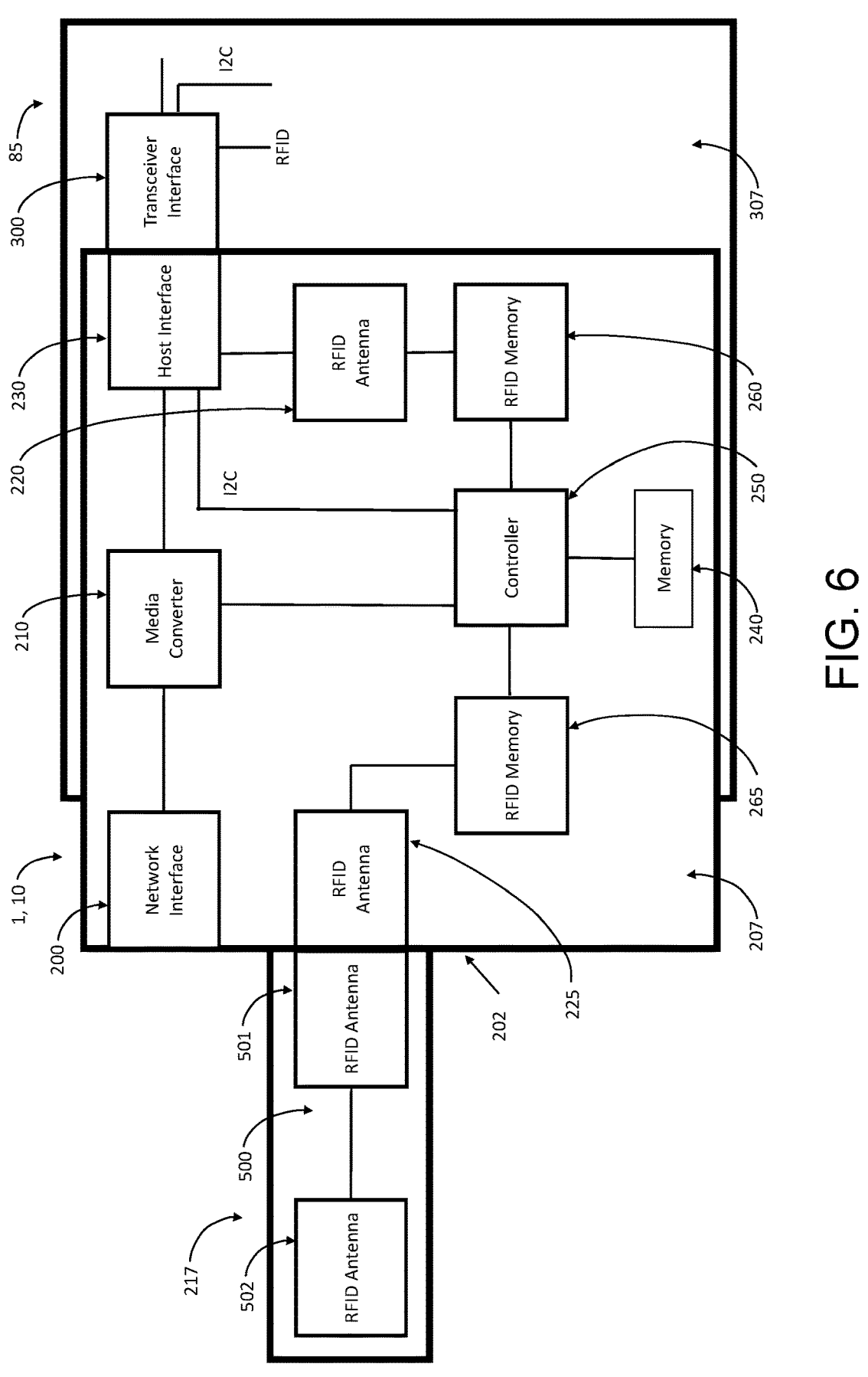
FIG. 6 is a block diagram of an RFID transceiver configured with an ejector containing an RFID repeater and host RFID transceiver interface, according to an embodiment.

In an embodiment illustrated in FIG. 6, RFID transceiver 1, 10 can be configured with at least host interface 230 RFID interface, RFID memory 260 and RFID antenna 220, and RFID repeater 500 RFID interface, RFID memory 265 and RFID antenna 225, wherein controller 250 can be configured to read RFID data from RFID memory 260 and or RFID memory 265 and to program RFID transceiver 1, 10 to a desired configuration using said RFID data. In the present embodiment, RFID transceiver 1, 10 can be configured with host interface 230 RFID interface, RFID memory 260 and RFID antenna 220, and RFID repeater 500 RFID interface, RFID memory 265 and RFID antenna 225, wherein controller 250 can be configured to write RFID data to RFID memory 260 and or RFID memory 265, and wherein an external RFID reader 15 positioned proximate to ejector 217 RFID repeater 500 RFID interface can be configured to read said RFID data from memory 265 and to store it its memory, and wherein a host 85 can be configured to read said RFID data from RFID memory 260 and to store it in its memory.

In an embodiment, RFID transceiver 1, 10 can be configured with an LED connected to PCBA 207, wherein the LED can be configured and positioned to emit light from the housing 202 faceplate, wherein controller 250 can configured to activate said LED when controller 250 receives RFID data from an external RFID reader 15, and wherein said LED RFID activity indicator or monitor can be configured to be visible to an operator facing said housing 202 faceplate.

In an embodiment, RFID memory 265 can be configured with a general purpose output, wherein said RFID memory 265 can be programmed by an external RFID reader 15 to turn on or off the RFID transceiver 1, 10 internal power supply, for example to power on or off said RFID transceiver 10 remotely wherein said power can be received from the host interface 230.

In an embodiment, a method for programming a RFID transceiver 1, 10 configured with an ejector 217 RFID interface and connected to host 85 using an external RFID reader 15 can include the steps of:
   a) providing an external RFID reader 15 configured with a memory having RFID data stored in said memory defining a desired configuration of RFID transceiver 1, 10;
   b) plugging RFID transceiver 1, 10 into host 85;
   c) powering up RFID transceiver 1, 10;
   d) using the external RFID reader 15 positioned proximate to RFID transceiver 1, 10 ejector 217 RFID interface 502 to transmit RFID data;
   e) using RFID repeater 500, RFID interfaces 502 and 501 to transmit said RFID data to RFID transceiver 1, 10 housing 202 connector 223 RFID interface;

f) using RFID transceiver 1, 10 connector 223 RFID interface to receive said RFID data in RFID memory 265;
   g) reading said RFID data from RFID memory 265 using controller 250;
   h) programming RFID transceiver 1, 10 according to the desired configuration defined by said data read in step g).
In an embodiment, the method can include the steps of:
   a) providing an external RFID reader 15 configured with a memory having RFID data stored in said memory defining a desired configuration of RFID transceiver 1, 10;
   b) plugging RFID transceiver 1, 10 into host 85;
   c) using the external RFID reader 15 in proximity to RFID transceiver 1, 10 ejector 217 RFID interface 502 to transmit RFID data;
   d) using RFID repeater 500, RFID interfaces 502 and 501 to transmit said RFID data to RFID transceiver 1, 10 housing 202 connector 223 RFID interface;
   e) using RFID transceiver 1, 10 connector 223 RFID interface to receive said RFID data in RFID memory 265;
   f) powering up RFID transceiver 1, 10;
   g) reading said RFID data from RFID memory 265 using controller 250;
   h) programming RFID transceiver 1, 10 according to the desired configuration defined by said data read in step g).

Figure 9:
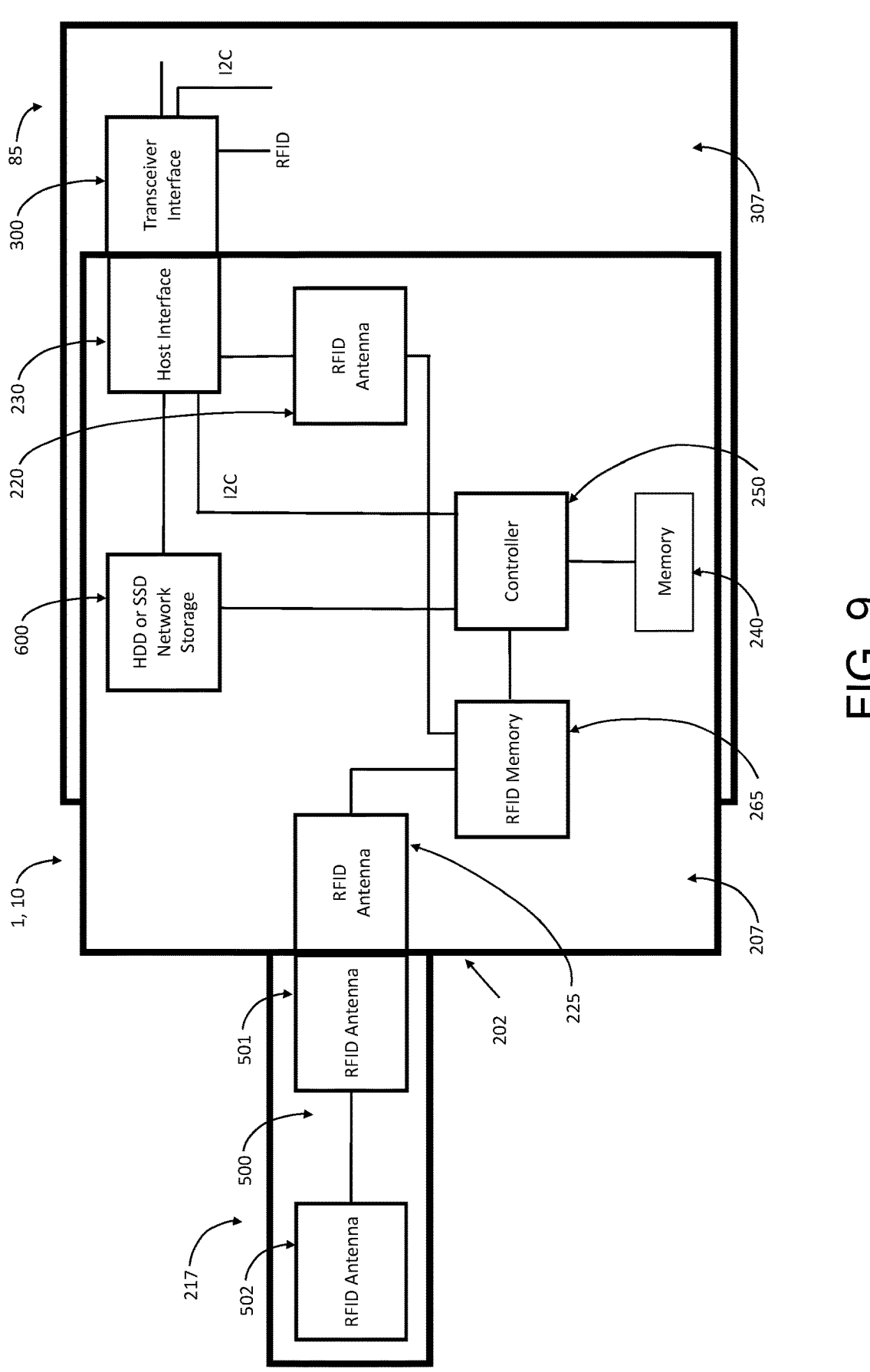
FIG. 9 is a block diagram of an RFID transceiver, according to an embodiment configured with an RFID repeater ejector and one internal RFID memory adapted with two RFID antenna ports.

In an embodiment, for example illustrated in FIG. 9, RFID transceiver 1, 10 can be adapted with a network attached storage device 600, for example configured with a hard disk drive (HDD) or a solid state disk drive (SSD) storage device configured to provide a plurality of gigabytes of memory used for data storage and can be configured with an integrated storage controller and processor configured with an Ethernet network interface mounted on PCBA 207. In the present embodiment, wherein RFID transceiver 1, 10 network storage device 600 can be configured to connect to at least one said network using host interface 230, and to transmit and receive data from host interface 230 data communications interface and to store and retrieve said data in a said storage memory. In the present embodiment controller 250 can be configured to read RFID data stored in RFID memory 265 and or configuration data stored in memory 240 and to program network storage device 600 (i.e. RFID transceiver 10) to a desired configuration. In the present embodiment, host 85 and transceiver interface 300 can be configured with a corresponding data communications interface, wherein the host 85 and transceiver interface 300 data communications interface can be configured to connect to a network. For example, host 85 can be configured as an Ethernet switch providing a plurality of transceiver interface 300 ports, wherein each interface 300 port can be connected to at least one network using said host 85 Ethernet switch, wherein said host 85 Ethernet switch can be configured to connect to at least one network, and wherein said host 85 Ethernet switch can be configured to receive said network storage RFID transceiver 1, 10 host interface 230 in at least one said transceiver interface 300 port and to connect the network storage device 600 to at least one said network. In an embodiment, RFID transceiver 1, 10 network storage device 600 can be configured to connect to an external network using a network interface 200 and to transmit and receive data from network interface 200 using a media converter 210, wherein media converter 210 can be connected a network interface of the storage device 600, and wherein storage device 600 can be configured to provide a network interface to the media converter 210, and wherein storage device 600 can be configured to store and retrieve said data from said storage memory.

For example, network-attached storage (NAS) and storage area networks (SANs) are the two main types of networked storage. NAS is a dedicated file storage that enables multiple users and client devices to retrieve data from centralized HDD and or SDD capacity, wherein users on a local area network (LAN) access the shared storage via a standard Ethernet connection, wherein NAS devices can typically be configured and managed with a web browser-based utility, and wherein each NAS resides on the LAN as an independent network node, defined by its own unique Internet Protocol (IP) address. A NAS can be configured to process unstructured data, such as audio, video, websites, text files and documents, whereas SANs can be configured primarily for block storage inside databases, also known as structured data. NAS provides both storage and a file system, whereas a SAN provides only block-based storage and leaves file system concerns on the "client" or user side. NAS network protocols include at least include Ethernet, and SAN network protocols include at least Fibre Channel, iSCSI, ATA over Ethernet (AoE) and HyperSCSI.

In an embodiment, said network storage RFID transceiver 1, 10 can be configured in an standard or MSA pluggable transceiver form factor or a standard or MSA pluggable storage device form factor, wherein at least the housing 202, host interface 230 and storage device 600 can be configured to provide said standard pluggable device host interface, including said network connection, and form-factor. For example, standard pluggable storage devices can include SATA, USB SATA, etc., storage devices.

In an embodiment, said network storage RFID transceiver 1, 10 can be configured with said host interface 230 and an RFID interface, RFID memory 260 and RFID antenna 220 and an ejector 217 RFID interface, RFID memory 265 and RFID antenna 225, for example a similar RFID memory configuration as shown in FIG. 6, wherein controller 250 can be configured to read and write RFID data to RFID memory 260 and or RFID memory 265, and to program RFID transceiver 1, 10 to a desired configuration using RFID data read from RFID memory 260 and or RFID memory 265.

In the above-described embodiments, various types of RFID interfaces and RFID antenna configurations were described for allowing the programming of network and pluggable transceivers using RFID. Although these RFID interface and antenna configurations were described individually, it can be appreciated that two or more of such RFID interfaces can be provided on a single transceiver device, for example to provide different ways to program network and pluggable transceivers using RFID. For example, RFID transceivers 1, 10 can be configured with an internal RFID memory 260 or an internal RFID reader 280, providing an smart label 5 RFID interface and a corresponding smart label 5 configuration attached to said RFID interface and used to program said transceiver 1, 10 to a desired configuration with RFID data stored in the smart label 5 or stored in the external RFID reader 15 or stored in the internal the RFID memory 260, in addition, said RFID transceiver 1, 10 can also be configured with an internal RFID reader 275 providing a network cable RFID interface and a corresponding network optical cable connector 400 configuration attached to said network cable RFID interface wherein said cable connector 400 can be configured with said corresponding RFID interface and with RFID data programmed in an RFID memory 420, wherein said RFID can be read using said internal RFID reader 275 and used to program said transceiver 1, 10 to a desired configuration, in addition, said RFID transceiver 1, 10 can also be configured with an internal RFID memory 265 and an RFID repeater 500 providing a housing ejector 215 RFID interface wherein an external RFID reader 15 containing RFID data in a memory can be positioned proximate to said ejector 217 RFID interface wherein said external RFID reader 15 can be configured to write said RFID to said internal RFID memory 265 using the RFID repeater 500, and wherein said RFID data programmed into the internal RFID memory 265 can be used to program said RFID transceiver 1, 10 to a desired configuration.

For example, in an embodiment illustrated in FIG. 9, RFID transceiver 1, 10 RFID memory 265 can be configured with two RFID antenna inputs or interface ports. In the present embodiment, a first RFID memory 265 antenna input can be connected to RFID antenna 225 and a second RFID memory 265 input can be connected to RFID antenna 220, wherein RFID memory 265 can be configured to receive RFID data from RFID antenna 225 and RFID antenna 220, wherein controller 250 can be configured to read said RFID data from RFID memory 265 and to program RFID transceiver 1, 10 to a desired operating configuration using said RFID data.

In the present embodiment, RFID memory 265 can be configured with at least two separate or independent RFID antennas, antenna receivers, TIDs/UIDs and memories wherein each said RFID antenna memory can be configured to receive and store RFID data independently. In the present embodiment, said RFID memory 265 can also be configured with at least one controller interface, wherein said controller interface can be configured to provide read and write access to RFID data contained in both said antenna memories of RFID memory 265 and to program RFID data into said independent RFID 265 memories or read RFID data from said independent RFID 265 memories.

Figure 10:
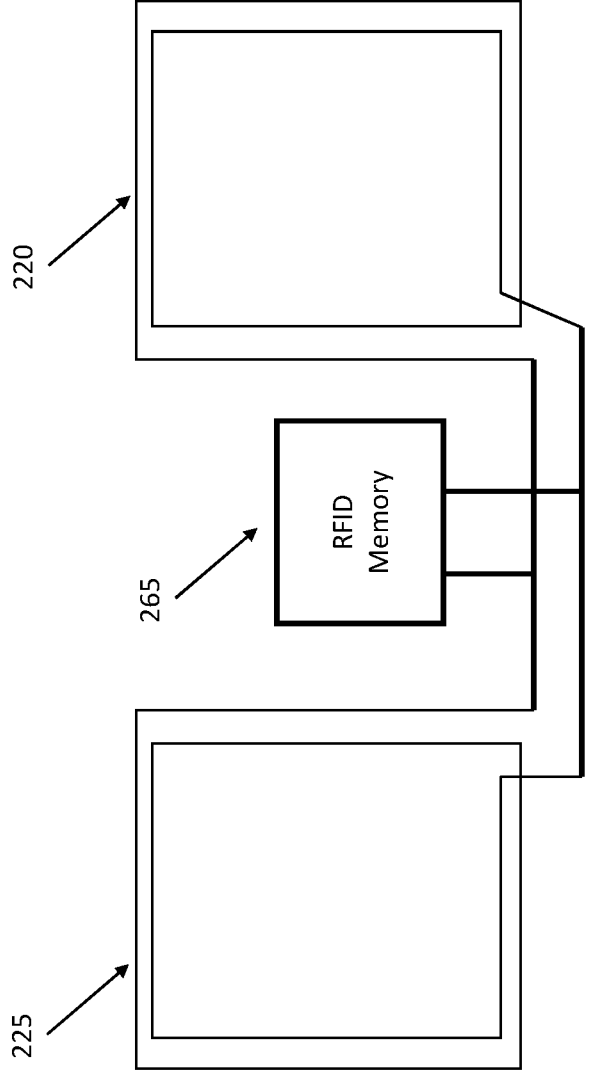
FIG. 10 is schematic diagram of a smart label RFID repeater, according to an embodiment configured with an RFID memory, and wherein an antenna interface port of said RFID memory is connected to two RFID antennas.

For example, in another embodiment illustrated in the schematic diagram shown in FIG. 10, an RFID memory 265 device can be connected to an RFID repeater circuit formed with RFID antenna 225 and RFID antenna 220 circuits connected together using an electrical circuit, wherein the RFID memory 265 antenna inputs can be connected to said electrical circuit.

In some embodiments, RFID memory 265 can be configured with a single antenna receiver, TID/UID and memory and to transmit and receive RFID data from RFID antenna 225 and RFID antenna 220 upon interrogation from an RFID reader, for example an external RFID reader 15. For example, said RFID memory configuration can be used in the smart label 5 to provide an external RFID interface to external RFID reader 15 and an internal interface to RFID transceiver 1, 10 RFID antenna 220 through aperture 3.

In some embodiments, RFID memory 265 can be configured to transmit and receive RFID data from RFID antenna 220 and RFID antenna 225 wherein RFID memory 265 can be configured with a single antenna receiver and at least two independent TIDs/UIDs and memories, wherein each said TID and memory can be configured to receive and store RFID data independently from both RFID antenna 220 and 225. For example, the first and second TID and memory can be configured with a first and second password or code, wherein a first RFID reader can be configured with said first password and a second RFID reader can be configured with said second password, and wherein said first RFID reader can access said first memory using said first password and wherein said second RFID reader can access said second memory using said second password.

For example, RFID memory 265, RFID repeater and RFID antenna 220, 225 circuits can be formed on a flexible substrate wherein said RFID repeater and memory substrate can be configured as an smart label 5, wherein said smart label 5 can be configured attached to RFID transceiver 1, 10, and wherein said smart label 5 can be configured to provide an RFID interface to an external RFID reader 15 or to an RFID transceiver 1, 10 internal RFID reader 280 RFID interface positioned proximate to said smart label 5 RFID interfaces (e.g. RFID antenna 220, 225). For example, RFID memory 265 can be configured with two TIDs and memories, wherein the external RFID reader 15 can be configured to access both RFID memory 265 TIDs and memories while the RFID transceiver 1, 10 internal RFID reader 280 can be configured to access only one said TID and memory.

For example RFID memory 265 can be configured with two memory areas, wherein a first memory area is reserved for the external RFID reader 15 read/write access and a second memory area is reserved for the RFID transceiver 1, 10 internal RFID reader 280 read/write access, and wherein the external RFID reader 15 and the internal RFID reader 280 can be configured to read and write to their respective memory areas. In such an embodiment, the external RFID reader 15 and internal RFID reader 280 can be configured to detect and manage RFID memory 265 memory access collisions. In some embodiments, the two said RFID memory 265 memory areas can be each secured with a password, wherein the external RFID reader/writer 15 and internal RFID reader/writer 280 can each be configured with a different password, and wherein each must write a corresponding matching password to RFID memory 265 memory area to enable at least reading data from said memory area.

In another embodiment, said single port dual TID RFID memory 265 can be configured with a controller interface (e.g. an 12C interface) and configured to be installed on a PCBA within an RFID transceiver 1, 10, wherein controller 250 can be configured to read and write RFID data to each said RFID memory 265 memory independently, wherein RFID memory 265 can be configured to transmit and receive RFID data from either RFID memory 265 memory using RFID antenna 225 and RFID antenna 220 upon interrogation from an RFID reader positioned proximate to said RFID antenna 220 or 225, and wherein controller 250 can be configured to read RFID memory 265 and to program RFID transceiver 10 to a desired configuration using said RFID data read from either RFID memory 265 memory and received from RFID antenna 225 and or RFID antenna 220.

In another embodiment, a circuit can be formed to connect a plurality of RFID memory 265 to one RFID antenna, wherein each RFID memory 265 can be configured with a unique TID and memory, for example multiple RFID memory devices can be connected in parallel to increase total RFID memory capacity presented at an RFID interface and for example said circuit can be used mitigate current RFID device memory limitations to store more data in a smart label 5 or within an RFID transceiver 1, 10. In an embodiment, each said RFID memory 265 of a plurality of RFID memory 265 can be connected to controller 250, wherein the controller 250 can be configured to connect to said plurality of RFID memories 265, and wherein an RFID reader can be configured to detect and manage said plurality of RFID memories 265 and memory access collisions, and wherein the RFID data can be formatted accordingly and programmed into said plurality of RFID memories 265. In the present, a controller 250 can be configured to read and write said RFID data to a plurality of RFID memory 265 and to program RFID transceiver 1, 10 to a desired configuration.

It should be noted that the various RFID memory 265 and RFID antenna 220 and 225 configurations described in FIG. 9 and FIG. 10 may also be configured for use in other RFID transceiver 1, 10 and smart label 5 embodiments.

In the above-described embodiments, various smart label 5 embodiments have been described allowing for the identification and configuration of a network or pluggable transceiver to which the smart label 5 is affixed using RFID. Although particular embodiments of a smart label 5 were described, it is appreciated that other configurations are possible, for example the smart label can be configured to provide identification RFID data while also enabling communication through an aperture with RFID antenna and memory and or reader devices positioned inside the network transceiver from an exterior thereof, and blocking unwanted RF signals from entering or escaping the interior of the network transceiver using an integrated RFID repeater.

In the present embodiment, exemplary isometric and top views of a RFID transceiver 1, 10, housing 202, aperture 3, and smart label 5 are illustrated in FIG. 1. In the illustrated embodiments, the RFID transceiver 1, 10 can be provided with a housing 202 configured with an RFID interface through aperture 3 located on a sidewall of the housing 202. A designated area can be used to attach the smart label 5 covering aperture 3 on RFID transceiver 1 or said designated area can be used to position external RFID reader 15. In the present embodiment, the designated area can include at least one aperture 3 formed in the housing 202, said aperture 3 being configured to provide a dielectric RFID interface to enable RFID communications therethrough, for example to allow RFID signals to be transmitted between a smart label 5 and or an external RFID reader 15 positioned on an exterior surface of the housing 202 proximate to aperture 3 and the RFID antenna 220 located inside the housing 202. As can be appreciated, in this configuration the aperture 3 and internal RFID antenna 220 can be configured to provide an RFID interface for the smart label 5 and external RFID reader 15.

In the present embodiment, the RFID interface provided by aperture 3 and RFID antenna 220 can include at least one dielectric interface surrounded by an electromagnetically shielding material such as to create a path for RFID communications between an interior and an exterior of the housing 202. Preferably, the dielectric interface is sized and configured to attenuate and or block unintended electromagnetic waves passing through the interface. In the present embodiment, the dielectric interface comprises air, and can be defined by aperture 3 formed in sidewalls of the housing 202. In this configuration, the shielding material surrounding the dielectric interface is the metal forming housing 202. As can be appreciated, aperture 3 can be sized according to the wavelength of RFID signals used for communication and external interfaces, for example with the external RFID reader 15, wherein the smart label 5 and aperture 3 can be configured to effectively act as a filter for allowing the passage of desired RFID wavelengths of electro-magnetic radiation. For example, the maximum linear dimension of the aperture 3 can be approximately 6 mm in length, and in another example the aperture 3 can be preferably sized to have a surface area less than 29 mm$^2$. Preferably still, aperture 3 can be sized to attenuate unwanted or unintended EM signals from passing through, for example by approximately 60 dB or more at 10 GHz. It can be appreciated that other dielectric interface geometries, materials and configurations can also be formed. For example, the dielectric interface can comprise a plastic or tempered glass dielectric material bonded or attached to the housing 202 and covering or can be retained within aperture 3, and for example configured to provide a hermetic seal.

In the present embodiment, the smart label 5 can be configured and formed for the RFID transceiver 1, 10 configuration, form factor, footprint and RFID programming requirements, for example pluggable transceiver 10 can be configured to provide a plurality of different network functions and housed in a plurality of different form factors and footprints and programmed using a plurality of RFID programming methods described herein, consequently there can be a plurality of RFID transceiver 1, 10 embodiments and smart label 5 embodiments each corresponding to a desired application or applications.

For example, pluggable transceiver product labels (e.g. smart label 5) can be typically permitted on the top or bottom or sides of the RFID transceiver 1, 10 housing 202 within specified areas and dimensions, wherein the label to be zero thickness or recessed below external surfaces of the module housing 202 mating footprint, wherein the label and data contents and positions can be determined by a module manufacturer, and wherein the label(s) can not interfere with the mechanical, thermal or electro-magnetic compatibility (EMC) properties of the RFID transceiver 1, 10 host system or device.

The following embodiments are examples or the various functions, form factors and circuit configurations provided by the smart label 5, and that other example configurations and embodiments can be formed.

Figure 11:
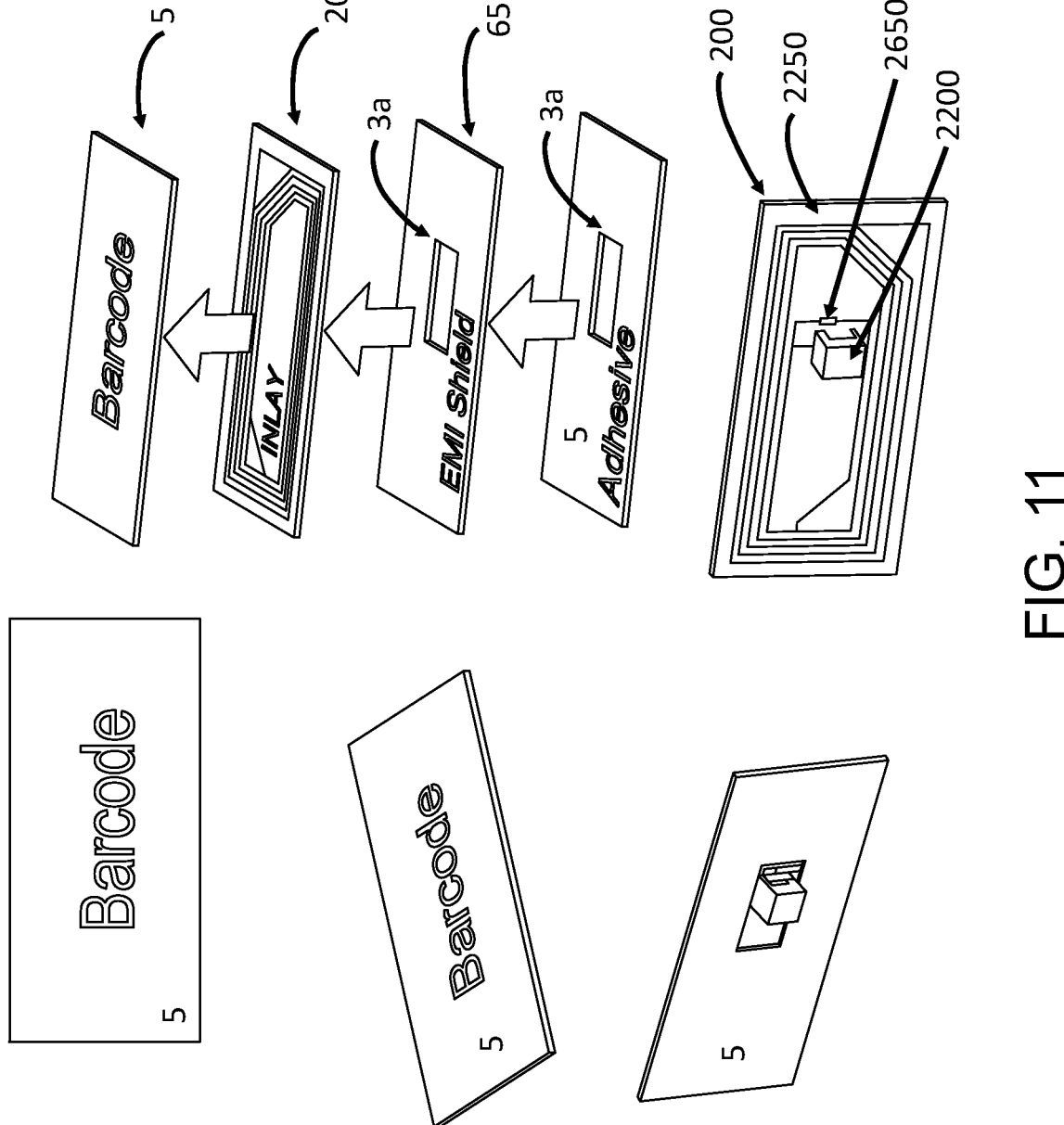
FIG. 11 illustrates assembled and exploded isometric views of a smart label, according to an embodiment.

In the embodiment illustrated in FIG. 11, the smart label 5 can be configured with a flexible top surface face-stock substrate 5 made of material suitable for printing data, wherein said printed data can be used to identify a product, finished good, assembly, etc. For example, a smart label 5 can be configured with a product barcode or QR code and other associated visible information and data printed thereon, wherein said printed top surface can be made of polyester or polyamide material and the bottom surface can be configured with adhesive layer or base substrate, wherein at least a part number and a serial number data can be printed on its top surface, for example printed identification RFID data used to uniquely identify an RFID transceiver 1, 10.

In an embodiment, the smart label 5 can be configured with a top surface printed barcode layer 5, a flexible EM substrate 65 configured for EM shielding and a flexible bottom adhesive layer or base substrate.

In the embodiment illustrated in FIG. 11, the smart label 5 can be configured with a top printed barcode layer 5, an EM substrate 65 with an aperture 3a, an internal external RFID repeater 200 configured with RFID antennas 2250 and 2200 formed on or supported on or mounted on a flexible or semi-rigid substrate 200 such as a substrate formed of polyester, polyimide, etc. materials laminated together containing or supporting electrical circuits, for example circuits formed in copper or aluminum based conductor materials, and a bottom adhesive layer or base substrate (e.g. referred to as a "repeater smart label 5"). In an embodiment, the smart label 5 can be configured with an RFID memory 2650 connected to the RFID repeater 200 circuits (e.g. referred to as a "smart label 5"), as described herein. In an embodiment, the repeater smart label 5 and RFID memory 37 can be configured on separate circuits (e.g. referred to as a "tagged repeater smart label 5"), as described herein.

Figure 12:
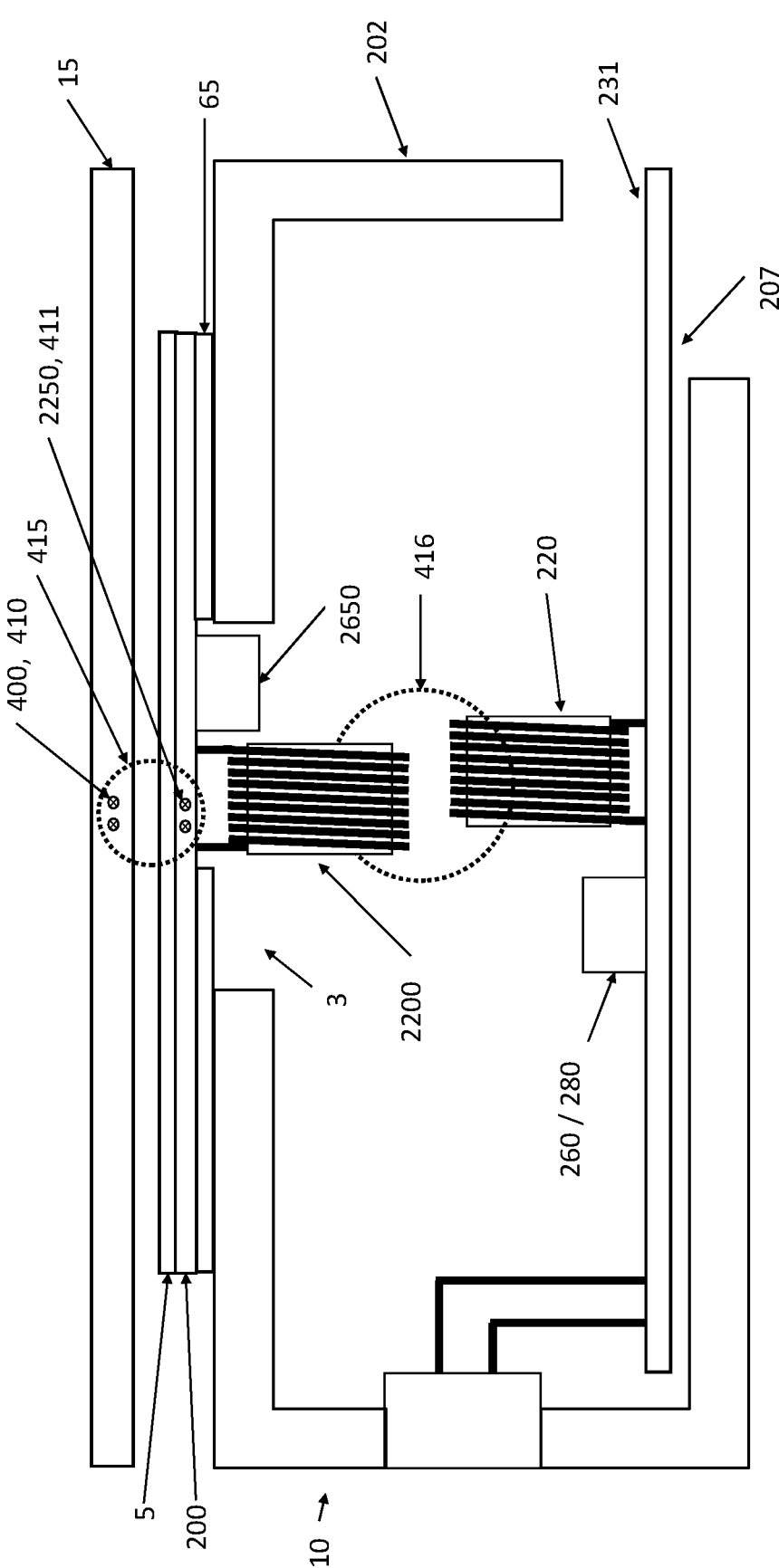
FIG. 12 is a cutaway profile view of an RFID transceiver, smart label, and external RFID reader, according to an embodiment.

In the embodiment illustrated in FIGS. 11 and 12, various smart label 5 embodiments can be configured to be installed and interface with a plurality of different RFID transceiver 1, 10 housing 202 aperture 3, and form factors and footprints, for example MSA SFP+, QSFP and CFP2 form factors and footprints, shielded plugin circuit card form factors and footprints, etc., and an external RFID reader 15. In the present embodiment, the smart label 5 body or housing dimensions can be sized to fit on the designated product label surface areas on the RFID transceiver 1, 10 housing 202 sidewalls, faceplate or backplate, and wherein the smart label 5 can be installed on a plurality of locations on the RFID transceiver 1, 10 housing 202, and wherein said locations can be generally specified in a manufacturing standard or specification such as in an MSA or in a proprietary specification and will vary from RFID transceiver 1, 10 to RFID transceiver 1, 10 depending on the application and manufacturer and applicable standards.

For example, in the present embodiments, the approximate smart label 5 dimensions for the MSA SFP+, QSFP, and CFP2 pluggable transceivers 10 can be 10 mm wide×24 mm deep, 13 mm wide×32 mm deep, and 39.5 mm wide× 16.5 mm deep respectively and generally located on a top or bottom sidewall, and wherein the maximum smart label 5 thickness can be typically specified as 0.2 mm. It should be noted that the thickness of the smart label 5 embodiments described herein may be greater than the standard thickness of 0.2 mm due to the current RFID circuit and material technologies, and that the smart label 5 thickness may be in a range of 0.200 mm to 0.380 mm, and preferably in the range of 0.200 mm to 0.300 mm or less, and accordingly the RFID transceiver 1, 10 housing 202 and label recesses may be formed accordingly to accommodate the plurality of different smart labels 28 housing or body thicknesses and form factors.

It should be noted that while the smart label 5 overall dimensions may vary for each RFID transceiver 1, 10 form factor (. e.g. the printable top surface, EM shielding and adhesive bottom surface areas), the smart label 5 RFID interfaces, such as the antenna coil configuration and size, and label materials and configuration should be kept similar, and preferably identical, to ensure compatible RFID programming interfaces for a plurality of RFID transceiver 1, 10 device form factors and footprints and external RFID readers 15.

For example, in the embodiment illustrated in FIG. 12, a side cross-section view of an external RFID reader 15 RFID interface positioned to be in RFID communication with a repeater smart label 5 RFID antenna 2250 is shown. In the present embodiment, the external RIFD reader 15 can be configured with at least with one RFID antenna 400 which can be positioned facing the housing 202 aperture 3, preferably such that the RFID antenna 400 circuit conductors 410 and the RFID antenna 2250 coil circuit conductors 411 are aligned to maximize the field coupling 415 and proximate to each other within the read range. For example, the distance between the RFID antenna 400 and the RFID antenna 2250 can be preferably in a range from touching to at least 2 mm and the distance between the RFID antenna 2200 and the RFID antenna 220 can be preferably in a range from touching to 2 mm.

In the present embodiment, RFID transceiver 10 RFID memory 260 can be configured to receive RFID data from the external RFID reader 15 defining a desired configuration through the aperture 3 and repeater smart label 5 and RFID antenna 220, wherein the RFID memory 260 programmed with RFID data from an external RFID reader 15 upon interrogation therefrom.

In some embodiments, RFID transceiver 10 internal RFID reader 280 can be configured to receive RFID data defining a desired configuration of RFID transceiver 10 through the aperture 3, wherein the internal RFID reader 280 and RFID antenna 220 can be configured to receive the RFID data from the smart label 5 RFID memory 2650 upon interrogation, and wherein the smart label 5 RFID memory 2650 can be programmed with RFID data using the external RFID reader 15.

In the illustrated embodiment, the aperture 3 can be sized to receive the RFID antenna 2200 at least partially therein wherein the RFID antenna 220 can be positioned proximate to the aperture 3 and not protruding from the aperture 3 housing 202 exterior surface. In another embodiment, RFID antenna 2200 can be configured be positioned within the smart label body and to not protrude from said body and onto the housing 202 exterior surface or into the aperture 3, wherein the RFID antenna 220 can be configured to be positioned at least partially within the aperture 3 and not protruding from the housing 202 exterior surface. In another embodiment, the RFID antenna 220 can be detachably connected to the PCBA, wherein the RFID antenna 220 can be configured to be at least partially protruding from the housing 202 exterior surface. For example, the RFID antenna 220 can be formed like RFID antenna 2250 and positioned on the housing 202 exterior surface as shown and can be attached to a connector through aperture 3, wherein said connector can be mated with the PCBA 32. For example, RFID antenna 220 can be configured with a connector and temporarily installed on the PCBA 207 host interface connector 231 at least during programming using an external RFID reader 15.

In an embodiment, the RFID memory 260 and RFID antenna 220 and repeater smart label 5 can be configured to transmit RFID data from an RFID transceiver 1, 10 to an external RFID reader 15 upon interrogation therefrom. In an embodiment, the internal RFID reader 280 and RFID antenna 220 can be configured to transmit RFID data to a smart label 5 attached to RFID transceiver 10, wherein the smart label 5 can be configured to transmit said RFID data to an external RFID reader 15 upon interrogation therefrom.

Preferably, the design, type, size, magnetic orientation and/or alignment of the external RFID reader 15 RFID antenna 400 and the RFID antenna 220 and 2250 can be selected to provide an optimal magnetic field coupling between RFID antenna 400 and the RFID antenna 220 or 2250, wherein such coupling enables reliable RFID communications between the external RFID reader 15 and the RFID memory 260 or reader 280 within the read range.

In the present embodiments, the RFID memory 260 and reader 280 and antenna 220 and the external RFID reader 15 and smart label 5 RFID repeater RFID antenna 2250, 2200 and RFID memory 2650 can be configured for resonant inductive coupling, and near field communications. It should be noted that resonant inductive circuits can also be used as bandpass filters due to their relatively narrow EM signal frequency passband around the resonant operating frequency, e.g. 13.56 MHz.

In the embodiments illustrated in FIGS. 10, 11 and 12, an RFID repeater can be configured as a smart label 5, for example with a barcode label printable substrate 5 bonded to the top surface of the RFID repeater 200 RFID antenna 2250 substrate 200, and can be used to passively relay RFID communication signals between an external RFID reader 15 and an RFID transceiver 1, 10 RFID antenna 220 and an RFID memory 260 or a smart label 5 RFID memory 2650, and between RFID transceiver 10 RFID reader 280 and RFID antenna 220 and said RFID memory 2650.

The various smart label 5 embodiments can be mounted to an exterior of the housing and can include: a substrate 200 configured with a first external field-concentrating RFID antenna 2250; a second internal RFID repeater antenna 2200 mounted to on an underside of said substrate 200; and an electrical connection between the first and second repeater antenna 2200, 2500 to enable RFID communications therethrough.

In the present embodiment, the external RFID reader 15 RFID antenna 400 can be positioned proximate to the smart label 5 repeater RFID antenna 2250 within the read range, wherein said repeater RFID antenna 2250 can be configured as a planar coil circuit and said substrate can be mounted on an exterior of the housing 202 covering the aperture 3. In an embodiment, the repeater RFID antenna 2200 can be configured as an inductor coil positioned through the aperture 3 proximate to the RFID antenna 220 within the read range; wherein the two repeater RFID antenna 2200, 2250 coils can be electrically interconnected to enable RFID communications between the external RFID reader 15 and the RFID antenna 220 therethrough. In the present embodiment, the RFID antenna 220 coil can be surface mounted and electrically connected to the PCBA 207. In the present embodiment, the planar orientation of RFID antenna 220 coil and the RFID antenna coil 2200 can be preferably in the X-Y plane, the orientation of the RFID antenna 400 and RFID antenna 2250 magnetic axes can be preferably in the Z plane. In the illustrated embodiment, the magnetic field 415 couples the external RFID reader 15 antenna 400 conductors 410 and repeater RFID antenna 2250 conductors 411, and the magnetic field 416 couples the repeater RFID antenna 2200 and the RFID antenna 220.

In the illustrated embodiment, the smart label 5 RFID repeater substrate 200 includes an external facing RFID antenna 2250 that can be formed in a planar coil structure and that can be configured with an EM shielding substrate 65, for example a layer of ferrite material such as a 0.1 mm thick ferrite sheet that minimizes the effects of a metallic housing 202 on the coupling fields 415 and 416, wherein the EM substrate 65 can be configured improve the magnetic coupling between the external RFID reader 15 RFID antenna 400 and the RFID antenna 2250, for example by preventing eddy currents from forming on the metal housing and or allowing the fields to couple around the conductors 411. In an embodiment, the EM substrate 65 can also be configured to attenuate unintended electro-magnetic emissions radiating from the aperture 3. In the present embodiment, the EM substrate 65 can be secured to an underside of the RFID antenna 2250 substrate 200. In an embodiment, EM substrate 65 can include a conductive adhesive provided on the bottom surface to attach the smart label 5 to the RFID transceiver 10 housing 202. In an embodiment, the EM shielding substrate 65 can be configured to provide a dielectric gap or space (e.g. air or plastic spacer) between the substrate 200 RFID antenna 2250 and the housing 202, and wherein said EM dielectric substrate can be secured to an underside of the RFID antenna 2250 substrate 200, for example the gap can be formed using a layer of dielectric material such as a 0.1 mm thick polyamide or PET or PFTE sheet that minimizes the effects of a metallic housing 202 on the coupling fields 415 and 416. In some embodiments, a combination of dielectric and ferrite shieling materials may be used to improve the magnetic field coupling between proximate RFID antennas and proximate metals.

In an embodiment, smart label 5 substrate 200 can be a solid or preferably a flexible substrate using materials such as polyamide or PET or PFTE configured with electrical circuits, for example a printed or etched or deposited circuit. In an embodiment, the RFID antenna 2250 can be configured with a printed coil or loop or spiral structure on said substrate, for example the coil dimensions can be approximately 8 mm W×20 mm D. In the present embodiment, the RFID antenna 2200 can be configured as inductor coil having a ceramic or ferrite core material, for example a surface mounted chip inductor having approximate dimensions of 2.3 mm W×1.8 mm D×1.6 mm H. In the present embodiment, the RFID antenna 2250 coil and the RFID antenna 2200 coil can be electrically interconnected using said printed circuit substrate or wire conductors. It should be noted that in other embodiments, the RFID antenna 220, first repeater RFID antenna 2250 and second repeater RFID antenna 2200 can be configured to have other orientations and or configurations, for example another antenna type, operating frequency and or coupling technology, such as a UHF RFID antenna. For example, in an embodiment, RFID antenna 2200 can be configured as a planar coil antenna on substrate 200. In other embodiments, the repeater RFID antenna 2250 and repeater RFID antenna 2200 and the RFID antenna 220 coil and conductor sizes and number of coil loops can be increased where practical to increase the read range.

In the present embodiments, the smart label 5 RFID repeater 200 can be configured for resonant inductive coupling, and near field communications. In the present embodiment, the RFID repeater 200 can include at least one passive component configured to ensure RFID antenna 2250 and RFID antenna 2200 resonant frequency matching and tuning. In an embodiment, said passive component can be constructed using the same substrate and conductive material of the antenna structures. In the present embodiment, a passive element or component or the use of the conductive layers separated by the substrate dielectric can be added to adjust the resonant structure of the repeater 200.

In the present embodiment, the resonant inductive circuits can be used as a bandpass filter due to their relatively narrow EM signal frequency pass band around the resonant operating frequency, e.g. 13.56 MHz. In an embodiment, smart label 5 can be configured with an electro-magnetic filter, such as an electronic filter device formed using inductive, capacitive and resistive elements, structures and or components and the smart label 5 materials, to minimize unintended electro-magnetic emissions from RFID transceiver 1, 10 aperture 3. In the present embodiment, the smart label 5 can be configured with an electro-magnetic shielding filter, such as an electronic filter device formed using ferrite materials and the smart label 5 circuits and materials, to minimize unintended electro-magnetic emissions from RFID transceiver 1, 10 aperture 3. Note that the RFID antenna and repeater electronic tuning elements, structures and or components, and resulting antenna tuning, can be used to minimize unintended electro-magnetic radiation while optimizing RFID communications therethrough. Note that said tuning can be affected the use and type of electronic components, top surface layer material (e.g. barcode), RFID antenna inlay layer materials, and or EM substrate 65 layer material, adhesive layer material, housing 202 material, etc., used in the smart label 5 construction or to which the smart label 5 can be attached. For example, the smart label 5 can be tuned to a frequency 13.56 MHz to passively receive and transmit RFID or NFC RF signals, and can filter out other unwanted EM signals from passing through the RFID transceiver 1, 10 aperture 3.

For example, tuning and or filtering passive elements, including the EM shielding substrate, can be configured to attenuate unintended EM signals from passing through the RFID repeater 200 and smart label 5, for example the RFID repeater 200 can be configured to transmit and receive RFID signals at 13.56 MHz and provide a data bandwidth of at approximately 2 MHz and provide at least 20 dB attenuation of unintended signals outside the RFID signal passband when mounted on metal housing 202 and covering aperture 3.

A person of reasonable skill in the art will understand that the coupled RFID antennas can be used to re-direct and realign the external magnetic fields of the RFID communications path to the internal RFID antenna 220 of the RFID transceiver 1, 10, and thus the above examples are not an exhaustive list of the possible configurations.

In the embodiment illustrated in FIG. 12, the RFID repeater 200 and EM substrate 65 can be configured with a substrate 5 providing a printable label covering the exterior surface of repeater 200 RFID antenna 2250 substrate, for example repeater 200 can be configured as a smart label 5 with printable face-stock material, such as a polyester printed barcode or QR code label having a product description, and is referred as a repeater smart label 5. In an embodiment, said repeater smart label 5 can be configured to enable an external RFID reader 15 to program RFID data into RFID memory 260. For example, in an embodiment, said repeater smart label 5 can be configured to enable an wireless controller 20 configured with an external RFID repeater 25 or 27 to program configuration data into internal RFID memory 260.

In the embodiment illustrated in FIG. 12, repeater smart label 5 can be configured with an RFID memory 2650, wherein the RFID memory 2650 can be connected to the RFID repeater 200 RFID antenna 2250 and 2200, and wherein RFID memory 2650 can be configured to be programmed with RFID data using an external RFID reader 15 or internal RFID reader 280, and wherein the internal RFID reader 280 can be configured to read RFID data from RFID memory 2650 and to program RFID transceiver 10 to a desired operating configuration. For example, said RFID repeater 200 and RFID memory 2650 configuration can be referred to as the smart label 5. It should be noted that in some embodiments, said smart label 5 RFID memory 2650 can be configured to be read or written to by only the internal RFID reader 280, for example using an EM suppressor substrate or using a programmed read-only memory configuration.

Figure 13:
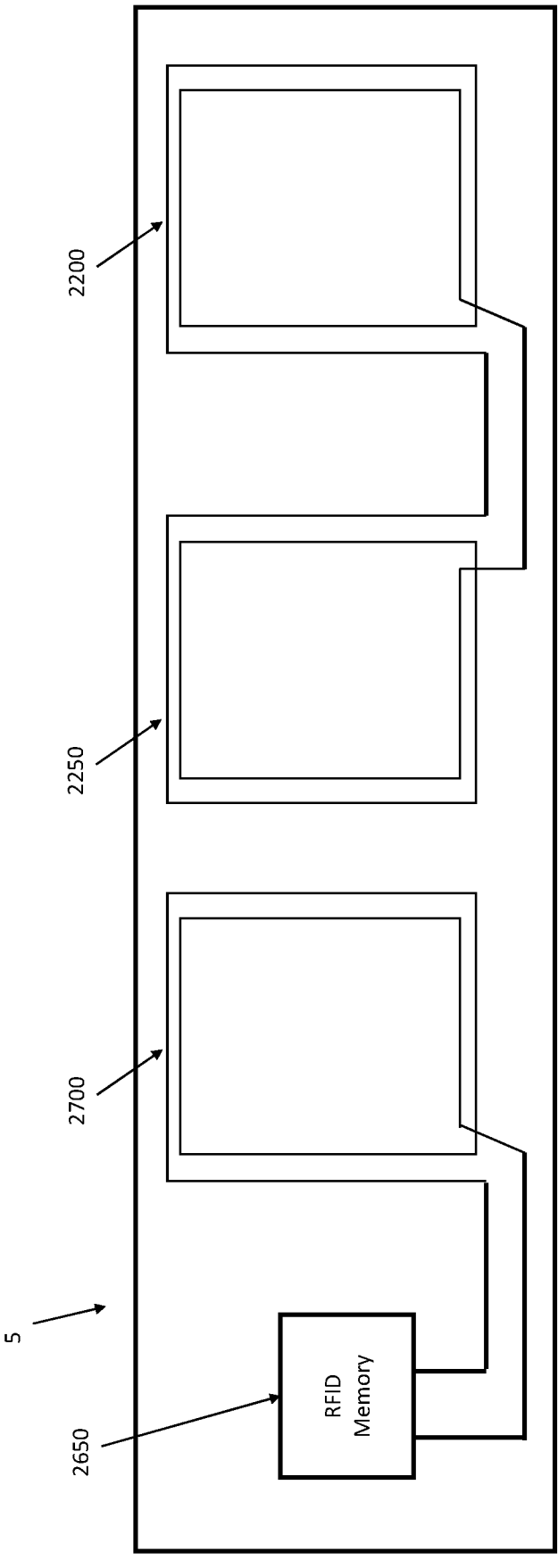
FIG. 13 is a schematic of a smart label RFID repeater, according to an embodiment configured with an RFID memory and associated RFID antenna, separate and independent of an RFID repeater.

In the embodiment illustrated in the schematic diagram in FIG. 13, said repeater smart label 5 can be configured with an RFID memory 2650 wherein the RFID memory 2650 can be connected to a second separate RFID circuit and RFID antenna 2700, and wherein RFID memory 2650 and antenna 2700 may not be connected to the RFID repeater 200 antenna 2250 and 2200, and wherein said smart label 5 RFID memory 2650 can be configured to be programmed with RFID data using an external RFID reader 15, and wherein said repeater smart label 5 and RFID memory 2650 can be configured to enable an external RFID reader 15 to program RFID data into RFID memory 260 using the RFID repeater RFID antenna 2650 and 2200, for example said repeater smart label 5 and separate RFID memory 2650 can be referred to as a tagged repeater smart label 5. For example, RFID memory 2650 can be used to identify a repeater smart label 5 and its configuration using RFID, wherein RFID memory 2650 can be programmed with at least an RFID transceiver 10 finished good part number and serial number identification RFID data or at least an RFID transceiver 1 assembly part number and serial number identification RFID data and at least the tagged repeater smart label 5 part number and serial number identification RFID data. In another embodiment, the tagged repeater smart label 5 can be programmed with identification and configuration RFID data used to program an RFID transceiver 1, 10, for example the tag RFID memory 2650 can be programmed with RFID data containing a first password or encryption key data used to program RFID transceiver 1, 10 RFID memory 260 to a desired operating configuration and wherein the external RFID reader can be configured with a second password or key data used to access and read said password or key RFID data from the RFID memory 2650.

In the present embodiments, the external RFID reader 15, smart label 5, repeater smart label 5, tagged repeater smart label 5 and RFID transceiver 1, 10 RFID antennas and circuits can be configured with resonant frequency tuning components (e.g. capacitors) to optimize the RFID antenna magnetic coupling, and as a consequence said circuits can also be used to attenuate un-intended electromagnetic emissions radiating through the aperture 3 and to enable RFID communications signals to be transmitted therethrough as described herein.

In the present embodiments, the external RFID reader 15 and RFID transceiver 1, 10 internal RFID reader and RFID memory 260 and smart label 5 RFID memory 2650 can be configured with an anti-collision functionality to enable interrogating and identifying each said RFID memory or a plurality of RFID memories located within its field or read range, and to selectively and individually program each said compatible RFID memory with RFID data defining an operating configuration. For example when an external RFID reader 15 interrogates RFID transceiver 10 configured with an internal memory 260 a tagged repeater smart label 5, it will receive at least two responses one from each RFID memory 260 and 2650 positioned proximate to the external RFID reader 15 RFID interface and within the read range, wherein the external RFID reader 15 can be configured to program each RFID memory 2650 and 260 individually with different RFID data.

Figure 14:
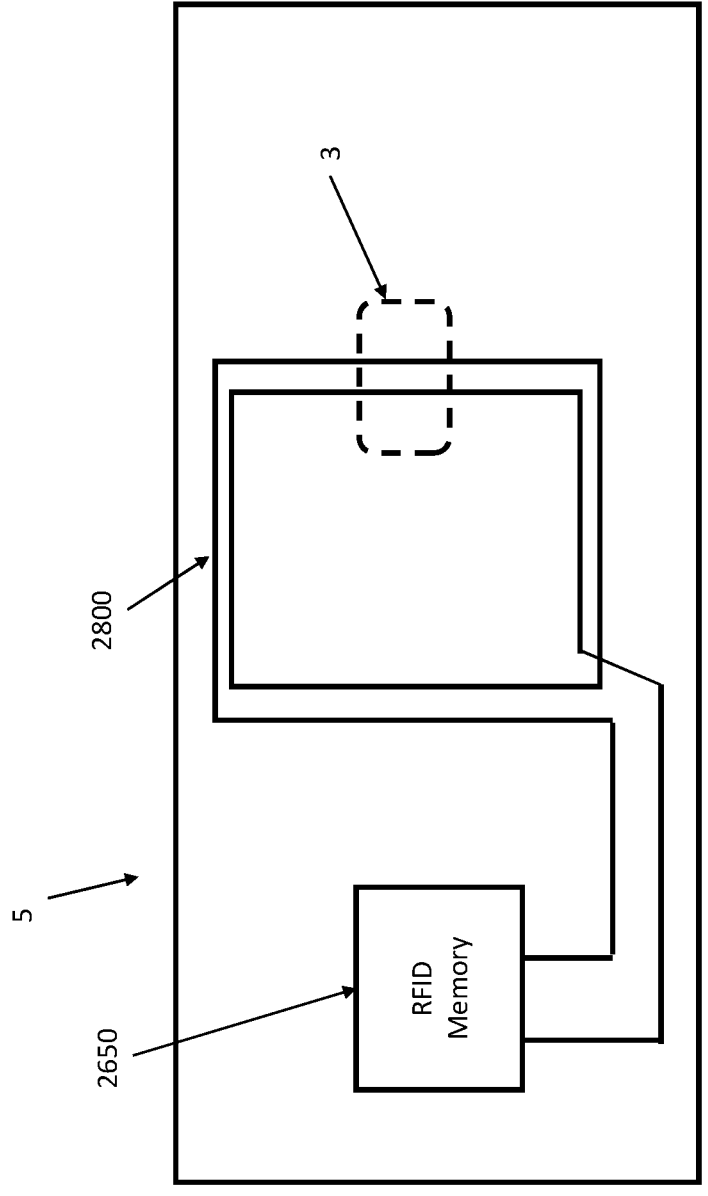
FIG. 14 is schematic of an RFID repeater, according to an embodiment configured with an RFID memory, wherein the antenna interface port of said RFID memory is connected to one RFID antenna, and wherein said RFID antenna is configured as an RFID repeater.

In an embodiment illustrated in the schematic diagram shown in FIG. 14, a smart label 5 can be configured with a single RFID antenna 2800 coil circuit used for passively repeating an RFID signal from an exterior interface of RFID transceiver 1, 10 to an interior interface. In an embodiment, the smart label 5 and RFID antenna 2800 can be configured and positioned on the RFID transceiver 1, 10 housing 202 covering aperture 3, wherein the smart label 5 and RFID antenna 2800 can be configured to interface with an external RFID reader 15 positioned proximate to RFID antenna 2800, and wherein the smart label 5 and RFID antenna 2800 can be configured and positioned to interface with RIFD transceiver 1, 10 RFID antenna 220, and wherein RFID antenna 2800 can be configured to enable RFID communications between the external RFID reader 15 and the RFID transceiver 1, 10 internal RFID memory 260 therethrough, for example, the RFID antenna 2800 can be configured to function as an RF signal repeater. In the present embodiment, RFID transceiver 1, 10 RFID antenna 220 can be configured and positioned within aperture 3 to interface with RFID antenna 2800. In the present embodiment, the external RFID reader 15 can be configured to program internal RFID memory 260 with RFID data using RFID antenna 2800, wherein said RFID data can be used to program RFID transceiver 10 to a desired operating configuration.

In the present embodiment, said single coil RFID repeater RFID antenna 2800 can be configured for relaying RFID signals to and from predetermined positions on the top and the bottom surfaces of the substrate 200, said single coil RFID repeater comprising one RFID antenna 2800 wherein a first repeater antenna portion is exposed on the top side of the substrate and a second repeater antenna portion of said RFID antenna is exposed on the bottom side of the substrate and facing RFID transceiver 1, 10 housing 202 aperture 3, wherein said bottom side RFID repeater antenna second portion may be configured differently from said top side RFID repeater antenna first portion.

In another embodiment illustrated in the schematic shown in FIG. 14, said smart label 5 and single RFID antenna 2800 coil circuit can be configured with an RFID memory 2650 and used for repeating an RFID signal. In an embodiment, smart label 5 and RFID antenna 2800 can be configured and positioned on the RFID transceiver 1 housing 202 aperture 3, wherein the smart label 5, RFID memory 2650 and RFID antenna 2800 can be configured to interface with an external RFID reader 15 positioned proximate to RFID antenna 2800, and wherein the smart label 5 and RFID antenna 2800 can be configured and positioned to interface with RIFD transceiver 1 RFID antenna 220. In the present embodiment, RFID antenna 2800 can be configured to enable RFID communications between the external RFID reader 15 and the RFID memory 2650 and between the RFID transceiver 10 internal RFID reader 280 and RFID memory 2650 therethrough, and wherein RFID memory 2650 can be configured to interface with external RFID reader 15 and the RFID transceiver 10 internal RFID reader 280. In the present embodiment, the external RFID reader 15 can be configured to program RFID memory 2650 with RFID data using RFID antenna 2800, wherein said RFID data can be used to program RFID transceiver 10 to a desired operating configuration using internal RFID reader 280 and RFID antenna 220 to read said RFID data from RFID memory 2650. In the present embodiments, said smart label 5 can be attached to a sidewall covering aperture 3 on the RFID transceiver 1, 10 housing 202, and wherein RFID antenna 2800 can be configured to not protrude through the exterior sidewall hosing 202 and into aperture 3.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The invention claimed is:

1. A method for programming a network transceiver using a network transceiver programming system comprising a reader and a programming interface, the method comprising:
    a) reading transceiver identification information from the network transceiver using the reader;
    b) obtaining configuration data for the network transceiver based on the transceiver identification information; and
    c) programming the network transceiver using the configuration data via the programming interface.

2. The method according to claim 1, wherein the identification information comprises a serial number, further wherein the obtaining configuration data comprises selecting configuration data associated with the serial number from a plurality of available configuration data.

3. The method according to claim 1, wherein the identification information comprises a part number, further wherein the obtaining configuration data comprises selecting configuration data compatible with the part number from a plurality of available configuration data.

4. The method according to claim 1, wherein the transceiver programming system comprises a graphical user interface (GUI), further wherein the obtaining configuration data comprises displaying a plurality of configuration data associated with the transceiver identification information on the GUI and receiving, via the GUI, a user selection of one of the plurality of configuration data.

5. The method according to claim 4, wherein the transceiver identification information is associated with a customer and/or a workorder, further wherein displaying the plurality of configuration data via the GUI comprises displaying only configuration data associated with the customer and/or the workorder.

6. The method according to claim 4, comprising determining whether the user is authorized to access an engineering function, and if the user is authorized, displaying configuration data associated with the engineering function via the GUI.

7. The method according to claim 1, wherein obtaining the configuration data comprises receiving the configuration data from a database on a remote server.

8. The method according to claim 7, wherein obtaining the configuration data comprises authenticating with the remote server, and receiving only authorized configuration data from the database based on the authentication.

9. The method according to claim 1, wherein the transceiver identification information is read via at least one of: an optical reader and a radio-frequency identification (RFID) reader; and wherein the network transceiver is programmed via at least one of: a Multi-Source Agreement Small Form-Factor Pluggable Plus (MSA SFP+) interface and a radio-frequency (RF) interface.

10. A network transceiver programming system, the system comprising:
    a reader operable to read transceiver identification information from a network transceiver to be programmed;
    a programming interface operable to program the network transceiver; and
    a controller in operative communication with the reader and the programming interface, the controller being configured to:
        read transceiver identification information from the network transceiver using the reader;
        obtain configuration data for the network transceiver based on the transceiver identification information; and
        program the network transceiver with the configuration data using the programming interface.

11. The system according to claim 10, further comprising a configuration database storing a plurality of configuration data, wherein the controller is configured to obtain the configuration data by selecting the configuration data from the plurality of configuration data stored in the configuration database.

12. The system according to claim 11, wherein the transceiver identification information comprises a serial number, further wherein the controller is configured to select configuration data associated with the serial number from the plurality of configuration data stored in the configuration database.

13. The system according to claim 11, wherein the transceiver identification information comprises a part number, further wherein the controller is configured to select configuration data compatible with the part number from the plurality of configuration data stored in the configuration database.

14. The system according to claim 11, wherein the configuration database is provided on a server that is remote from the reader and programming interface, further wherein the controller is configured to receive the configuration data from the server via a network connection.

15. The system according to claim 14, wherein the controller is configured to authenticate with the server, further wherein the controller receives only authorized configuration data from the server based on the authentication.

16. The system according to claim 10, further comprising a graphical user interface (GUI) in operative communication with the controller, wherein the controller is configured to display a plurality of configuration data associated with the transceiver identification information on the GUI, and to receive a user selection of one of the plurality of configuration data via the GUI.

17. The system according to claim 16, wherein the transceiver identification information is associated with at least one of a customer and a workorder, further wherein the controller is configured to display only configuration data associated with the customer and/or the workorder via the GUI.

18. The system according to claim 16, wherein the controller is configured to determine whether the user is authorized to access an engineering function, and if the user is authorized, display configuration data associated with the engineering function via the GUI.

19. The system according to claim 10, wherein the reader comprises at least one of: an optical reader and an RFID reader; and wherein the programming interface comprises at lest one of: a Multi-Source Agreement Small Form-Factor Pluggable Plus (MSA SFP+) interface and an RF interface.

20. A non-transitory computer-readable medium having instructions stored thereon which, when executed by a processor, cause the processor to:

a) read transceiver identification information from a network transceiver using a reader;

b) obtain configuration data for the network transceiver based on the transceiver identification information; and c) program the network transceiver using the configuration data via a programming interface.

\* \* \* \* \*